(12) United States Patent
Brose et al.

(10) Patent No.: US 8,306,885 B2
(45) Date of Patent: Nov. 6, 2012

(54) STOCHASTIC MODELING MODULE FOR PROVIDING FINANCIAL PLANNING AND ADVICE

(75) Inventors: Gabriela Brose, Minnetonka, MN (US); Jodi Jenson, Minneapolis, MN (US); Patricia Scarlato, Brooklyn, MN (US); Beth M. Vanney, Wausau, WI (US)

(73) Assignee: Ameriprise Financial, Inc., Minneapolis, MN (US)

( * ) Notice: Subject to any disclaimer, the term of this patent is extended or adjusted under 35 U.S.C. 154(b) by 1044 days.

(21) Appl. No.: 10/837,871

(22) Filed: May 3, 2004

(65) Prior Publication Data

US 2005/0004856 A1    Jan. 6, 2005

Related U.S. Application Data

(63) Continuation of application No. 10/210,827, filed on Jul. 31, 2002.

(60) Provisional application No. 60/309,103, filed on Jul. 31, 2001.

(51) Int. Cl.
*G06Q 40/00* (2012.01)
(52) U.S. Cl. ..................... 705/35; 705/36 R
(58) Field of Classification Search .............. 705/35–37
See application file for complete search history.

(56) References Cited

U.S. PATENT DOCUMENTS

| | | | | |
|---|---|---|---|---|
| 5,490,065 A | * | 2/1996 | Hoenninger et al. | 701/29 |
| 5,644,727 A | * | 7/1997 | Atkins | 705/40 |
| 5,774,881 A | | 6/1998 | Friend et al. | |
| 5,784,696 A | | 7/1998 | Melnikoff | |
| 5,819,263 A | * | 10/1998 | Bromley et al. | 707/3 |
| 5,857,176 A | | 1/1999 | Ginsberg | |
| 5,884,287 A | | 3/1999 | Edesess | |
| 5,911,136 A | | 6/1999 | Atkins | |
| 5,918,217 A | | 6/1999 | Maggioncalda et al. | |
| 5,933,815 A | | 8/1999 | Golden | |
| 5,945,675 A | * | 8/1999 | Malins | 250/339.12 |
| 5,987,433 A | * | 11/1999 | Crapo | 705/36 R |

(Continued)

FOREIGN PATENT DOCUMENTS

JP    11-110447    4/1999

(Continued)

OTHER PUBLICATIONS

Adler, Feldman, and Taqqu (A Practical Guide to Heavy Tails: Statistical Techniques and Applications, Birkhäuser, 1998).*

(Continued)

*Primary Examiner* — Eric T Wong
*Assistant Examiner* — Hao Fu
(74) *Attorney, Agent, or Firm* — Snell & Wilmer L.L.P.

(57) ABSTRACT

The present invention provides systems and methods for facilitating financial advising and planning for a user. The system includes a portfolio integration module that integrates goals, assets, savings, and risk tolerance to develop a customized strategy for financial portfolio planning. A portfolio reconciler module facilitates comparison of the customized strategy to other strategies and projected user financial decisions in order to further facilitate the financial portfolio planning. A stochastic modeling module uses data from the portfolio integration module and the portfolio reconciler module in a stochastic modeling analysis using a synchronous stationary bootstrap sampling method to construct a proposed situation portfolio. A simulator module forecasts the effects of the proposed situation portfolio on the user's portfolio, and monitoring, simulating, designing, and testing the portfolio integration module, the portfolio reconciler module, and the stochastic modeling module.

18 Claims, 7 Drawing Sheets

U.S. PATENT DOCUMENTS

| | | | |
|---|---|---|---|
| 6,012,043 A | | 1/2000 | Albright et al. |
| 6,012,044 A | | 1/2000 | Maggioncalda et al. |
| 6,021,397 A | * | 2/2000 | Jones et al. ............... 705/36 R |
| 6,055,517 A | | 4/2000 | Friend et al. |
| 6,058,376 A | | 5/2000 | Crockett |
| 6,061,662 A | | 5/2000 | Makivic |
| 6,064,984 A | | 5/2000 | Ferguson et al. |
| 6,065,002 A | * | 5/2000 | Knotts et al. ............... 707/4 |
| 6,078,904 A | | 6/2000 | Rebane |
| 6,085,175 A | | 7/2000 | Gugel et al. |
| 6,115,691 A | | 9/2000 | Ulwick |
| 6,125,355 A | | 9/2000 | Bekaert et al. |
| 6,154,732 A | | 11/2000 | Tarbox |
| 6,161,098 A | | 12/2000 | Wallman |
| 6,219,650 B1 | | 4/2001 | Friend et al. |
| 6,240,399 B1 | | 5/2001 | Frank et al. |
| 6,275,814 B1 | * | 8/2001 | Giansante et al. ........ 705/36 R |
| 6,430,542 B1 | * | 8/2002 | Moran ........................ 705/36 R |
| 2004/0267651 A1 | | 12/2004 | Jenson |
| 2005/0010510 A1 | | 1/2005 | Brose |

FOREIGN PATENT DOCUMENTS

| | | |
|---|---|---|
| JP | 2001-76057 | 3/2001 |

OTHER PUBLICATIONS

Challis and Kitney ("Biomedical Signal Processing (in four parts) Part 1 Time-domain methods" Biomedical Systems Group, Imperial College, Med. & Biol. Eng. & Comput., 1990).*

Lee et al ("Stochastic Modeling of Human-Performance Reliability." IEEE Transactions on Reliability, vol. 37, No. 5; 1988).*

Internal Revenue Bulletin No. 1998-28, published Jul. 13, 1998, by the Department of the Treasury's Internal Revenue Service.*

Article entitled "The Stationary Bootstrap" by Dimitris N. Politis and Joseph P.Romano; Journal of the American Statistical Association, vol. 89, Issue 428 (Dec. 1994), 1303-1313.

Adler, Feldman and Taqqu, "A Practical Guide to Heavy Tails: Statistical Techniques and Applications", Birkhauser, 1998.

Lee et al., "Stochastic Modeling of Human-Performance Reliability," IEEE Transactions on Reliability, vol. 37, No. 5, 1988.

Challis and Kitney, "Biomedical Signal Processing (in four parts) Part 1 Time-Domain Methods," Biomedical Systems Group, Imperial College, Med. & Biol. Eng. & Comput., 1990.

Internal Revenue Bulletin No. 1998-28, published Jul. 13, 1998, by Department of the Treasury's Internal Revenue Service.

Non-Final Office Action mailed Jul. 24, 2008 in U.S. Appl. No. 10/210,827 by Jenson et al.

Non-Final Office Action mailed Jul. 24, 2008 in U.S. Appl. No. 10/837,849 by Jenson et al.

Non-Final Office Action mailed Jul. 25, 2008 in U.S. Appl. No. 10/838,114 by Brose et al.

Non-Final Rejection mailed Jul. 9, 2007 in U.S. Appl. No. 10/210,827 by Jenson.

Final Rejection mailed Jan. 25, 2008 in U.S. Appl. No. 10/210,827 by Jenson.

Non-Final Rejection mailed Jul. 30, 2007 in U.S. Appl. No. 10/837,849 by Jenson.

Final Rejection mailed Jan. 29, 2008 in U.S. Appl. No. 10/837,849 by Jenson.

Advisory Action mailed Apr. 15, 2008 in U.S. Appl. No. 10/837,849 by Jenson.

Non-Final Rejection mailed Jul. 25, 2007 in U.S. Appl. No. 10/838,114 by Brose.

Final Rejection mailed Jan. 29, 2008 in U.S. Appl. No. 10/838,114 by Brose.

Advisory Action mailed Apr. 16, 2008 in U.S. Appl. No. 10/838,114 by Brose.

Non-Final Rejection mailed Jun. 22, 2009 in Japanese Patent Application No. 2006-192215.

Non-Final Rejection mailed Feb. 22, 2010 for U.S. Appl. No. 10/210,827.

Non-Final Rejection mailed Feb. 23, 2010 for U.S. Appl. No. 10/837,849.

* cited by examiner

STOCHASTIC MODELING MODULE FOR PROVIDING FINANCIAL PLANNING AND ADVICE

CROSS REFERENCE TO RELATED APPLICATIONS

This application is a Continuation application of U.S. Non-Provisional patent application Ser. No. 10/210,827, entitled "System and Method For Providing Financial Planning And Advice", filed Jul. 31, 2002, the entire contents of which is hereby incorporated by reference. This application claims priority to, and the benefit of, U.S. Provisional Patent Application Ser. No. 60/309,103, entitled "System and Method For Providing Financial Planning And Advice", filed Jul. 31, 2001, the entire contents of which is hereby incorporated by reference. The present invention is related to U.S. Ser. No. 09/712,743, entitled "System and Method For Creating Financial Advice Applications" and filed Nov. 14, 2000; U.S. Ser. No. 09/731,163, entitled "System and Method For Evaluating Work Product" and filed Dec. 6, 2000; and U.S. Ser. No. 09/141,013, entitled "Computer-Implemented Program For Planning and Advice System" and filed Aug. 26, 1998; all of which are hereby incorporated by reference in their entireties.

FIELD OF INVENTION

The present invention relates generally to financial planning and advice systems and, more specifically, to financial planning and advice systems using stochastic modeling with a stationary bootstrap sampling method to model a user's financial situation.

BACKGROUND OF THE INVENTION

Achieving personal financial objectives generally includes a long-term relationship with a trusted and knowledgeable financial advisor who can assist with periodic financial planning. A financial advisor who is able to develop these types of relationships and meet a client's need for periodic financial planning thereby facilitates client retention. Inaccurate consumer impressions that financial planning is a once in a lifetime event should be mitigated in order to facilitate advisor-client relationships and accurately assess the client's current financial position as well as their future direction. An initial evaluation of a client's financial situation, followed by periodic reevaluation in light of changes in asset performance, market conditions, and client objectives, is important for the realization of the client's financial goals. Since initiating, building, and maintaining long-term advisory relationships with a client aids in becoming a successful advisor, financial planners are constantly searching for methods to foster this relationship in an effort to better serve clients and remain competitive.

Generally, the financial advice and information that is provided in a financial plan is becoming standardized as a result of the standards set forth by the Certified Financial Planning College and the adoption of those standards by the International Organization of Standards (ISO). Therefore, minimum levels of quality regarding the financial advice provided to clients are required to meet these standards and satisfy consumer needs. However, consumers of financial advice are becoming increasingly sophisticated and are, therefore, demanding more complete services from financial service companies and advisors. For example, in order for a financial advisor to prepare a comprehensive, integrated, financial plan for a client, it is useful to be able to illustrate to the client the effects of future uncertainty on that financial plan. A financial planner's ability to model the effects of unpredictable future events enhances the value of a financial plan to a client because it allows the client to prepare for those events in proportion to the likelihood of their eventuality.

Conventional financial advice applications generally ask the financial planner to input assumed rates of return (or a return rate that is calculated based upon the client's current investment portfolio) for the client's current and proposed investment portfolio without determining the type of strategy that might be best suited to the particular client's financial situation and objectives. In addition, a myriad of commercially available products target each of the three main financial categories, that is, cash, equity, and bonds, as well as the various subcategories of each. For example, equity funds can be categorized as domestic or international, large cap stock, small cap stock, etc. While it is difficult to keep abreast of all the mutual funds that a particular company may offer, financial planners are assisted in the selection of financial investment products by a variety of tools that can access and store the product offerings of at least a particular company in a database.

These conventional applications are unsatisfactory in several regards. Existing model portfolio engines do not adequately blend short-term and long-term needs to arrive at a client's recommended portfolio. Financial products capable of meeting the recommended portfolio are typically selected outside of the application. Conventional applications often fail to provide a current list of available products within the application that are directed to specific consumer needs. Furthermore, these applications do not offer an adequate proposed investment strategy for the client. Current financial planning tools usually provide deterministic illustrations (which may foster a false sense of certainty). Moreover, existing financial applications often provide stochastic modeling only of retirement goals and do not normally present stochastic models addressing lifetime cash flow, disability, long-term care, and death, for example. Finally, current applications do not offer personalized quality financial advice that is consistent with industry standards and tailored to the client's individualized needs.

In view of the foregoing, there is a need for financial planning systems and methods which overcome the shortcomings of conventional computer implemented financial planning applications.

SUMMARY OF THE INVENTION

The present invention provides systems and methods for probability modeling which facilitates financial advising and planning. A portfolio integration module facilitates integration of at least one of a user's goals, assets, savings, and risk tolerance in analyzing and developing a customized strategy for financial planning of the user. A portfolio reconciler module communicates with the portfolio integration module to facilitate comparison of the customized strategy to other strategies and projected financial decisions in order to further facilitate the financial planning of the user. A stochastic modeling module in communication with the portfolio integration module and the portfolio reconciler module uses data from the portfolio integration module and/or the portfolio reconciler module in a stochastic modeling analysis to facilitate creation of a proposed situation portfolio for the user. The stochastic modeling module uses a synchronous stationary bootstrap method of statistical sampling to facilitate analysis of historical economic data in order to facilitate creation of the proposed situation portfolio. A simulator module in communication with the portfolio integration module and the stochastic modeling module may be used to forecast the effects of changes to the probability modeling system and to monitor and test the system over a predetermined amount of time.

BRIEF DESCRIPTION OF THE DRAWINGS

Additional aspects of the present invention will become evident upon reviewing the non-limiting embodiments described in the specification, the appendices and the claims taken in conjunction with the accompanying figures, wherein like numerals designate like elements, and wherein:

DETAILED DESCRIPTION

The following disclosure presents, describes and teaches various exemplary embodiments in sufficient detail to enable those skilled in the art to practice the invention, and it should be understood that other embodiments may be realized without departing from the spirit and scope of the invention. Thus, the following detailed description is presented for purposes of illustration only, and not of limitation, and the scope of the invention is defined by the appended claims.

The system of the invention, as well as any of its component systems, may include a host server or other computing system, including a processor for processing digital data, a memory in communication with the processor for storing digital data, an input digitizer in communication with the processor for inputting digital data, an application program stored in the memory and accessible by the processor for directing the processing of digital data by the processor, a display in communication with the processor and memory for displaying information derived from digital data processed by the processor and a plurality of databases, the databases including client data, merchant data, financial institution data and/or like data that could be used in association with the present invention.

The present invention includes, in general, a comprehensive and integrated financial advising and planning system. The system includes probability modeling which facilitates the determination of the probability for successfully achieving identified personal financial goals based upon at least one of thousands of hypothetical projections of each of several types of scenarios, which may include, for example, scenarios such as the premature death, disability, retirement, and/or long-term care needs of any member of a particular household or other economic group. The probability modeling facilitates quantification of future uncertainty through statistically valid sampling to provide accurate simulations of a client's potential financial future. Each scenario has its own simulation-sets, which use, for example, common underlying economic and portfolio assumptions and combine these assumptions with unique scenario-specific cash flow activity. In this way, the resources used to meet financial goals and address concerns are rationally interactive and integrated between scenarios. For example, resources used to purchase disability insurance may not be available as savings for college education, or tax savings resulting from the use of tax-deferred vehicles may have a positive effect on all scenarios. The system can also select appropriate strategies and tactics for achieving selected personal financial goals and/or facilitate the selection of appropriate strategies depending on the needs of the system and users. The system also enables financial advisors and their clients to collaborate over the Internet to conduct financial planning for the client.

Figure 1:
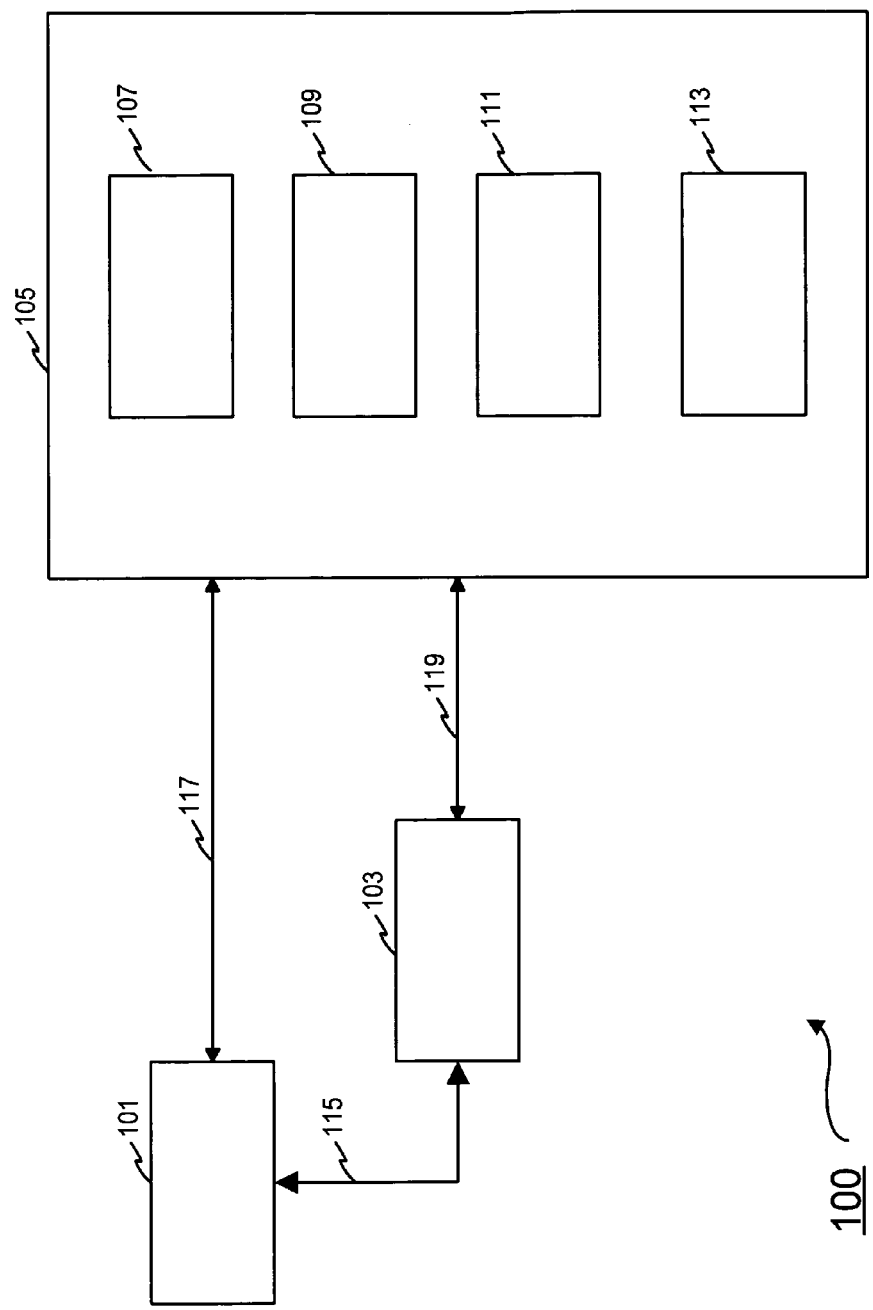
FIG. 1 is a block diagram of a system for facilitating financial planning and advising for a user in accordance with an exemplary embodiment of the present invention.

FIG. 1 illustrates a system 100 for facilitating financial planning and advising for a user 101 in accordance with an exemplary embodiment of the present invention. System 100 includes user 101 in communication with a financial advisor 103 and a server 105 via communication channels 115 and 117, respectively. Financial advisor 103 and server 105 also communicate via communication channel 119. Communication channels 115, 117, and 119 may be one channel or separate channels depending on the needs of system 100. In addition, user 101 and financial advisor 103 are illustrated as separate elements, but may also be the same element depending on the needs of system 100.

User 101 submits data to financial advisor 103 and/or server 105 via communication channels 115 and 117. The data may include user financial information (e.g., current and expected income, expenses, liabilities, assets, policies, taxes, Social Security/social pension, social pension information, company pension, and/or the like), user personal information (e.g., marital status, date of birth, age, occupation, lifestyle, family members, and/or the like), user goals, System assumptions, user risk tolerance, and/or the like. User's 101 net worth is one measure of financial security and can be used along with an analysis of cash flow to help determine user's 101 ability to achieve his or her goals. For example, net worth is calculated by subtracting the total liabilities from the total assets. User and/or system assumptions include assumptions in connection with investment performance, inflation, taxation, cost of insurance, cost of insurance growth rates, interest rates, risk tolerance and personal needs and objectives. Depending on the needs of system 100 and/or user 101, such assumptions could be designated by user 101. In this manner, system 100 does not rely on user 101 to make difficult uneducated decisions about future inflation rates, interest rates, investment market performance, cost of insurance growth rates, and/or the like. Financial advisor 103 can help user 101 select appropriate assumptions. For example, user 101 provides the ownership information and current values of assets and insurance policies to server 105. However, some of these assumptions may be modified in the process of analyzing user's 101 goals.

User 101 can quickly provide personalized and high-quality financial data to system 100 and receive quick financial advice. Based upon user's 101 data input, server 105 receives user's 101 current situation (e.g., current investment portfolio, insurance information, personal information, scenario information (e.g., insurance, tax, disability, long-term care, goals, and/or the like)). Server 105 can create a proposed situation portfolio based upon at least one of user's 101 data input, goals, and goal assumptions. A proposed situation portfolio may include a proposed investment portfolio along with, for example, scenarios (e.g., normal life span, disability, long-term care (e.g., costs, benefit, etc.), early death, and/or the like), life insurance information (e.g., costs, death benefit, etc.), disability insurance information (e.g., costs, disability benefit, etc.), Social Security, social pension, asset structure, savings, goals, retirement information, expenses, tax structure of assets and otherwise, savings, and/or company pension information, and other factors affecting a person's (or family member's) financial or personal situation. Proposed investment portfolios illustrate different methods of investing assets across various types of investments and may include, for example, asset structure, savings amounts, goals and amounts, retirement information, and/or the like. These proposed situation portfolios may improve the likelihood of success given a risk tolerance and a timeframe to achieve selected goals. In particular, server 105 is provided with the timeframe to achieve the goal, the dollar amount related to the goal, assets and savings available to meet the goal, and user's 101 risk tolerance. Simulations are run for each of the current situation and the proposed situation portfolio and the simulations compare user's 101 current situation with the proposed situation portfolio.

When data is submitted to server 105, various elements within server 105 analyze the data to create and present advice to user 101 in the form of a proposed situation portfolio. Server 105 includes, in one embodiment, portfolio integration module 107, portfolio reconciler module 109, stochastic modeling module 111, and simulator module 113, which analyze the data to facilitate creating and presenting advice to user 101. Portfolio integration module 107 facilitates integration of at least one of a user's 101 goals, assets, savings, and risk tolerance into customized proposed situation portfolio. Portfolio reconciler module 109 uses the proposed situation portfolio to facilitate allocation of assets, develop specific investments to fulfill investment strategies, and/or gather savings and premiums to develop specific investments appropriate for the proposed investment portfolio. Stochastic modeling module 111 uses a stochastic sampling methodology of synchronous station bootstrap sampling of historical data to develop the probability of financial success after review of at least one of user's 101 data, user's 101 goals, user's 101 goal assumptions, and historical data. Probability of financial success may be developed by creating discrete projections of future market and economic behavior and applying these projections to user's 101 data in conjunction with various scenario assumptions. In each projection, user 101 may not be able to fund one or more of the goals depending on the needs of user 101. The individual successes and failures in the projections are aggregated by stochastic modeling module 111 to develop the probability of success. Simulator module 113 uses the data to simulate, monitor, and test portfolio integration module 107, portfolio reconciler module 109, and/or stochastic modeling module 111. Simulator module 113 may be a part of server 105 or separate from server 105 (e.g., on a separate server or other device) depending on the needs of system 100.

Portfolio Integration

In one exemplary embodiment of the present invention, portfolio integration module 107 integrates at least one of a user's 101 goals, assets, savings, and risk tolerance into customized proposed situation portfolio. Portfolio integration module 107 determines the portfolio strategies by considering the timing of at least one of a user's 101 goals, the amount of user's 101 goals, the amount of user's 101 asset base, the amount of user's 101 savings, and the user's 101 risk tolerance. The portfolio strategies include various portfolios, such as taxable assets, taxable savings, and tax-deferred assets/savings. These portfolios allow server 105 to distinguish between assets and savings needed to meet short-term goals and assets and savings needed for long-term goals. In this manner, the proposed situation portfolio balances short-term market risks with long-term return potential. For example, portfolio integration module 107 can assess changes in financial planning assumptions, tax laws, other laws and regulations, and other developments, and integrate these changes into the proposed situation portfolio.

In one exemplary embodiment, server 105 assumes that consumers will spend their taxable assets first in order to fund their goals and that these assets represent what they have accumulated so far to realize their goals. Server 105 can also assume that savings represent funds that are available to be allocated for goals in the future. Server 105 can further assume that consumers will spend their life insurance cash value and premiums (e.g., net of the cost of insurance) before their tax-deferred retirement assets. Finally, server 105 can assume that consumers will spend their tax-deferred retirement assets last in order to leverage the tax advantages of deferred growth.

Portfolio integration module 107 determines the timeframe for user's 101 goals and the assets and savings user 101 may need in the short-term (e.g., within 10 years). Portfolio integration module 107 takes into account the relative timing and dollar amounts of the goals that will occur within, for example, 10 years. Large goals that may occur right away will be weighted more heavily than small goals that may occur later. A determination is made for the long-term portfolio's timeframe based on the retirement date or the earliest retirement date (if the analysis is for more than one user). User's 101 risk tolerance is ascertained along with each time frame in order to map the customized proposed situation portfolio.

Portfolio integration module 107 uses various portfolios to develop the customized proposed situation portfolio. Various portfolios include, for example: regular assets, which provide a cash/fixed/equity mix for the taxable assets; regular contributions, which provide a cash/fixed/equity mix for ongoing contributions (e.g., savings) to taxable accounts; retirement assets and contributions, which provide a cash/fixed/equity mix for retirement plans and other tax-deferred assets and ongoing contributions (e.g., savings); VUL (Variable Universal Life) insurance cash values and premiums for those policies used to fund goals, which provide a cash/fixed/equity mix for life policy cash values and ongoing premiums; VUL insurance cash values and premiums for those policies not used to find goals, which provide a cash/fixed/equity mix for life policy cash values and ongoing premiums, and/or the like. These portfolios allow portfolio integration module 107 to distinguish between assets and contributions needed to meet short-term goals and assets and contributions needed for long-term goals. In this manner, the model allocation balances the short-term risks in the market with long-term return potential.

For example, a taxable assets portfolio(s) and/or a taxable savings portfolio(s) have a short-term model portfolio based on an average-weighted timeframe and risk tolerance and a long-term model portfolio based on first retirement date and risk tolerance. A retirement savings and asset portfolio is based on first retirement date and risk tolerance. A portfolio associated with cash values and premiums may be a short-term model portfolio based on timeframe and risk tolerance. As such, these portfolios are used in portfolio integration module 107 to help develop the customized proposed situation portfolio.

Portfolio integration module 107 also determines the amount of taxable assets to be invested in the short-term and/or long-term assets portfolios. Portfolio integration module 107 divides the dollar value of all goals occurring, within for example ten years, by the value of the taxable assets. The result is the percentage of taxable assets to invest in the short-term assets portfolio. If user 101 has more assets than are needed to fund these goals, then part of the assets may be invested short-term and the remaining assets may be invested in the long-term assets portfolio (e.g., to fund goals that extend beyond 10 years). On the other hand, if user 101 does not have enough assets to fund these goals, the shortage can be funded out of user's 101 on-going savings and tax-deferred assets. Finally, the short-term and long-term assets portfolios are combined into one portfolio, namely, the taxable assets portfolio.

Portfolio integration module 107 then determines the amount of taxable savings to be invested in the short-term and long-term savings portfolios. This calculation is made by subtracting user's 101 taxable assets from the value of the goals occurring within 10 years, for example. The result of this calculation is the value of the goals that are not covered by user's 101 taxable assets; any shortage may be funded from taxable savings. If the asset base covers the goals, then savings are generally not allocated to the short-term portfolio. The present value of the taxable savings is calculated. The funding needed from savings is divided by the present value of the taxable savings. This result is the percentage of savings to allocate to the short-term portfolio. If the value is greater than 1, then all savings can be invested in the short-term portfolio. The remaining savings can be invested in the long-term savings portfolio (1-% short-term). Finally, the short-term and long-term savings portfolios are combined into one portfolio: the taxable savings portfolio.

In addition, portfolio integration module 107 may use a master set of data for user 101 and then analyze that data depending on a number of predetermined scenarios. The different scenarios may represent various circumstances that user 101 may face in a lifetime that may affect user's 101 finances. For example, the master set of data may be analyzed for a normal life expectancy of user 101 and family members, disability of user 101 or family members, long-term care for user 101 or family members, early or unexpected death of user 101 or family members, and/or the like. The master data may be used to generate information for each scenario for each of the current situation and the proposed situation portfolio. The flexibility of portfolio integration module 107 allows for analysis of such scenarios in order to better analyze circumstantial effects on user's 101 finances and the integrated resource allocation between scenarios and user 101 scenarios (e.g., specific cash flow activity projections of user 101).

Thus, a customized portfolio is generated for user 101. Server 105 uses asset returns based on the user's 101 current situation (for the "current" scenario) and the proposed situation portfolio (for the "proposed" scenario). In this way, server 105 can illustrate how user's 101 current situation strategy, user's 101 risk tolerance, and the investment advice contribute to user's 101 ability to reach his or her goals. As user 101 makes changes to the amounts or timing of the goals, any implementation recommendations, user's 101 risk tolerance, and/or the proposed situation portfolio, the effects on user's 101 probability of success is dynamically updated.

Thus, system 100 ties the risk tolerance, resources, and goals to the customized proposed situation portfolio. In this manner, user 101 and/or financial advisor 103 need not input assumed rates of return for user's 101 current and proposed situation portfolios without a link to the type of strategy useful to user 101 or an average return rate calculated from how user's 101 assets are currently invested.

In order to further illustrate portfolio integration module 107, an exemplary illustration of one embodiment of portfolio integration module 107 is attached as Appendix B, which is hereby incorporated by reference. In order to further illustrate cash flow calculations in connection with portfolio integration module 107, an exemplary illustration of one embodiment of calculating such cash flows is attached as Appendix D, which is hereby incorporated by reference. Use of the terms "Japanese Lightning", "Lightning", "Apex" and/or "application" herein including the Appendices shall mean system 100.

Portfolio Reconciler

Once portfolio integration module 107 develops the proposed situation portfolio for user 101, portfolio reconciler module 109 and/or financial advisor 103 may further develop the proposed situation portfolio by selecting the specific investments to fulfill those strategies. Server 105 uses portfolio reconciler module 109 to illustrate how user's 101 proposed situation portfolio compares to other model portfolio strategies and projected user 101 financial decisions and where changes can be made (e.g., at the asset class level) to the proposed situation portfolio. Portfolio reconciler module 109 facilitates specific action steps for user 101 to make (e.g., moving investment assets from the current portfolio to the proposed investment portfolio). As user 101 and/or financial advisor 103 makes buy, sell, and hold recommendations, portfolio reconciler module 109 monitors the recommendations and dynamically updates progress toward the proposed situation portfolio.

Some user situations may not allow them to invest according to the proposed situation portfolio. For example, user 101 may have tax considerations that prevent him or her from selling a stock. However, since the proposed probability of success is based on the proposed situation portfolio, the completed buy/sell/hold recommendations are tested against the model portfolio strategies to determine if such recommendations are sufficiently close to each other. For example, the buy/sell/hold recommendations may be within a margin of 5% at the cash/fixed/equity level of the proposed situation portfolio. If the recommendations are not sufficiently close, user 101 is informed and advised of the differences and asked to make further adjustments or state reasons for the differences.

Portfolio reconciler module 109 compares the current situation of user 101 and the customized proposed situation portfolio and incorporates specific buy/sell/hold recommendations and/or decisions aiding in developing an appropriate customized proposed situation portfolio for user 101. Furthermore, testing the current investment of user 101 against the proposed investment quantitatively aids user 101 and/or financial advisor 103 in developing appropriate customized proposed situation portfolio for user 101. Still further, the ability to create a customized proposed situation portfolio and provide specific recommendations and available products distributed by a company to user 101 aids user 101 in improving his or her financial portfolio. Portfolio reconciler module 109 is "smart" in that once a particular type of product is selected by user 101, then options within that product type are displayed to user 101. For example, in the case of life insurance, information relevant to life insurance is displayed to user 101. In addition, information relevant to cost of insurance, increase in costs of insurance, savings from investing in insurance, and/or the like are analyzed. If a specific asset class is selected, then investments within that asset class are displayed (e.g., large-cap stock funds). To maintain such information, portfolio reconciler module 109 may be linked through the Internet to the current offerings of any company. Alternatively, portfolio reconciler module 109 may be maintained on a static database that may be updated either by batch processing (i.e., periodic updates) or in real time. Thus, portfolio reconciler module 109 further develops the proposed situation portfolio for user 101 by selecting the specific investments to fulfill those strategies.

In order to further illustrate portfolio reconciler module 109 and portfolio integration module 107, an exemplary illustration of one embodiment of portfolio reconciler module 109 and portfolio integration module 107 is attached as Appendix A, which is hereby incorporated by reference.

Stochastic Modeling Module

During current and/or proposed situation portfolio simulations, server 105 uses stochastic modeling module 111 to aid in modeling the uncertain nature of the future. Examples of uncertainty include inflation, equity and bond market performance, bond returns, and/or the like. Inflation may impact expenses, incomes, and/or the like; whereas, market performance may impact investment returns, potential cost of loans, and/or the like. Stochastic modeling module 111 measures the probability of user 101 reaching his or her lifetime financial goals (e.g., if the current situation portfolio is used versus if the proposed situation portfolio is implemented). Stochastic modeling module 111 analyzes several variables with a wide range of different values from year to year to randomly sample values from actual and/or generated historical data. For example, some historical data (e.g., back to the 1950s) may not be easily accessible, so that stochastic modeling module 111 may generate such historical data given other information from that economic period. The analyses from stochastic modeling module 111 take into consideration both favorable and unfavorable possible performance patterns. The analyses help calculate performance of investments given thousands of different patterns in month-to-month changes in economic conditions (e.g., inflation, cash returns, bond returns, stock market performance, and/or the like) and user 101 data (e.g., risk tolerance, amount and timing of goals, resources available to set aside toward goals, and/or the like).

Based upon the outcomes of the stochastic modeling module 111 and other inputs, a stochastic determination is made and a customized proposed situation portfolio is delivered to user 101. User 101 has the ability to propose specific implementation recommendation adjustments in an effort to match the current situation with the proposed situation portfolio. The proposed situation portfolio may use stochastic modeling module 111 to rerun its analysis and generate an updated stochastic determination, as well as supplemental or updated proposed situation portfolio information. Server 105 provides user 101 with the ability to present information using either stochastic modeling and/or deterministic illustrations in the proposal. As such, user 101 can determine how best to illustrate financial planning concepts or analyze financial planning needs to server 105, and using a stochastic modeling approach allows user 101 a method to communicate his or her needs to server 105.

Server 105 provides for stochastic modeling via stochastic modeling module 111 to illustrate the probability of financial success after review of at least one of user's 101 data, user's 101 goals, user's 101 goal assumptions, savings, asset base, insurance policies, historical data, and/or the like. Stochastic modeling module 111 is in communication with portfolio integration module 107 and portfolio reconciler module 109 for using data from at least one of portfolio integration module 107 and portfolio reconciler module 109 in a stochastic modeling analysis to facilitate creation of a proposed situation portfolio and other planning strategies for user 101. Since it is difficult to predict performance of stock markets or investments for the future, it is helpful to use probability modeling to help account for future uncertainty.

Stochastic modeling module 111 uses a sampling methodology of historical data. Historical data includes inflation rates, rates of return (stock returns, interest rates, and/or the like), T-bill rates, and/or any other information relevant to calculating financial information for user 101. Stochastic modeling module 111 maintains the auto-correlation behavior of inflation (e.g., the modeling of inflation is likely more similar from one period to the next as opposed to moving randomly and erratically) via a synchronous stationary bootstrap sampling method. For example, such modeling is more realistic in that inflation usually goes from 3.5% to 3.7% to 3.6% than 3.5% to 8.5% to 1.5% over a sample 3-year period. Other techniques assume a fixed and constant rate of inflation or model inflation randomly (e.g., 3.5% to 8.5% to 1.5% over a sample 3-year period). Often these techniques force all of the rich information in the historical data to be compressed into three data points: return, variance, and correlation. Unlike such rigid techniques, stochastic modeling module 111 can maintain more information and better simulate the actual behavior of investments relative to each other (e.g., in a market correction, when assets tend to all go down together) and lag effects of inflation on interest rates.

In one exemplary embodiment of the present invention, stochastic modeling module 111 uses a stationary bootstrap sampling method of stochastic modeling analysis in sampling the historical data. The stationary bootstrap method uses rates of return, for example, to generate random periods of time (each of which has a rate of return). The stationary bootstrap method randomly selects a starting period in time to draw from, repeats this process, generates a length of time (e.g., one month) from which the period will be extended from, selects another starting period, grabs the specific data points in that period from all indexes in the data set synchronously (e.g., simultaneously), and generates a "P" number. The P number is the length of time of one continuous strip of data and includes the number of periods used in one simulation run of stochastic modeling module 111. For example, the P number can be a period of time (e.g., 40 months) for an economic business period, or any other designation. Data may be sampled synchronously from the relevant economic business periods, pasted together in a sample set of data, and repeated for any type of projected period (e.g., amount of time desired, such as average lifetime, disability time, long-term care time, and/or the like). This sample set of data may be generated for more than one data set at a time, which provides synchronous stationary bootstrap data sampling. For example, a sample data set may represent an average length of an economic business cycle. Synchronous data sampling uses convergence techniques (e.g., a geometric distribution) to calculate accurate rates of return, inflation rates (e.g., serial correlation of inflation), and other such data. Synchronous data sampling leverages information from sample sets of data and extrapolates such information to create larger sets of data over a period of time (e.g., a selected economic business cycle, financial futures, and/or the like). Synchronous data sampling aids in maintaining the integrity and richness of information in the historical data (e.g., effects of change in bond returns over the next several years) in order to provide more accurate rates of return, inflation rates, and other such data. See Dimitris N. Politis & Joseph P. Romano, *The Stationary Bootstrap*, Journal of the American Statistical Association, 1303-1313, Volume 89, Issue 428 (December 1994), which is hereby incorporated by reference.

In one exemplary embodiment of the present invention, estimating the p-value in a stationary bootstrap method uses sample results in measuring stability of portfolio performance. Stationarity includes a quality of a process in which the statistical parameters of the process do not substantially change with time. One aspect of a stationary process is that the autocorrelation depends on lag alone and does not change with the time at which it was calculated. Analogies between auto correlated data and independent observations are also described. The stochastic processes in simulation experiments are usually auto correlated and consequently the time series or sample records they generate usually are not analyzed by traditional statistical methods that apply to independent observations. One way to reduce or eliminate autocorrelation is to perform transformations on the original time series. Traditional analysis is then applied assuming the transformed observations are uncorrelated. However, this procedure discards a considerable amount of valuable information about the behavior of a process and that the transformed time series may be inappropriate for comparison purposes. An alternative method is suggested for studying time series by exploiting the autocorrelations rather than eliminating them. The approach centers on estimating standard errors of the bootstrapped sample means for the original series (e.g., for stocks, bonds, cash and inflation) and comparing these statistics for several independent bootstraps.

In performing two bootstraps for the same length of simulated time, there is no reason to expect that the statistical quality of the two resulting time series or sample records will be the same. Suppose that the process being observed has the same variance but is more auto correlated in one experiment than in the other, then the more auto correlated process will generally show fewer changes in value during a given time than the other will. With fewer changes, there is less fluctuation around the mean of the process, and consequently, it is not expected that stochastic modeling module 111 can obtain as good an estimate of the mean for the process with higher correlation as is for the other. This brings up the problem how to determine stability of the sample mean of an auto correlated process so that the dependence structure in the historical series is maintained in the bootstrap samples. Simple random sampling is usually not appropriate since it destroys any dependence in the series.

Accordingly, it is desirable to introduce a resampling procedure called the stationary bootstrap. The procedure is based on resampling blocks of random length, where the length of each block has geometric distribution. The average length of these blocks is 1/p and this quantity plays a similar role as the parameter b in the moving block method. Although the stationary bootstrap estimate of standard error is less sensitive to the choice of p than the moving blocks bootstrap method is to the choice of b, it is desirable to have an educated guess based on studying the data more deeply. The selection of the p value includes choosing a block size, which involves a tradeoff. As the block size becomes too small, the bootstrap destroys the time dependency of the data and its average accuracy will decline. As the block size becomes too large, there are few blocks and pseudo-data will tend to look alike. As a result, the average accuracy of the bootstrap also will decline. This suggests that there exists an optimal block size, which maximizes accuracy.

The standard error of the sample mean computed from a set of independent observations is inversely proportional to 1/p. This is not true for auto correlated data. However, for a sufficiently small p-value, the standard deviation of the sample mean for auto correlated data is inversely proportional to a fraction number of observations. This fractional number depends on the autocorrelation of the process. Using the correlation time together with the observation interval, the number of independent observations contained in auto correlated time series can be defined. Comparing these measures for two auto correlated samples allows the drawing of inferences about the relative stability of their sample means (as can be done with independent observations).

Figure 4:
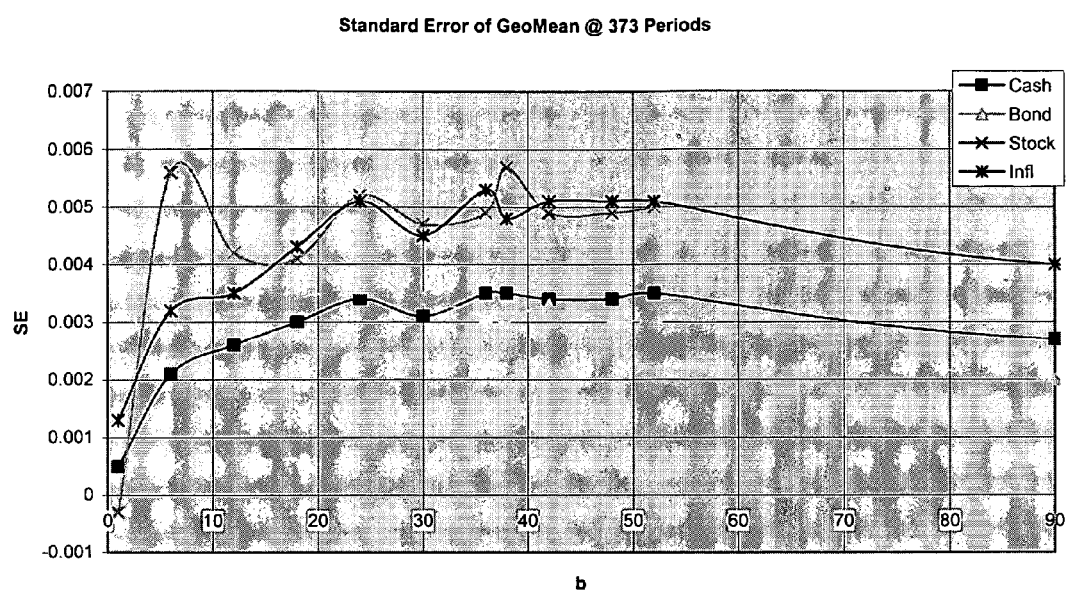
FIG. 4 illustrates the bootstrapped estimate of the samples' geometric mean standard errors as functions of block size 1/p.
Figure 5:
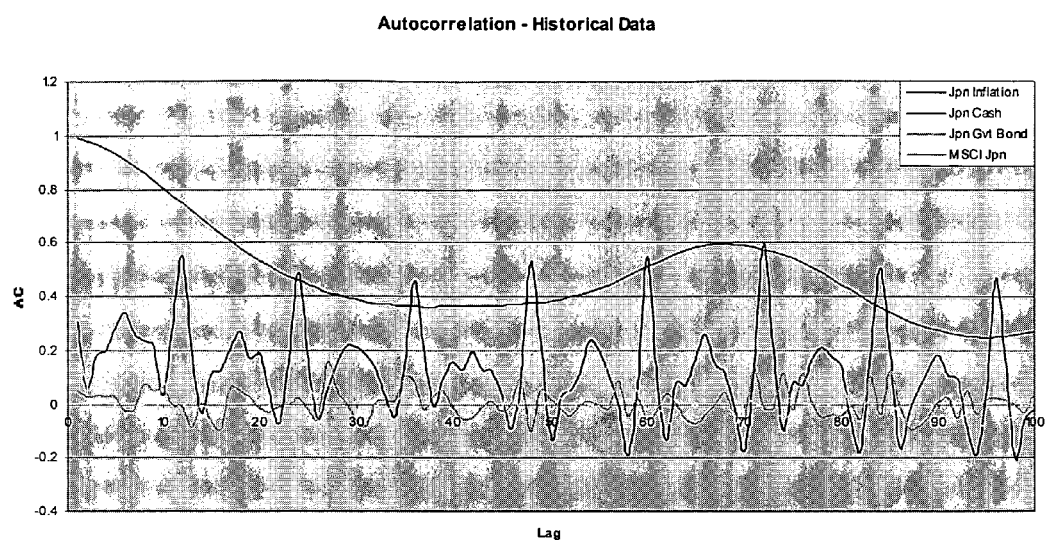
FIG. 5 illustrates the cyclical behavior of Japanese inflation within a period of about 12 months.
Figure 6:
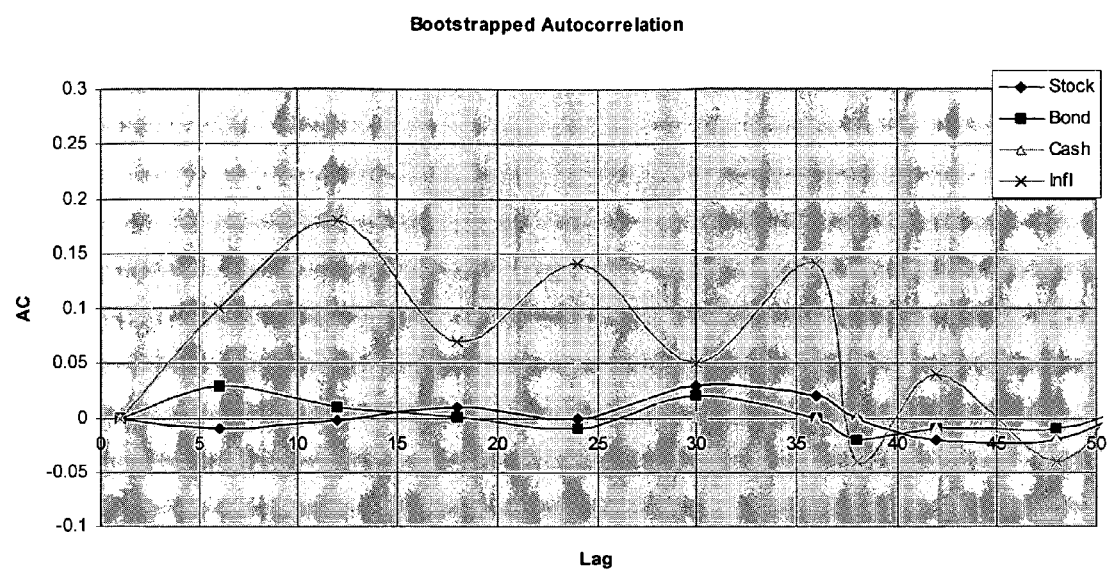
FIG. 6 illustrates the bootstrapped autocorrelation estimate for Japanese inflation.
Figure 7:
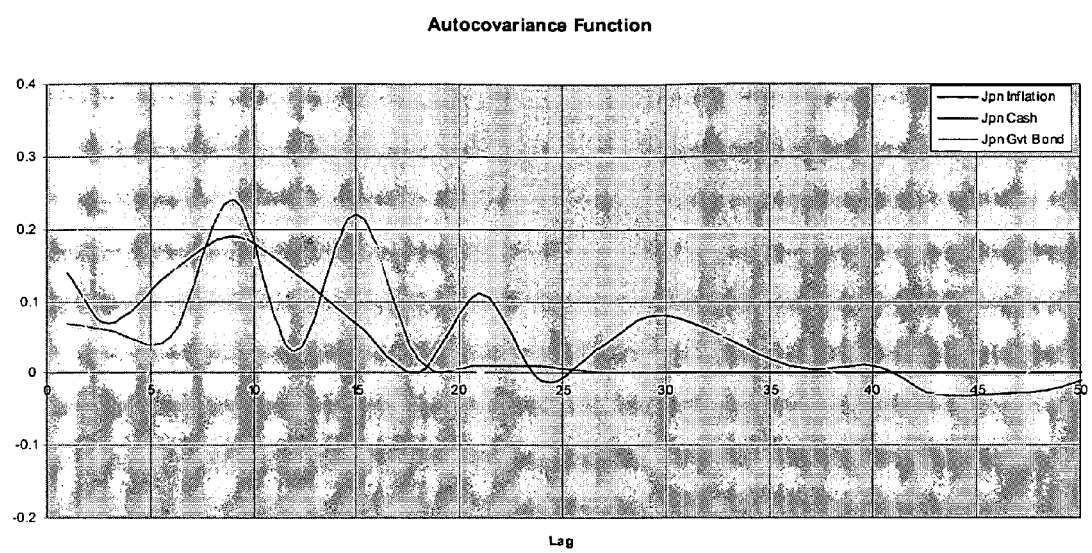
FIG. 7 illustrates the bootstrapped auto covariance estimate for Japanese inflation.

Based on historical observations of, for example, Japanese stock, bond, cash monthly returns, and inflation, FIG. 4 illustrates the bootstrapped estimate of the samples' geometric mean standard errors as functions of block size 1/p. As the 1/p increases, the corresponding estimate of the standard error initially increases, remains fairly constant, and then decreases. Improved resolution accounts for the initial increase and stabilization, whereas the increasing influence of bias is responsible for the eventual decline. The estimates do appear to stabilize for 1/p between 25 and 50, the decline for greater 1/p introduces skepticism. The following autocorrelation plots illustrated in FIG. 5 reveal more about the randomness of such data sets for if random autocorrelations are near zero for any and all time-lag separations, and if non-random autocorrelations then one or more of the autocorrelations is significantly non-zero. FIG. 5 illustrates the cyclical behavior of Japanese inflation within a period of about 12 months. In this manner, it would be advisable to let 1/p be of the order of two or three cycles to allow for cancellations to take place. In one example, it would be advisable to take 1/p not lower than 38. The bootstrapped autocorrelation estimate for Japanese inflation is illustrated in FIG. 6. After the first three spikes the autocorrelation becomes close to zero for lags greater than 38. FIGS. 6 and 7 also reveal high autocorrelation of cash. In this example, the comparison of the auto covariance structure offers more insights into the true nature of the process. For 1/p greater than 38, the autocorrelation properties of the original data are not significantly eliminated by bootstrap. This leads to an acceptable choice of 1/p not lower than 38. Thus, in this example, it is desirable to avoid underestimating the variance of stock returns in portfolio performance analysis, so that it is advisable to choose 1/p equal to 38.

Thus, an example for estimating p-value in stationary bootstrap has been provided. The example assumes the input data is stationary. However, non-stationary data can also be used to provide a non-stationary bootstrap method. See Dimitris N. Politis, Joseph P. Romano (1994), The Stationary Bootstrap, Journal of the American Statistical Association, Volume 89, Issue 428, 1303-1313; Russell Davidson & James G. MacKinnon, Bootstrap Tests: Size and Power of Bootstrap Tests, Working Paper, Department of Economics, Queen's University, Kingston, Ontario, Canada; Maurice R. Masliah, Stationarity/Nonstationarity Identification; James G. MacKinnon (1999), Bootstrap Testing in Econometrics, Working Paper Presented at the CEA Annual Meeting; Pin-Huang Chou (1996), Using Bootstrap to test Mean-Variance Efficiency of a Given Portfolio, Working Paper, Department of Finance, National Central University Chung Li, Taiwan; Donald W. K. Andrews & Moshe Buchinsky (1998), Evaluation of a Tree-step Method of Choosing the Number of Bootstrap Repetitions. Working Paper, Cowles Foundation for Research in Economics, Yale University; and Blake LeBaron & Andreas S. Weigend, A Bootstrap Evaluation of the Effect of Data Splitting on Financial Time Series, Working Paper IS-97-013, Leonard N. Stem School of Business, New York University; all of which are hereby incorporated by reference.

The information from the synchronous stationary bootstrap method may be used in a stochastic modeling analysis to estimate user's 101 percentage of likelihood of achieving financial success. For example, many iterations of a lifetime simulation for user 101 can be run (e.g., 6750 iterations) returning either a successful or unsuccessful lifetime simulation. Such a binomial technique can return a successful run if user 101 has a predetermined amount of money or assets at the end of a lifetime simulation (otherwise returning an unsuccessful run). Stochastic modeling module 111 calculates user's 101 chance of achieving financial success using stochastic modeling of, for example, at least any or all of the following: rates of return, inflation rates, specific goals (e.g., education, accumulation, and/or the like), lifetime cash flow with integration of some or all goals, potential disability and/or need for a long-term care and/or death, and/or the like. As such, server 105 does not only address the probability of achieving financial success during retirement, but also considers various scenarios (e.g., long-term care, disability, early death, and/or the like). Stochastic modeling module 111 mimics actual behavior of relevant factors (inflation, rates of return, and/or the like) and allows all assets to be available to fund goals. In this way, if user 101 has too much for one goal, then the excess assets can be applied to another goal. If, for example, user 101 has a shortage of assets, then user 101 can use other assets. Also, user 101 may take out loans for goals that user 101 will pay back with excess income. Stochastic modeling module 111 can model a loan when assets are depleted before retirement, such that a loan balance is created, interest is accrued based on the level of inflation and a risk premium, and savings are applied to paying the loan off. When the loan is paid off, savings are applied to the investment portfolios.

Thus, stochastic modeling module 111 aids in forecasting the effects of various conditions and scenarios on the current situation. Stochastic modeling module 111 allows user 101 to forecast the effects of his or her goals and decisions on thousands of financial situations and provide a likelihood of success for each. In this manner, stochastic modeling module 111 allows user 101 to analyze the effects of his or her decisions on the likelihood of achieving his or her goals by aggregating the results of thousands of possible economic scenarios applied to various situations.

In order to further illustrate stochastic modeling module 111, an exemplary illustration of one embodiment of stochastic modeling module 111 is attached as Appendix C, which is hereby incorporated by reference.

Thus, system 100 analyzes the data to facilitate creating and presenting advice to user 101 and also automates the functions performed by financial advisor 103. Server 105 integrates user's 101 goals, assets, savings, and risk tolerance into customized proposed situation portfolio via portfolio integration module 107. Server 105 uses the proposed situation portfolio to develop specific investments to fulfill those strategies via portfolio reconciler module 109. Server 105 uses a stochastic sampling methodology of historical data to develop the probability of financial success after review of user's 101 data, user's 101 goals, user's 101 assets and savings, various assumptions, and historical data via stochastic modeling module 111.

User 101 can quickly provide personalized, high-quality, financial data to system 100 and receive quick financial advice. After user 101 enters the data, system 100 generates advice that is specifically tailored for user 101. The advice is developed via a system of rules that automatically create and present the advice to user 101. In one exemplary embodiment, the advice includes observations, strategies, and recommendations for the proposed situation portfolio. Each observation, strategy, and recommendation has various aspects (e.g., logic associated with the financial advice analysis and text associated with the output to user 101). See U.S. Ser. No. 09/712,743, entitled "System and Method For Creating Financial Advice Applications" and filed Nov. 14, 2000; U.S. Ser. No. 09/731,163, entitled "System and Method For Evaluating Work Product" and filed Dec. 6, 2000; and U.S. Ser. No. 09/141,013, entitled "Computer-Implemented Program For Planning and Advice System" and filed Aug. 26, 1998; all of which are hereby incorporated by reference in their entireties.

The following data may be used by server 105, in whole or in part, to generate advice for user 101: data entered by the user, calculations preformed by portfolio integration module 107, portfolio reconciler module 109, stochastic modeling module 111, and simulator module 113, and placement of the stochastic results generated by server 105 on a scale (e.g., probability of meeting a goal, percentage of likelihood of success, and/or the like). For example, probabilities and percentages may be valued as follows: 0%-49% indicates a low probability of success in achieving user's 101 selected goals; 50%-74% indicates a moderate probability of success in achieving user's 101 selected goals; and 75% or more indicates a high probability of success in achieving user's 101 selected goals. The probability of success may be calculated by dividing the number of projections where at least one dollar of assets remained (e.g., at the time of retirement, at the time of death, or any other relevant time) by the total number of projections simulated. There are numerous options available to help improve the likelihood of meeting user's 101 selected goals: reduce the amount of goals, delay the start date of goals, save more toward goals, reposition your investment assets, and/or the like. These probabilities and percentages and options may be re-defined by system 100 as desired.

In one exemplary embodiment of the present invention, server 105 uses various formulas for calculating each projection's cash flow and asset level which are aggregated into the probability of meeting a goal, percentage of likelihood of success, and/or the like. Some considerations include analysis of income, liabilities, assets, living expenses (e.g., income minus liabilities, savings, insurance premiums, taxes, and/or the like), and various scenarios (normal lifespan, disability, early death, retirement, and/or the like). Depending on the needs of system 100, analysis of such information may be broad (e.g., one value for liabilities) or detailed (e.g., specific breakdowns of each liability, such as house payment, car payment, student loans, etc.). Such flexibility of system 100 allows for wide usage of system 100 to many different applications.

Various information (e.g., text) in the form of advice may be presented to user 101 in the form of a proposal of the proposed situation portfolio. In one exemplary embodiment, there are three forms of advice: observations, strategies, and recommendations. Observations include statements that primarily discuss user's 101 current situation, such as, for example, current non-contribution to a retirement savings plan. Exemplary observations for user 101 from server 105 may include: the additional money you committed to reach your financial goals should enable you to increase the likelihood of success; you have allocated 2% of your total income to savings; although you are currently saving, the amount you are saving is below the national average; savings are an important step in helping you to successfully meet your financial goals; approximately 40% of your total income is being used to pay your liabilities; you should focus your attention on managing your debt; your earned income is the predominant source of income for maintaining your current lifestyle; currently, earned income makes up 98% of your total income; our federal marginal tax bracket is 28% and your effective tax rate is 12%; it appears that you are not maximizing your retirement plan contributions; it appears that you have done a good job of utilizing deductions to manage your income tax liability; and/or the like.

Strategies include a discussion of what user 101 can do to meet the selected financial goals, such as, for example, give consideration to investing savings in a Roth IRA. Recommendations are derived from the strategies and include the specific action steps that user 101 may take to reach its financial goals, such as, for example, give consideration to investing a specific amount in a specific mutual fund. The timing of investment and need for liquid assets may also be considered. Each observation, strategy, and recommendation can also include variable text that further personalizes the advice for user's 101 financial situation. Some examples of variable text include: user's 101 name, names of products recommended, probabilities, dollar amounts needed to meet goals, and/or the like.

In an exemplary embodiment of the present invention, server 105 may categorize each observation, strategy, and/or recommendation into subcategories, such as required, recommended, or optional, for example. The purpose of these subcategories is to help speed up the preparation of advice (e.g., paragraph selection of text process) for user 101. A required observation, strategy, and/or recommendation is usually included in user's 101 proposal and helps ensure that the proposals are legally compliant. An example is advice pertaining to a strategy user 101 is considering (e.g., changes to the portfolio, increased retirement age, add disability, LTC or life insurance, etc.). A recommended observation, strategy, and/or recommendation is based on the data and the simulated results from server 105 which best suits user 101. This advice is presented to user 101 optionally, so that if user 101 prefers not to use the advice, user 101 may refuse the advice. An optional observation, strategy, and/or recommendation is based on the data and the simulated results from server 105, which may apply to user 101. However, server 105 does not have enough information to "recommend" it. This advice is presented to user 101 optionally, so that if user 101 prefers to use the advice, user 101 may request the advice. Thus, this categorization allows user 101 to easily identify what advice will be included in the proposed situation portfolio.

If user 101 wishes, the selection process can be bypassed by simply printing the proposed situation portfolio. In one exemplary embodiment, all "required" and "recommended" advice is included. This presents user 101 with a financial portfolio proposal that provides accurate, personalized advice for user 101 that complies with legal standards. Furthermore, by filtering out extraneous advice and providing individualized, legally compliant, quality financial advice to user 101, server 105 frees up user's 101 time, so that he or she can concentrate on other tasks and spend time on more complex issues. This advice may be fully editable text.

Simulator Module

Either as a part of server 105 or separate from server 105, simulator module 113 uses the data to simulate, monitor, design, and test system 100 or parts thereof (e.g., server 105, portfolio integration module 107, portfolio reconciler module 109, and stochastic modeling module 111) including recommendations for improvements to system 100 and the effects of changes. Simulator module 113 substantially mimics the operation of server 105 including portfolio integration module 107, portfolio reconciler module 109, and stochastic modeling module 111. Simulator module 113 can be in communication with portfolio integration module 107 and stochastic modeling module 111 for testing, designing, replicating, and monitoring system 100. Such testing, designing, replicating, and monitoring of system 100 can be over a predetermined amount of time (e.g., a normal lifespan, a disability lifespan, an early death lifespan, and/or the like). For example, simulator module 113 can assess changes in financial planning assumptions, tax laws, other laws and regulations, and other developments, and integrate these changes into the proposed situation portfolio.

In an exemplary embodiment of the present invention, simulator module 113 may use one or more spreadsheets (e.g., Excel®) to mimic server 105. For example, simulator module 113 obtains data in connection with user 101 from server 105 via a log file of data from server 105. Simulator module 113 can access the log file by using an address (e.g., web address) associated with server 105 to identify the data and copy it to simulator module 113. The log file may include data input by user 101, market and economic projections, cash flow from various scenarios, and descriptions of the data fields in the log file. The data is copied to simulator module 113 and configured so that it may be further analyzed by simulator module 113.

Simulator module 113 uses the data to determine whether there are programming errors in server 105, which helps to validate the data. For example, simulator module 113 uses the data to calculate income, future income, liabilities, expenses, and assets and compares these calculations to the same results from server 105. This form of calculation tests whether errors have been programmed into server 105 and/or whether server 105 otherwise contains errors.

Simulator module 113 uses the data to calculate the probability of meeting a goal, percentage of likelihood of success, and/or the like to further test system 100. Such calculations can include an array of spreadsheets analyzing various data. For example, probabilities and percentages may be valued to mimic values from server 105 (e.g., 0%-49% indicates a low probability of success in achieving user's 101 selected goals; 50%-74% indicates a moderate probability of success in achieving user's 101 selected goals; and 75% or more indicates a high probability of success in achieving user's 101 selected goals). In one exemplary embodiment, simulator module 113 uses various spreadsheets of calculations (e.g., master data spreadsheet, insurance spreadsheet, Social Security/social pension, social pension spreadsheet, historical data spreadsheet, returns spreadsheet, forecasting spreadsheet, portfolio spreadsheet, testing spreadsheet, statistical spreadsheet, scenario spreadsheet, and/or the like) to analyze the data. For example, random rates of return, non-qualified assets, qualified assets, savings, lifetime goals may be used in the analysis and calculations.

Simulator module 113 can use historical portfolio data and at least one of user's 101 financial decisions, investment strategy, present cash flow, future cash flow, and goals in order to facilitate forecasting the effects of the proposed situation portfolio on user's 101 portfolio, decisions, combination of decisions, investments, policies, and/or the like. Cash flow can include at least one of income, savings, liabilities, insurance premiums, living expenses, medical expenses, inheritance, government assistance, assets, and/or the like. In addition, simulator module 113 can forecast effects based on at least one of a country's current economic data, a country's historical economic data, current world economic data, and historical world economic data.

In an exemplary embodiment, simulator module 113 can analyze many iterations of calculating such values. Simulator module 113 can use decision analysis and risk analysis products to help analyze the data, such as Crystal Ball®b by Decisioneering® of Denver, Colo. A product such as Crystal Ball® can use the data including any formulas provided by simulator module 113 to run iterations for analyzing the data. In one exemplary embodiment, simulator module 113 uses 6750 iterations of data calculations using Crystal Ball® in order to calculate the probability of meeting a goal, percentage of likelihood of success, and/or the like. Any number of iterations may be used depending on the needs of system 100. If such calculations are compared to the results of system 100 and are within a statistically predetermined amount (e.g., within 2%), then system 100 is assumed to be functioning properly. Such a predetermined amount may be set to any value (any percentage rate, another quantified value, and/or the like) depending on the needs of system 100.

Simulator module 113 can use data, such as historic or current rates of return, inflation rates, and estimated rates of return and inflation rates, to calculate the probability of meeting a goal, percentage of likelihood of success, and/or the like. If the probabilities and percentages calculated from simulator module 113 are compared to the probabilities and percentages calculated from server 105 and they correlate within a predetermined amount (e.g., within 2%), then simulator module 113 can project a properly functioning system 100. Such a predetermined amount can be varied depending on the needs (e.g., accuracy desired) of system 100.

Simulator module 113 may generate a master set of data for user 101 and then analyze that data depending on a number of predetermined scenarios. The different scenarios may represent various circumstances that user 101 may face in a lifetime that may affect user's 101 finances. For example, the master set of data may be analyzed for a normal life expectancy of user 101 and family members, disability of user 101 or family members, long-term care for user 101 or family members, early or unexpected death of user 101 or family members, and/or the like. The master data may be used to generate a spreadsheet of information for each scenario for each of the current situation and the proposed situation portfolio. The flexibility of simulator module 113 allows for analysis of such scenarios in order to better mimic server 105.

Figure 2:
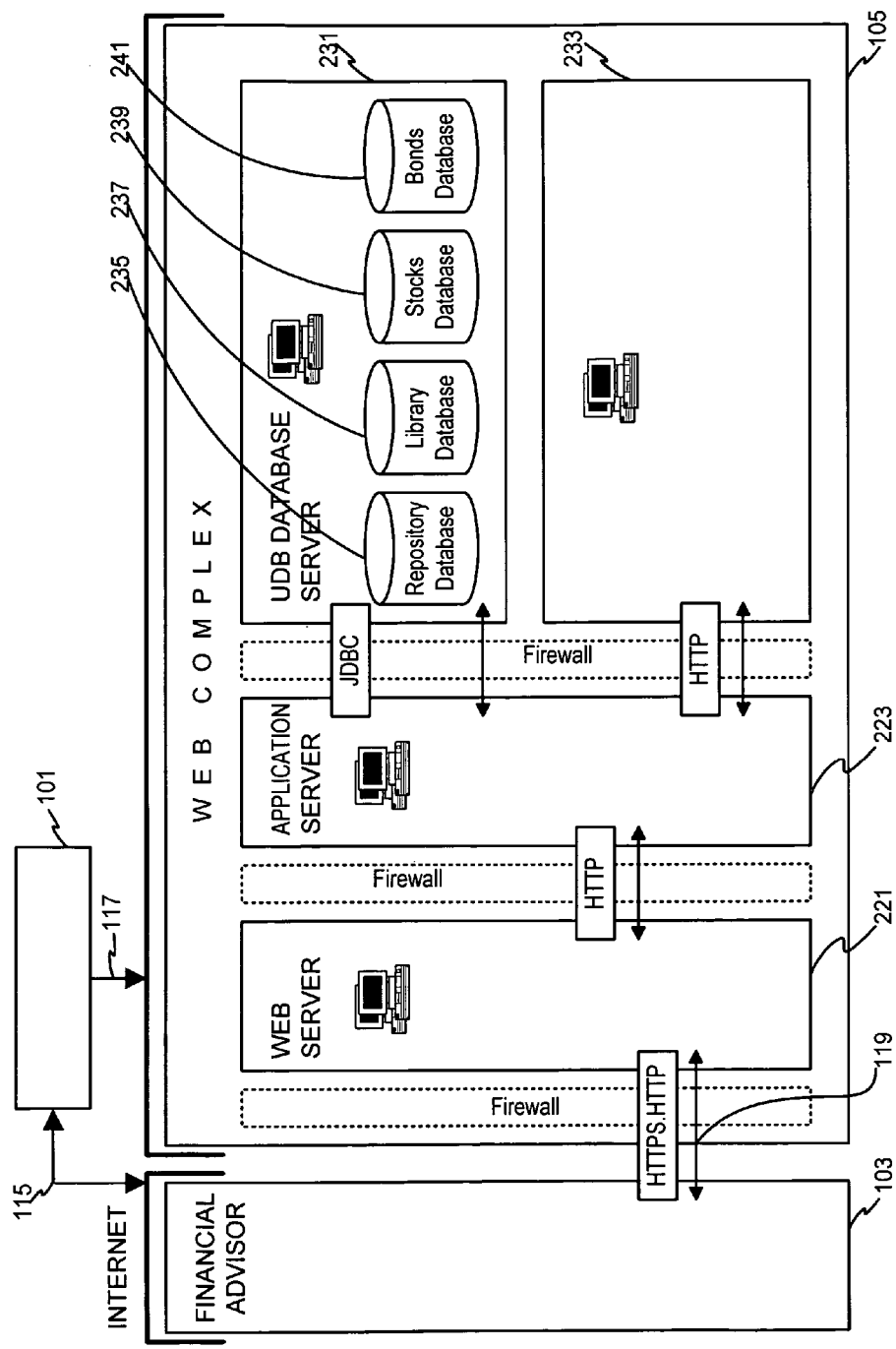
FIG. 2 is a block diagram of a more detailed system for facilitating financial planning and advising for a user in accordance with an exemplary embodiment of the present invention.
Figure 3:
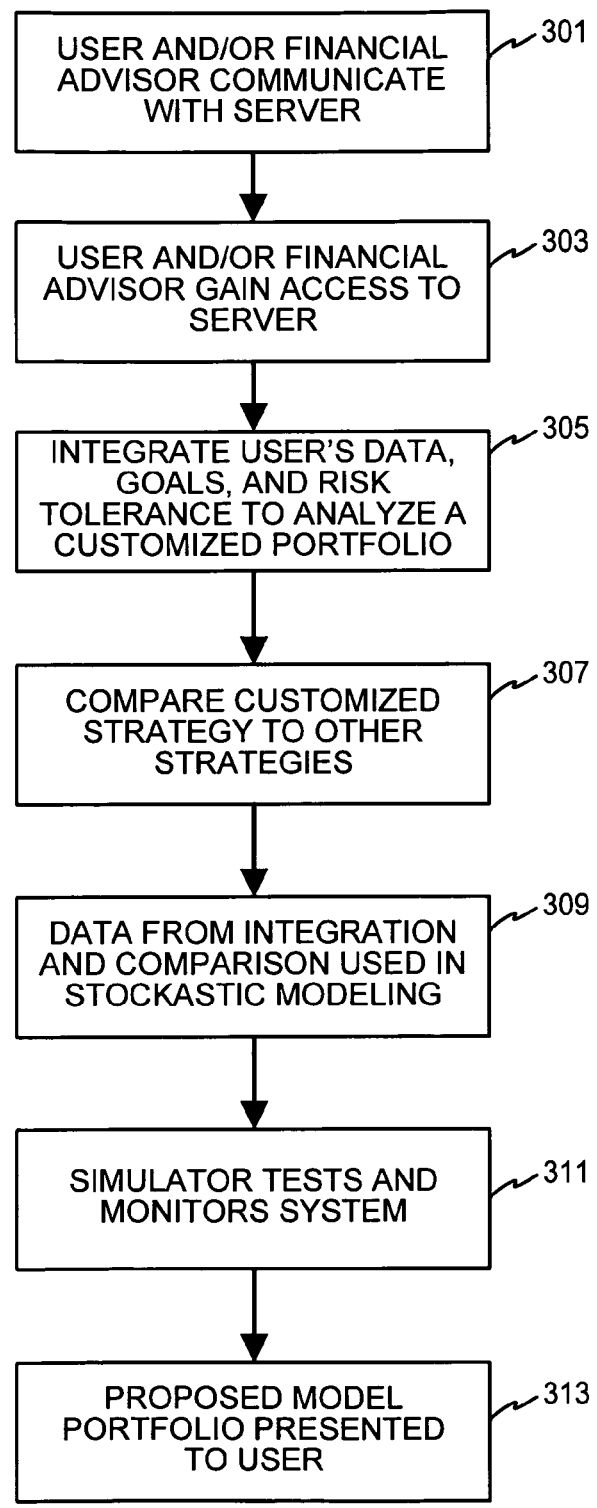
FIG. 3 is a flowchart of a method for facilitating financial planning and advising for a user in accordance with an exemplary embodiment of the present invention.

Various embodiments of system 100 are illustrated in FIGS. 2 and 3 in accordance with exemplary embodiments of the present invention. FIG. 2 illustrates system 100 in association with having a secure session between user 101, financial advisor 103, and server 105 in accordance with an exemplary embodiment of the present invention. Further to FIG. 1, FIG. 2 includes an internet web server 221 in communication with financial advisor 103 via communication channel 119. Communication 119 includes a firewall and uses, for example, http or https, a WAN, a LAN, a VPN tunnel, and/or the like, for communication. For example, internet web server 221 can be in association with a secure server (e.g., American Express®) requiring a user ID and password for authentication for access. The secure session can be logged in and out by user 101 or timed out automatically. In this way, all data is stored in a trusted domain of internet web server 221 and encrypted when transmitted outside internet web server 221.

FIG. 2 further illustrates aspects of the exemplary secure session. Financial advisor 103 begins a session with user 101 and server 105 via communication channels 115, 117, and 119. Financial advisor 103 begins a web session (e.g., receives signed JARs) for a user interface of server 105. Financial advisor 103 and/or user 101 may need a user ID and password in order to gain access to internet web server 221 and begin a session. Submission of a user ID and password by financial advisor 103 and/or user 101 includes server 105 verifying the user ID and password. Server 105 uses any verification system in order to verify the user ID and password. The secure session may use any encryption method to validate or authenticate financial advisor 103 and/or user 101. If user 101 is not a new user, then financial advisor 103 retrieves the case file for user 101 from server 105. After retrieving user's 101 case file from server 105, financial advisor 103 and/or user 101 can update the personal, financial, risk tolerance, goal, and other data in association with user 101.

System 100 may run simulations and calculations using further information from an application server 223 in communication with UDB database server 231 and server 233. UDB database server 231 includes a repository database 235, a library database 237, a stocks database 239, and a bonds database 241. Repository database 235 stores data user 101 submitted to server 105. Library database 237, stocks database 239, and bonds database 241 store various information (e.g., Securities and Exchange Commission information, bond returns and information, Social Security/social pension, social pension information, tax accounting and planning information, laws and regulations, and/or the like) used in calculations by server 105. Application server 223 includes portfolio integration module 107, portfolio reconciler module 109, stochastic modeling module 111, and simulator module 113. Application server 223 uses further information from UDB database server 231 and server 233 to analyze data and create a proposed situation portfolio for user 101.

Financial advisor 103 initially reviews, reconciles, selects further data to be analyzed in connection with the proposed situation portfolio for user 101. Financial advisor 103 can reallocate user's 101 assets to attempt to meet user's 101 goals. The data is formatted and compiled into XML format, which is further converted into a PDF (Portable Document Format) document via the Arbor Text document rendering software. After such conversion and configuration, the data is presented to user 101 in the form of a proposed situation portfolio (e.g., via Adobe® Acrobat®).

FIG. 3 is a flowchart of a method for facilitating financial advising and planning for user 101 in accordance with an exemplary embodiment of the present invention. Although FIG. 3 illustrates a series of method steps, it will be realized that the order of particular steps may be altered and/or other steps may be omitted altogether while still attaining the same or a similar result. In one exemplary embodiment of FIG. 3, user 101 and/or financial advisor 103 communicate with server 105 (step 301). For example, user 101 and/or financial advisor 103 opens a web browser and enters a URL for accessing server 105. A web page is returned with a link to a JNLP file (e.g., for defining JARs to download and starting web session). User 101 clicks the JNLP link and server 105 returns a mime type JNLP, and the operating system may dispatch a web start to handle such a mime type. The web start checks the version of the JRE (Java Run-time Environment) and all the jars in the JNLP check whether they have been downloaded to user 101 and/or financial advisor 105. Any jars that are not downloaded cache.

User 101 and/or financial advisor 103 gain access to server 105 (step 303). User 101 and financial advisor 103 enter user IDs and passwords into server 105 (e.g., a security service may check such credentials). Once credentials are verified, the security service returns a cookie to server 105 verifying the same. Server 105 begins a session with user 101 and financial advisor 103.

User's 101 data, goals, and risk tolerance are integrated in analyzing a customized strategy for financial portfolio planning of user 101 (305). User 101 enters data into application server 223 via financial advisor 103 and/or web server 221. The data is periodically stored in repository server 235, which also uses the log file described in FIG. 1. Server 223 analyzes the data as described in connection with server 105 in FIGS. 1 and 2. The customized strategy is compared to at least one of other strategies and projected financial decisions in order to further facilitate the financial portfolio planning of user 101 (step 307). Application server 223 analyzes the results from the customized situation portfolio and compares these results to the results from at least one of the other strategies and projected financial decisions from repository server 235.

The data from the integration is used and compared in a stochastic modeling analysis to facilitate creation of a proposed situation portfolio for user 101 (step 309). Application server 223 analyzes the data as described in connection with server 105. Simulator module 113 mimics the operation of portfolio integration module 107, portfolio reconciler module 109, and stochastic modeling module 111 in order to test and monitor system 100 (step 311). Data may be accessed via application server 223 via web server 221. Finally, a proposed situation portfolio is presented to user 101 outlining various scenarios and recommendations for financial strategies for each (step 313).

In accordance with one embodiment, an individual investor may be combined into an economic group with investors sharing similar goals and economic factors. The portfolio integration module 107 includes a goals and assumptions identifier, which is used to input and associate a group goal and a group assumption with economic group data. The portfolio integration module 107 simulates a passage of time for the group in order to analyze the economic group's available financial resources with respect to fulfilling the group goal based upon the group assumption and processing a financial position for an economic group based upon an analysis of the available financial resources and in response to a hypothetical event and/or transaction. The portfolio integration module 107 further obtains demographic data and financial data pertaining to the economic group in order to analyze and solve the group goal in an efficient order while accounting for any dependency of future goals, based on prior goals and in accordance with the group assumption, the demographic data, and the financial data.

Other exemplary embodiments of the present invention include further assumptions. System assumptions for asset allocation and growth rates include the asset growth rates vary annually and are based on historical returns for cash, bonds, and stocks; asset growth rates for a current situation are based on current investment portfolio data; asset growth rates for the proposed situation are based on a proposed situation portfolio based on risk tolerance and the amount and timing of goals; investment portfolio (current and proposed) is adjusted annually to restore asset class weightings to their designated percentages; asset growth rates are not based on the performance of specific investment products; all persons included in this analysis who have wages that are subject to FICA or self-employment tax are fully insured and can receive full benefits; and/or the like. Omission of any assets or insurance policies in the analysis could lead to inaccuracies or distortions that would diminish its accuracy.

System assumptions for inflation include the inflation rate varies annually and is based on historical inflation rates and economic conditions in the relevant country(s); living expenses grow annually at the inflation rate (or an appropriate multiple thereof); Social Security/social pension, social pension benefits grow annually at about half the inflation rate; and/or the like.

System assumptions for taxes include, for example, income during the simulations is taxed at an average tax rate; Social Security/social pension benefits are assumed to be 50% taxable; all Social Security/social pension calculations are based on yearly intervals, regardless of actual Social Security/social pension rules; and/or the like. Time estimates of federal income tax liability assumes no carryover from previous years other than those provided. Rules exclusive to capital loss limitations and passive losses are not considered. Income taxes are calculated by applying an average tax rate to the sum of all taxable income amounts. Suggestions involving income, estate, or gift tax consequences are based on federal tax law. If user 101 is not currently receiving retirement Social Security/social pension, but indicated that he or she expects to in the future, then this analysis uses an estimate of user's 101 future retirement Social Security/social pension benefits. For example, user 101 may have provided such an estimate from his or her statement of benefits from the Social Security/social pension Administration, which is based on user's 101 actual earnings history. Otherwise, an estimate is calculated (using the Social Security/social pension Administration's methodology), which makes assumptions about user's 101 past earnings based on this year's income.

System assumptions for disability include, for example, analysis between the ages of 18 and 60 years old and earnings or self-employment income greater than $18,000 per year. If included, the disability analysis assumes that user 101 will be disabled for the first twelve years of the projection or until retirement if earlier.

System assumptions for long-term care include, for example, long-term analysis if user 101 is between the ages of 40 and 84. If included, the long-term analysis assumes that user 101 will require long-term care for the last six years of life.

System assumptions for survivor information include, for example, life expectancy of survivors of user 101 (if applicable) to determine the projection period; benefits for surviving spouses will begin immediately or at the time survivor is 60 years old (whichever is later); survivor benefits for children under age 18 years old will begin immediately; additional life insurance death benefits are not included in the decedent's estate, but do become additional investment capital for the survivor (if applicable); funeral costs are assumed to be $10,000 at death; administrative expenses are assumed to be 5% of the probate estate; income tax ramifications of withdrawals from qualified plans at death, either to pay estate settlement costs or when such assets are distributed to non-spousal heirs, are not taken into account; and/or the like. For example, whole and universal life policy cash values and premiums may be available after savings are depleted, VUL policy cash values and premiums may be available after whole and universal life polices are depleted, and consumers may spend their tax-deferred retirement assets last in order to leverage the advantages of tax-deferred growth.

System assumptions for success include, for example, having a positive investment balance (e.g., at least $1 of investment assets left at the end of the simulation (e.g., end of lifetime)); if goals occurring prior to retirement deplete investment assets, server 105 can simulate user 101 taking out a loan and directing future savings to the loan until it is paid off; simulations indicate past or future investment performance; actual results will vary and will be based on additional factors such as the asset allocation and investment products chosen and future market conditions.

System assumptions are, in one embodiment, adjusted and vary depending on the current regulations, laws, culture, preferences, and economic environment of each country. System assumptions described above are mostly in connection with the United States, but each country's assumptions should be carefully selected in connection with these variations and adjustments. Thus, although specific examples are given above, they are for illustration purposes only and should not limit the scope of system 100.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines, or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention may be described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods (including downloadable software related to the computer application of the invention), services, or information over any network having similar functionality described herein.

Communication channels 115 117, and 119 are any hardware and/or software for enabling communication between user 101, financial advisor 103, and server 105. For example, communication channels 115 117, and 119 may include any communications system that enables the transmission or exchange of data and/or facilitates electronic commercial transactions. Exemplary communication channels 115 117, and 119 include the Internet, an intranet, an extranet, a wide area network (WAN), local area network (LAN), satellite communications, and/or the like. In an exemplary embodiment, user 101, financial advisor 103, and server 105 may be suitably in communication with communication channels 115 117, and 119 via data links. A variety of conventional communications media and protocols may be used for data links, such as a connection to an Internet Service Provider (ISP) over a local loop, as is typically used associated with standard modem communication, cable modem, Dish networks, ISDN, Digital Subscriber Line (DSL), or various wireless communication methods. User 101, financial advisor 103, and server 105 may each also reside within a LAN, which interfaces to communication channels 115 117, and 119 via a leased line (e.g., T1, D3, and/or the like). Such communication methods are well known in the art and are covered in a variety of standard texts. See, e.g., Gilbert Held, *Understanding Data Communications* (1996), which is hereby incorporated by reference.

Communication between participants in the system of the present invention is accomplished through any suitable communication channel, such as, for example, a telephone network, public switch telephone network, intranet, Internet, extranet, WAN, LAN, point of interaction device (e.g., point of sale device, personal digital assistant, cellular phone, kiosk terminal, automated teller machine (ATM), and/or the like), online communications, off-line communications, wireless communications, satellite communications, and/or the like. The network may also be implemented as other types of networks, such as an interactive television (ITV) network. It will appreciated that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Any databases and any other data storage devices referred to herein may include any type of hardware and/or software device, which is configured to store and maintain card-holder transaction data and any other suitable information. Exemplary devices include any suitable type of database, such as relational, hierarchical, object-oriented, and/or the like. Common database products that may be used to implement transaction history database 116, databases 110, 112, 122, and any other data storage devices referred to herein include DB2 by IBM (White Plains, N.Y.), any of the database products available from Oracle Corporation (Redwood Shores, Calif.), Microsoft Access by Microsoft Corporation (Redmond, Wash.), or any other database product. Transaction history database 116, databases 110, 112, 122, and any other data storage devices referred to herein may be organized in any suitable manner including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The financial advisor/planner and consumer/client may represent individual people, entities, or businesses. It is further noted that other participants may be involved in some phases of the financial planning process, such as intermediary investment brokers, mutual fund operators, and the like, but these participants are not shown.

Each participant or user of the system of the present invention, including consumers, financial advisors, and/or the like, for example, may be equipped with a suitable computing system to facilitate communications and transactions with any other participant. For example, some or all participants may have access to a computing unit in the form of a personal computer, although other types of computing units may be used, including laptops, notebooks, handheld computers (e.g., a Palm Pilot®), set-top boxes, kiosk terminals, personal digital assistants, cellular phones, and the like. Additionally, other participants may have computing systems which may be implemented in the form of a computer server, PC server, workstation, minicomputer, mainframe, a networked set of computers, or any other suitable implementations which are known in the art or may hereafter be devised. A participant's computing system may include any suitable operating system, such as any version of Windows, Windows NT, Windows 2000, Windows 98, Windows 95, MacOS, OS/2, BeOS, Linux, UNIX, or the like. Further, although the invention may be described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having functionality similar to that described herein.

The computing systems may be connected with each other via a data communications network or communication channel. For example, the network may be a public network, which is assumed to be insecure and open to eavesdroppers. In one embodiment, the network is embodied as the Internet. In this context, the computers may or may not be connected to the Internet at all times. For instance, a participant's computer may employ a modem to occasionally connect to the Internet, whereas a financial advisor computing system, and/or another computing system might maintain a permanent connection to the Internet. Specific information related to the protocols, standards, and application software used associated with the Internet are not discussed herein. For further information regarding such details, see, for example, Dilip Naik, *Internet Standards and Protocols* (1998); *Java 2 Complete*, various authors (Sybex 1999); Deborah Ray and Eric Ray, *Mastering HTML* 4.0 (1997); and Loshin, *TCP/IP Clearly Explained* (1997). Each of these texts is hereby incorporated by reference.

As will be appreciated, the present invention may be embodied as a method, a data processing system, a device for data processing, and/or a computer program product. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be used, including hard disks, CD-ROM, optical storage devices, magnetic storage devices, and/or the like.

The present invention may be described with reference to screen shots (such as input screen shots and output screen shots, for example), block diagrams, and flowchart illustrations of methods, apparatus (e.g., systems), and computer program products according to various aspects of the invention. It will be understood that each screen shot, functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements. As used herein, the terms "comprises", "comprising", "including", or any variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

APPENDIX A

Title: Model Portfolios—Determining Current and Model allocations for Simulation and Reconciler One process for the life policy allocations is outlined below.

Summary:

The system 100 will base the clients' probability of success on their investment strategy. In the current scenario, that investment strategy will be the same as the clients' current strategy. In the proposed scenario, the system 100 will integrate the:

Clients' risk tolerance
Timing of the clients' goals
Value of the goals
Value of the clients' assets and contributions into customized, proposed investment strategies. These investment strategies will be based on model-allocation strategies. The model allocations will give the percentage of the portfolio invested in cash_equivalents, fixed_income, and _equity_.

The model allocations will be appropriate for the type of investment account; therefore there will be three types of model allocations:

The Model Portfolio engine determines the allocation strategies by considering the timing of the clients' goals, the amount of the clients' goals, and the clients' risk tolerance. The allocation strategies consist of five (5) portfolios:

Regular assets: which provide the Cash/Fixed/Equity mix for the taxable assets.
Regular contributions: which provide the Cash/Fixed/Equity mix for ongoing contributions (savings) to taxable accounts.
Retirement assets and contributions: which provide the Cash/Fixed/Equity mix for retirement plan and other tax-deferred assets and ongoing contributions (savings).
VUL insurance cash values and premiums for those policies used to find goals: which provide the Cash/Fixed/Equity mix for life policy cash values and ongoing premiums.
VUL insurance cash values and premiums for those not policies used to fund goals: which provide the Cash/Fixed/Equity mix for life policy cash values and ongoing premiums. (We do this now, we will just adjust it slightly.)

These distinct portfolios allow the system 100 to distinguish between assets and contributions desired to meet short-term goals and assets and contributions desired for long-term goals. In this manner the model allocation balances the short-term risks in the market with long-term return potential.

The system 100 assumes that consumers will spend their regular assets first in order to fund their goals and that these assets represent what they have accumulated so far to realize goals. The next assumption is that savings represent funds that are available to be allocated for goals down the road. Next, whole and universal life policy cash values and premiums will be available after savings are depleted. Then VUL policy cash values and premiums will be available after whole and universal life polices are depleted. The final assumption is that consumers will spend their tax-deferred retirement assets last, in order to leverage the advantages of tax-deferred growth.

High-Level Walk Through of the Calculations:
1. Determine the clients' risk_tolerance.
2. Determine when, on average, the clients' goals occur in the short term (within 10 years). This is called the short-term_timeframe.
3. Determine when assets will be desired to find retirement spending. This is based on the time until the first retirement date. This is called the long-term_timeframe.

Model Allocation Mapping
4. Use the timeframes and risk tolerance to map to short-term_allocation and long-term_allocation allocation strategies for regular assets and contributions and VUL cash values and premiums.
   a. Short-term_allocation allocation—based on short-term_timeframe and risk_tolerance
   b. Long-term_allocation allocation—based on long-term_timeframe and risk_tolerance
5. Retirement Contributions & Asset Allocation—based on first retirement date and risk_tolerance—no further steps are needed.

Amount of Regular Assets Invested in the Short-Term and Long-Term_Allocations
6. The next step is to determine the amount of regular assets that should be invested in the short-term_allocation.
   a. Divide the dollar value of all goals occurring within ten years by the value of the regular assets. The result is the percentage of regular assets to invest in the short-term assets allocation.
      i. If this value is less than 100%, the clients have more assets that are desired to fund these goals, so part of the assets will be invested short-term. The remaining assets will be invested in the long-term_allocation to fund the goals after 10 years.
      ii. If this value is greater than 100%, the clients do not have enough assets to fund these goals, the shortage will be funded out of their on-going contributions and tax-deferred assets.
7. Determine the amount of regular assets that should be invested in the long-term_allocation.
   a. If the percentage above is less than 100%, then subtract that value from 100%. This is the percentage of regular assets invested in the long_term_allocation.
   b. If the percentage is greater than or equal to 100%, then no regular assets are invested in the long-term_allocation. So the percentage of regular assets invested in the long_term_allocation=0%
8. Finally the short- and long-term assets allocations are combined into one allocation: the regular assets allocation.

Amount of Regular Contributions Invested in the Short-Term and Long-Term_Allocations
9. Next, determine the amount of regular contributions that should be invested in the short- and long-term_allocations.
   a. This calculation is made by subtracting the clients' regular assets from the value of the goals occurring within 10 years. This result is the value of the goals that is covered by the clients' regular assets—any shortage may be funded from regular contributions first then life policies.
  i. If this value is greater than $0 then the asset base covers the goals, and no regular contributions are allocated to the short-term allocation.
    1. All regular contributions will be invested in the long-term_allocation to fund the goals after 10 years.
    2. All VUL cash values and premiums will be invested in the long-term_allocation to fund the goals after 10 years. Proceed to step?
  ii. If this value is less than $0, then there is a shortage of assets that may be funded first from regular contributions then life policies.
    1. The shortage is divided by the present value of the regular contributions. This result is the percentage of regular contributions to allocate to the short-term allocation.
      a. If the value is less than 100%, the clients have more regular contributions than are desired to fund these goals.
        i. So part of the regular contributions will be invested in the short-term_allocation. The remaining regular contributions will be invested in the long-term regular contributions/UL premiums allocation to fund the goals after 10 years.
        ii. No VUL cash values or premiums will be needed to fund these goals so all VUL cash values and premiums will be invested in the long-term_allocation to fund the goals after 10 years. Proceed to step?
      b. If the value is greater than 100%, then all regular contributions are invested in the short-tem allocation.
10. The next step is to combine the short-term and long-term regular contributions allocations into one allocation: the regular contributions allocation.

Amount of VUL Cash Values and Premiums Invested in the Short-Term and Long-Term_Allocations
11. Next, determine the amount of VUL cash values and premiums_that should be invested in the short- and long-term_allocations.
  a. This calculation is made by subtracting the clients' regular assets, savings, whole life and UL cash values and premiums from the value of the goals occurring within 10 years. This result is the value of the goals that is covered by those assets/policies and savings/premiumns clients'—any remaining shortage may be funded from the VUL cash values and premiums.
    i. If this value is greater than $0 then no VUL cash values and premiums are allocated to the short-term allocation.
      1. All VUL cash values and premiums will be invested in the long-term_allocation to fund the goals after 10 years.
    ii. If this value is less than $0, then there is a shortage of assets that may be funded from VUL cash values and premiums.
      1. The shortage is divided by the present value of the VUL cash values and premiums. This result is the percentage of regular contributions to allocate to the short-term allocation.
        a. If the value is less than 100%, the clients have more regular contributions than are desired to fund these goals.
          i. So part of the regular contributions will be invested in the short-term_allocation. The remaining regular contributions will be invested in the long-term regular contributions/UL premiums allocation to fund the goals after 10 years.
          ii. No VUL cash values or premiums will be needed to fund these goals so all VUL cash values and premiums will be invested in the long-term allocation to fund the goals after 10 years. Proceed to step?
        b. If the value is greater than 100%, then all regular contributions are invested in the short-tem allocation.
12. The next step is to combine the short-term and long-term regular contributions allocations into one allocation: the regular contributions allocation.

In this way, a customized, allocation strategy is generated. The asset returns used in the simulation are based on the clients' current allocation strategy (for the current scenario) and the proposed model allocation strategy (for the proposed scenario). Therefore, the system 100 can show how the clients' current allocation strategy, their risk tolerance and our investment advice contribute to the clients' ability to reach their goals.

The proposed model allocation strategy is dynamically updated as the user makes changes to:
  The amounts or timing of the goals;
  Proposed contribution amounts;
  Mixture of regular versus retirement assets;
  Cash value policies or
  The clients' risk tolerance.

The purpose here is to document two things:
  1. How the system determines the Current Allocations that are used for simulating the current scenario.
  2. How the system chooses the correct Proposed Model Allocations that are used for simulating the proposed scenario and in the Reconciler.

Details
I. Determining Account Assets in each Portfolio Type
  1. Account_types: Each account's assets/cash values and contributions/premiums will fall into one of six types:
    1. Regular_assets
    2. Retirement
    3. Whole/UL_goals: all of the universal_life_policies and whole_life_policies owned by client_1, client_2, or community; and whose 'available to fund goals' indicator is on/yes.
    4. Whole/UL_not: all of the universal_life_policies and whole_life_policies owned by client_1, client_2, or community; and whose 'available to find goals' indicator is off/no.
    5. VUL_goals: all of the VUL_policies owned by client_1, client_2, or community; and whose 'available to fund goals' indicator is on/yes.
    6. VUL_not: all of the VUL_policies owned by client_1, client_2, or community; and whose 'available to fund goals' indicator is off/no.
II. Cost of Insurance and Cost-of-Insurance Growth Rates
  See cash value in simulation section for details on how to get cost of insurance data. Listed below are the variable names for calculations used later.
    A. COI_client_1: cost of insurance for client_1
    B. COI_client_2: cost of insurance for client_2
    C. COI_other: cost of insurance for _other_
    D. COI_growth_client_1: annual growth rate on the cost of insurance for client_1

E. COI_growth_client_2: annual growth rate on the cost of insurance for client_2

F. COI_growth_other: annual growth rate on the cost of insurance for _other_

III. Determining each Portfolio'S Desired Value

Each portfolio will have a total asset_balance based on the value of the accounts/policies in that portfolio. The asset_balance may be different in the_current and the_proposed scenarios because of:

Movement between regular_assets and variable_annuity_policies;

Contribution amounts increasing or decreasing.

Premium amounts increasing.

Therefore the asset_balances will have to be recalculated as changes are made in the_proposed. The asset_balances are calculated as follows:

1. The_current scenarios
   a. Current_regular_assets_balance: sum of all regular_asset_values in the_current
   b. Current_regular_contributions_balance: sum of annual_contributions_to regular_assets in the_current
   c. Current_retirement_balance: sum of asset_values in all Retirement_accounts in the_current
   d. Current_retirement_contributions_balance: sum of contributions_in all retirement_accounts in the_current.
   e. Whole/UL_goals_cash_value_balance_client_1: sum of all cash_values in whole/UL_goals where client_1 is the insured, in the_current
   f. Whole/UL_goals_cash_value_balance_client_2: sum of all cash_values in whole/UL_goals where client_2 is the insured, in the_current
   g. Whole/UL_goals_cash_value_balance_other: sum of all cash_values in whole/UL_goals owned by client_1, client_2, or community, where the insured is other in the_current
   h. Whole/UL_goals_premiums_balance_client_1: sum of all premiums in whole/UL_goals where client_1 is the insured, in the_current
   i. Whole/UL_goals_premiums_balance_client_2: sum of all premiums in whole/UL_goals where client_2 is the insured, in the_current
   j. Whole/UL_goals_premiums_balance_other: sum of all premiums in whole/UL_goals owned by client_1, client_2, or community, where the insured is other in the_current
   k. VUL_goals_cash_value_balance_client_1: sum of all cash_values in VUL_goals where client_1 is the insured, in the_current
   l. VUL_goals_cash_value_balance_client_2: sum of all cash_values in VUL_goals where client_2 is the insured, in the_current
   m. VUL_goals_cash_value_balance_other: sum of all cash_values in VUL_goals owned by client_1, client_2, or community, where the insured is other in the_current
   n. VUL_goals_premiums_balance_client_1: sum of all premiums in VUL_goals where client_1 is the insured, in the_current
   o. VUL_goals_premiums_balance_client_2: sum of all premiums in VUL_goals where client_1 is the insured, in the_current
   p. VUL_goals_premiums_balance_other: sum of all premiums in VUL_goals owned by client_1, client_2, or community, where the insured is other in the_current
   q. VUL_not_cash_value_balance: sum of all cash_values in VUL_not where the owner is client_1, client_2, or community, in the_current
   r. VUL_not_premiums_balance: sum of all premiums in VUL_not where the owner is client_1, client_2, or community, in the_current
   s. Policy_goals_balance: sum of all cash_values in whole/UL_goals+cash_values in VUL_goals 2. The_proposed scenarios
   a. Proposed_regular_assets_balance: sum of all regular_asset_values in the_Proposed
   b. Proposed_regular_contributions_balance: sum of annual_contributions_to regular_assets in the_proposed
   c. Proposed_retirement_balance: sum of asset_values in all Retirement_accounts in the_proposed
   d. Proposed_retirement_contributions_balance: sum of_contributions_in all retirement_accounts in the_proposed
   e. Whole/UL_goals_cash_value_balance_client_1: sum of all cash_values in whole/UL_goals where client_1 is the insured, in the_proposed
   f. Whole/UL_goals_cash_value_balance_client_2: sum of all cash_values in whole/UL_goals where client_2 is the insured, in the_proposed
   g. Whole/UL_goals_cash_value_balance_other: sum of all cash_values in whole/UL_goals owned by client_1, client_2, or community, where the insured is other in the_proposed
   h. Whole/UL_goals_premiums_balance_client_1: sum of all premiums in whole/UL_goals where client_1 is the insured, in the_proposed
   i. Whole/UL_goals_premiums_balance_client_2: sum of all premiums in whole/UL_goals where client_2 is the insured, in the_proposed
   j. Whole/UL_goals_premiums_balance_other: sum of all premiums in whole/UL_goals owned by client_1, client_2, or community, where the insured is other in the_proposed
   k. VUL_goals_cash_value_balance_client_1: sum of all cash_values in VUL_goals where client_1 is the insured, in the_proposed
   l. VUL_goals_cash_value_balance_client_2: sum of all cash_values in VUL_goals where client_2 is the insured, in the_proposed
   m. VUL_goals_cash_value_balance_other: sum of all cash_values in VUL_goals owned by client_1, client_2, or community, where the insured is other in the_proposed
   n. VUL_goals_premiums_balance_client_1: sum of all premiums in VUL_goals where client_1 is the insured, in the_proposed
   o. VUL_goals_premiums_balance_client_2: sum of all premiums in VUL_goals where client_1 is the insured, in the_proposed
   p. VUL_goals_premiums_balance_other: sum of all premiums in VUL_goals owned by client_1, client_2, or community, where the insured is other in the_proposed
   q. VUL_not_cash_value_balance: sum of all cash_values in VUL_not where the owner is client_1, client_2, or community, in the_proposed
   r. VUL_not_premiums_balance: sum of all premiums in VUL_not where the owner is client_1, client_2, or community, in the_proposed Simulation Allocations for the_Current
IV. Regular_assets
  A. Current_regular_assets_cash_%=sum of all holdings in the_current with a simulation_level_asset_class of cash_equivalents and the 5% of all _balanced_holdings in regular_assets/current_regular_assets_balance
  B. Current_regular_assets_fixed_%=sum of all holdings in the_current with a simulation_level_asset_class of fixed_income and the 30% of all _balanced_holdings in regular_assets/current_regular_assets_balance
  C. Current_regular_assets_equity_%=sum of all holdings in the_current with a simulation_level_asset_class of_equity_and the 65% of all _balanced_holdings in regular_assets/current_regular_assets_balance
V. Regular_Contributions
  A. Current_regular_contributions_cash_%=same as current_regular_assets_cash_%
  B. Current_regular_contributions_fixed_%=same as current_regular_assets_fixed_%
  C. Current_regular_contributions_equity_%=same as current_regular_assets_equity_%
VI. Whole/UL_goals—Allocation is Always 100% Fixed
  A. Current_whole/UL_goals_cash_%=0%
  B. Current_whole/UL_goals_fixed_%=100%
  C. Current_whole/UL_goals_equity_%=0%
VII. VUL_Goals (Cash Values & Premiums)
  A. Current_VUL_goals_cash_%=sum of all holdings in the_current with a simulation_level_asset_class of cash_equivalents and the 5% of all _balanced_holdings in VUL_goals/current_VUL_goals_cash_value_balance
  B. Current_VUL_goals_fixed_% _%=sum of all holdings in the_current with a simulation_level_asset_class of fixed_income and the 30% of all_balanced_holdings in VUL_goals/current_VUL_goals_cash_value_balance
  C. Current_VUL_goals_equity_%_%=sum of all holdings in the_current with a simulation_level_asset_class of_equity_and the 65% of all _balanced_holdings in VUL_goals/current_VUL_goals_cash_value_balance
VIII. Retirement (Assets and Contributions)
  A. Current_retirement_cash_%=sum of all holdings with a simulation_level_asset_class of cash_equivalents and 5% of all _balanced_holdings in all retirement_accounts in the_current
  B. Current_retirement_fixed_%=sum of all holdings with a simulation_level_asset_class of fixed_income and 30% of all_balanced_holdings in all retirement_accounts in the_current
  C. Current_retirement_equity_%=sum of all holdings with a simulation_level_asset_class of_equity_and 65% of all_balanced_holdings in all retirement_accounts in the_current Simulation Allocations for the Proposed
If the risk_tolerance is "_current_", then all of the simulation allocations used in the_current will be used in the_proposed and the following steps are not necessary.
I. Regular Assets Simulation Allocation Determination
  There are five _timeframes_used:
    0 to 3 Years from non-retirement goal
    4 to 7 Years from non-retirement goal
    8 to 15 Years from non-retirement goal
    16 or More Years from non-retirement or 3+ years away from retirement
    2 years or less from retirement
  The inflation_factor is: 3%
  The discount_rate is: 7%

The regular assets and contributions and the VUL cash values and premium proposed allocations are a combination of a short-term allocation and a long-term allocation.
  A) To determine the long-term_timeframe & long-term_allocations
    1. If the retirement_starting_period is in _periods_ 0 or 1, then the timeframe is '2 years or less from retirement'. If the retirement_starting_period is after _period_ 2, then the timeframe is 16+ years.
    2. This gives you the long-term_timeframe for the proposed_regular_asset_allocation, proposed_regular_contribution_allocation, and proposed_VUL_goals_allocation.
    3. Determine the regular_assets_long-term_allocation—Use the risk_tolerance and the long-term_timeframe to map to the C/F/E mix in the regular_assets_allocation_table.
    4. Determine the regular_contributions_long-term_allocation—Use the risk_tolerance and the long-term_timeframe to map to the C/F/E mix in the regular_contributions_allocation_table.
    5. Determine the VUL_goals_long-term_allocation—Use the risk_tolerance and the long-term_timeframe to map to the C/F/E mix in the VUL_allocation_table.
  B) To determine the short-term_timeframe and short-term_allocation (same as Apex)
    a. If clients have any non-retirement goals occurring in _periods_ 0 to 9, then follow the steps below:
      1. Determine goal_amounts_sum—Sum of all goal_amounts and retirement_living_expenses in the_proposed=(cash_reserve_goal+accumulation_goals+education_goals+retirement_living_expenses) occurring in _periods_ 0 to 9
      2. Determine annual_goal_amouts_sum=For each _period_ 0 to 9, sum the goal_amounts in that _period
      3. Determine weighted_goals=the multiply each _period's_annual_goal_amounts_sum by (the_period_it occurs+1).
      4. Determine short-term_timeframe=weighted_goals divided by the goal_amounts_sum. This gives you the short-term_timeframe for the proposed_regular_asset_allocation, proposed_regular_contribution_allocation, and proposed_VUL_goals_allocation.
      5. Determine the regular_assets_short-term_allocation—Use the risk_tolerance and the short-term_timeframe to map to the C/F/E mix in the regular_assets_allocation_table.
      6. Determine the regular_contributions_short-term_allocation—Use the risk_tolerance and the short-term_timeframe to map to the C/F/E mix in the regular_contributions_allocation_table.
      7. Determine the VUL_goals_short-term_allocation—Use the risk_tolerance and the short-term_timeframe to map to the C/F/E mix in the VUL_goals_allocation_table.
    b. If clients do not have any non-retirement goals occurring in _periods_ 0 to 9, then the short-term_timeframe is the same as the long-term_timeframe.
  C) Determine the assets_short_term_%–percentage of the regular_assets in the regular_assets_short-term_allocation.
    1. assets_short_term_%=goal_amounts_sum divided by the regular_assets_balance. Use the lesser of the calculated amount or 100%

D) Determine the assets_long_term_%–percentage of regular_assets in the long-term_allocation.
   1. assets_long_term_%=1 minus the assets_short_term_%
E) Determine the aggregate mix for the proposed_regular_assets_allocation:
   1. Proposed_regular_assets_group_cash_%=(assets_short_term_%)(cash_% in regular_assets_short-term_allocation)+(assets_long_term_%)(cash_% in regular_assets_long-term_allocation)
   2. Proposed_regular_assets_group_fixed_%=(assets_short_term_%)(fixed_% in regular_assets_short-term_allocation)+(assets_long_term %)(fixed_% in regular_assets_long-term_allocation)
   3. Proposed_regular_assets_equity_%=(assets_short_term_%)(equity_% in regular_assets_short-term_allocation)+(assets_long_term %)(equity_% in regular_assets_long-term_allocation)

Example:
accumulation_goal of $20,000 in period 3
education_goal of $10,000 per year for 4 years—beginning in period 7
Retirement is in 20 Years.
regular_asset_total=$500,000
risk_tolerance=moderate Step 1—Determine the long-term_time_frame and long-term_allocations:
  retirement_starting_period is in _period_19.
    This indicates we should point to the 8 to 15 year timeframe allocation and the moderate mix.
  long-term_allocation:
    In the regular_assets_allocation_table look up the allocation with
      a 8 to 15 year timeframe; and
      a risk tolerance of moderate.
      The appropriate allocation is:
        cash_% in regular_assets_long-term_allocation=40%
        fixed_% in regular_assets_long-term_allocation=25%
        equity_% in regular_assets_long-term_allocation=35%
    In the regular_contributions_allocation_table look up the allocation with
      a 8 to 15 year timeframe; and
      a risk tolerance of moderate.
      The appropriate allocation is:
        cash_% in regular_contributions_long-term_allocation=40%
        fixed_% in regular_contributions_long-term_allocation=25%
        equity_% in regular_contributions_long-term_allocation=35%

Step 2—Determine the short-term_timeframe and short-term_allocations:
  goal_amounts_sum=$50,000
    $20,000 Accum Goal+$30,000 Education Goals=$50,000
  annual_goal_amouts_sum
    period 3=$20,000
    period 7=$10,000
    period 8=$10,000
    period 9=$10,000
  weighted_goals=$350,000
    $20,000*(3+1)=$80,000
    $10,000*(7+1)=$80,000
    $10,000*(8+1)=$90,000
    $10,000*(9+1)=$100,000
    Total=$350,000
  short-term_timeframe=weighted_goals/goal_amounts_sum=7
    $350,000/50,000=7 This indicates that we should point to the 4 to 7 year timeframe
  short-term_allocations:
    In the regular_assets_allocation_table look up the allocation with
      a 4 to 7 year timeframe; and
      a risk tolerance of_moderate
      The appropriate allocation is:
        cash_% in regular_assets_short-term_allocation=60%
        fixed_% in regular_assets_short-term_allocation=20%
        equity_% in regular_assets_short-term_allocation=20%
    In the regular_contributions_allocation_table look up the allocation with
      a 4 to 7 year timeframe; and
      a risk tolerance of_moderate
      The appropriate allocation is:
        cash_% in regular_contributions_short-term_allocation=60%
        fixed_% in regular_contributions_short-term_allocation=20%
        equity_% in regular_contributions_short-term_allocation=20%

Step 3—Determine the assets_short_term_%:
goal_amounts_sum=$50,000
regular_pool=$500,000
assets_short_term_%=goal_amounts_sum/regular_pool=10% $50,000/$500,000=10%
10% of regular_assets should be invested in the regular_assets_short-term_allocation
(60% Cash/20% Fixed/20% Equity)

Step 4—Determine the assets_long_term_%:
assets_long_term_%=1–assets_short_term_%=90%
1–10%=90%.
The remainder, or 90%, of regular_assets should be invested in the
regular_assets_long-term_allocation (40% Cash/25% Fixed/35% Equity)

Step 5—Determine the aggregate mix for the regular_asset_proposed_allocation:
Cash=(10%*60%)+(90%*40%)=42%
Fixed=(10%*20%)+(90%*25%)=25%
Equity=(10%*20%)+(90%*35%)=33%

II. Determining the proposed_regular_contributions_allocation
  A) Determine the contributions_short-term_%–percentage of regular_contributions in the short-term_allocation.
    1. Determine the assets_shortfall–funding desired from regular contributions=goal_amount_sum minus regular_assets_balance. Use the greater of 0 or equation result.
      a. If assets_shortfall is equal to zero, then contributions_short_term_%=0%, then go to step B below.
      b. If assets_shortfall is greater than zero then proceed to Step 2
    2. Determine the contributions_pool–total present value of regular_contributions
      a. Present value regular_contributions=Sum of {regular_contributions*{(1+inflation-factor)^(_period)}/{(1+discount_rate)^(_period_)}

3. contributions_short_term_%=assets_shortfall divided by contributions_pool Use the lesser of the calculated amount or 100%.
B) Determine the contributions_long-term_%–percentage of regular_contributions in the regular_contributions_long-term_allocation.
  1. 1 less the contributions_short_term_%
E) Determine the aggregate mix for the proposed_regular_contributions_allocation:
  1. Proposed_regular_contributions_cash_%=(contributions_short_term_%)(cash_% in regular_contributions_short-term_allocation)+(contributions_long_term_%)(cash_% in regular_contributions_long-term_allocation)
  2. Proposed_regular_contributions_fixed_%=(contributions_short_term_%)(fixed_% in regular_contributions_short-term_allocation)+(contributions_long_term_%)(fixed_% in regular contributions_long-term_allocation)
  3. Proposed_regular_contributions_equity_%=(contributions_short_term_%)(equity_% in regular_contributions_short-term_allocation)+(contributions_long_term_%)(equity_% in regular_contributions_long-term_allocation)

Example:

Accululation Goal of $20,000 in period 3
Education Goal of $10,000 per year for 4 years—beginning in period 7
Retirement is in 20 Years.
Total Regular Assets of $20,000
Risk Tolerance=Moderate
Annual Regular Contributions of $3,000.
Step 1—pool_shortfall
goal_amount_sum=$50,000
  $20,000 Accum Goal+$30,000 Education Goals=$50,000
regular_assets_balance=$20,000.
assets_shortfall=$30,000
  $50,000−$20,000=$30,000

| Step 2 - Determine the contributions_pool | |
|---|---|
| period | PV of contributions |
| 0 | 3,000 |
| 1 | 2,871 |
| 2 | 2,747 |
| 3 | 2,629 |
| 4 | 2,516 |
| 5 | 2,407 |
| 6 | 2,304 |
| 7 | 2,204 |
| 8 | 2,110 |
| 9 | 2,019 |
| 10 | 1,932 |
| 11 | 1,849 |
| 12 | 1,769 |
| 13 | 1,693 |
| 14 | 1,620 |
| 15 | 1,550 |
| 16 | 1,483 |
| 17 | 1,420 |
| 18 | 1,358 |
| 19 | 1,300 |
| Total | 40,810 |

Step 3—Determine the contributions_short-term_%
assets_shortfall/contributions_pool
30,000/$40,810=74%
Step 4—Determine contributions_long_term_%
1 less contributions_short-term_%
1−74%=26%
Step 5—Determine the aggregate mix for the proposed_regular_contributions_allocation:
Cash=(74%*60%)+(26%*40%)=55%
Fixed=(74%*20%)+(26%*25%)=21%
Equity=(74%*20%)+(26%*35%)=24%

IX. Determine proposed_VUL_goals_allocation
A. Determine the VUL_goals_short-term_%–percentage of VUL_goals in the VUL_goals_short-term_allocation.
  4. Determine the contributions_shortfall–funding desired from VUL_goals not covered by assets, savings or whole life and UL policies=assets_shortfall minus contributions_pool minus whole/UL_pool. Use the greater of 0 or equation result.
    a. whole/UL_pool=sum of the
      proposed_whole/UL_goals_cash_value_balance_client_1+sum of the present value of {proposed_whole/UL_goals_premium_balance_client_1 minus [(COI_client_1)*(1+COI_growth_client_1)^(_period_)]/{(1+discount_rate)^(_period_}+sum of the
      proposed_whole/UL_goals_cash_value_balance_client_2+sum of the present value of {proposed_whole/UL_goals_premium_balance_client_2 minus [(COI_client_2)*(1+COI_growth_client_2)^(_period_]/{(1+discount_rate) ^(_period_)}+sum of the
      proposed_whole/UL_goals_cash_value_balance_other+sum of the present value of {proposed_whole/UL_goals_premium_balance_other minus [(COI_other)*(1+COI_growth_other)^(_period_)]/{(1+discount_rate)^(_period_)}
      for _periods_ 0 to retirement_starting_period
      i. If contributions_shortfall is equal to zero, then VUL_goals_short_term_%=0%, then go to step B below.
      ii. If contributions_shortfall is greater than zero, then proceed to Step 2
    b. Determine the VUL_goals_pool=
      proposed_VUL_goals_cash_value_balance_client_1+sum of the present value of {proposed_VUL_goals_premium_balance_client_1 minus [(COI_client_1)*(1+COI_growth_client_1)^(_period_]/(1+discount_rate)}+sum of the proposed_VUL_goals_cash_value_balance_client_2+sum of the present value of {proposed_VUL_goals_premium_balance_client_2 minus [(COI_client_2)*(1+COI_growth_client_2)^(period_]/(1+discount_rate)}+sum of the proposed_VUL_goals_cash_value_balance_other+sum of the present value of {proposed_VUL_goals_premium_balance_other minus [(COI_other)*(1+COI_growth_other)^(_period_]/(1+discount_rate)}
      for _periods_ 0 to retirement_starting_period
    c. VUL_goals_short_term_%=contributions_shortfall divided by VUL_goals_pool Use the lesser of the calculated amount or 100%.

B. Determine the VUL_goals_long-term %–percentage of VUL_goals_in the VUL_goals_long-term_allocation 1 less the contributions_short_term_%

C. Determine the aggregate mix for the proposed_VUL_goals_allocation:
    4. Proposed_VUL_goals_cash_%=(contributions_short_term_%)(cash_in VUL_goals_short-term_allocation)+(contributions_long_term_%)(cash_% in VUL_goals_long-term_allocation)
    5. Proposed_VUL_goals_fixed_%=(contributions_short_term_%)(fixed_% in VUL_goals_short-term_allocation)+(contributions_long_term_%)(fixed_% in VUL_goals_long-term_allocation)
    6. Proposed_VUL_goals_equity_%=(contributions_short_term_%)(equity_% in VUL_goals_short-term_allocation)+(contributions_long_term_%)(equity_% in VUL_goals_long-term_allocation)

X. Determine Proposed_retirement_allocation

Retirement assets and contributions are invested identically.

The proposed_retirement_allocation is based on two factors:
Risk Tolerance
Time Frame of the Retirement Goal—long-term_timeframe To determine the proposed_retirement_allocation, use the risk_tolerance and _timeframe_to map to the cash/fixed/equity mix in the retirement_allocations_table. Varialbe names are:
  A. Proposed_retirement_cash_%
  B. Proposed_retirement_fixed_%
  C. Proposed_retirement_equity_%

XI. Determine Proposed_VUL_not_allocation

VUL cash values and premiums are invested identically.

Since the policy is not being used to find goals, and the policy is a 'permenant' one, we assum it is desired for the 'long-term'. Therefore all of the VUL_not allocations are long-term and the proposed_VUL_not_allocation is based only on the risk tolerance.
  A. To determine the proposed_VUL_not_allocation, for all VUL_not policies, use the risk_tolerance to map to the cash/fixed/equity mix in the VUL_not_allocations_table—portfolios.

This is different from current, in that in the current system 100, each VUL_not policy had it's own risk tolerance. Now, all policies will have the same risk tolerance as the client's assets. (All VUL policies are VUL_not policies in the the current system 100.)

IV. Changing the Proposed Allocations as Advisor Works in Analysis Hub

The proposed allocations chosen will be displayed in the analysis hub. The mix could change as a result of work done by the advisor in the analysis hub:
  The advisor could simply change the risk tolerance by choosing a different one in the analysis hub.
  By changing the amount an accumulation or education goal is funded or by changing the retirement date of the client, the weighted average time frame of the goals will change. This may result in a different allocation.

XII. Composite Mixes

Calculation of the Composite Cash/Fixed/Equity Mixes for use in Tables and Pie Charts on the Glass and in the System 100.
  A. All_composite_mix—appears in Model Portfolio and Goals screens in Analyze and used for Smart Advice rules. (new calculation)
  B. Regular/policy_goals_composite_mix—appears in Other Investments pies and tables, and used to generate expected return and chance of loss statistics, and for Smart Advice rules.
  C. Policy_goals_composite_mix—appears in Survivor output and is used for Smart Advice rules The composite_mixes are weighted averages of the regular assets, the VUL goals, whole/Ul goals, and the retirement allocations. The composite_mixes are calculated as follows:
Desire new composites:
1. Regular/policy_goals
2. Policy_goals X_policy_goals_composite_mix–X=the_current or the_proposed 1) Calculate X_VUL_goals_weighting as follows: (X_VUL_goals_balance_client_1+X_VUL_goals_balance_client_2+X_VUL_goals_balance_other) divided by X_policy_goals_balance
  a) Determine the X_VUL_goals_weighted_cash_% by multiplying the X_VUL_goals_weighting with the X_VUL_goals_cash_%.
  b) Determine the X_VUL_goals_weighted_fixed_% by multiplying the X_VUL_goals_weighting with the X_VUL_goals_fixed_%.
  c) Determine the X_VUL_goals_weighted_equity_% by multiplying the X_VUL_goals_weighting with the X_VUL_goals_equity_%.

2) Calculate X_whole/UL_goals_weighting as follows: (X_whole/UL_goals_balance_client_1+X_whole/UL_goals_balance_client_2+X_whole/UL_goals_balance_other) divided by X_policy_goals_balance
  a) Determine the whole/UL_weighted_fixed_% by multiplying the whole/UL_weighting with the whole/UL_group_fixed_%.

3) Determine the X_policy_goals_composite_mix_cash_%=X_VUL_goals_weighted_cash_%

4) Determine the X_policy_goals_composite_mix_fixed_% by summing the X_VUL_goals_fixed_% and whole/UL_group_fixed_%.

5) Determine the X_policy_goals_composite_mix_equity_%=X_VUL_goals_weighted_equity_%

X_regular/policy_goals_composite_mix–X=the_current or the_proposed

6) Calculate X_regular_assets_weighting as follows: X_regular_assets_balance divided by (X_regular_assets_balance+X_policy_goals_balance)
  a) Determine the X_regular_assets_weighted_cash_% by multiplying the X_regular_assets_weighting with the X_regular_assets_cash_%.
  b) Determine the X_regular_assets_weighted_fixed_% by multiplying the X_regular_assets_weighting with the X_regular_assets_fixed_%.
  c) Determine the X_Regular_assets_weighted_equity_% by multiplying the X_regular_assets_weighting with the X_regular_assets_equity_%.

7) Calculate X_policy_goals_weighting as follows: X_policy_goals_balance divided by (X_regular_assets_balance+X_policy_goals_balance)
  a) Determine the X_policy_goals_weighted_cash_% by multiplying the X_policy_goals_weighting with the X_policy_goals_composite_mix_cash_%.
  b) Determine the X_policy_goals_weighted_fixed_% by multiplying the X_policy_goals_weighting with the X_policy_goals_composite_mix_fixed_%.
  c) Determine the X_policy_goals_weighted_equity_% by multiplying the X_policy_goals_weighting with the X_policy_goals_composite_mix_equity_%

8) Determine the X_regular/policy_goals_composite_mix_cash_%=by summing the X_regular_assets_weighted_cash_% with the X_policy_goals_weighted_cash_%
9) Determine the X_regular/policy_goals_composite_mix_fixed_% by summing the X_regular_assets_weighted_fixed_% and X_policy_goals_weighted_fixed_%.
10) Determine the X_regular/policy_goals_composite_mix_equity_%=by summing the X_regular_assets_weighted_equity_% and X_policy_goals_weighted_equity_%.

X_all_composite_mix–X=the_current or the_proposed

11) Calculate X_regular/policy_goals_weighting as follows: (X_regular_assets_balance+X_policy_goals_balance) divided by (X_regular_assets_balance+X_policy_goals_balance+X_retirement_balance)
    a) Determine the X_regular_policy_goals_weighted_cash_% by multiplying the X_regular/policy_goals_weighting with the X_regular/policy_goals_composite_mix_cash_%.
    b) Determine the X_regular/policy_goals_weighted_fixed_% by multiplying the X_regular/policy_goals_weighting with the X_regular/policy_goals_composite_mix_fixed_%.
    c) Determine the X_regular/policy_goals_weighted_equity_% by multiplying the X_regular/policy_goals_weighting with the X_regular/policy_goals_composite_mix_equity_%.
12) Calculate the X_retirement_weighting as follows: X_retirement_balance divided by (X_regular_assets_balance+X_policy_goals_balance+X_retirement_balance)
    a) Determine the X_retirement_weighted_cash_% by multiplying the X_retirement_weighting with the X_retirement_cash_%.
    b) Determine the X_retirement_weighted_fixed_% by multiplying the X_retirement_weighting with the X_retirement_fixed_%.
    c) Determine the X_retirement_weighted_equity_% by multiplying the X_retirement_weighting with the X_retirement_equity_%.
13) Determine the X_all_composite_mix_cash_%=by summing the X_regular/policy_goals_weighted_cash_% with the X_retirement_weighted_cash_%
14) Determine the X_all_composite_mix_fixed_% by summing the X_X_regular/policy_goals_weighted_fixed_% and X_retirement_weighted_fixed_%.
15) Determine the X_all_composite_mix_equity_%=by summing the X_regular/policy_goals_weighted_equity_% and X_retirement_weighted_equity_%.

To arrive at the_current_**_composite_mix, use the asset_balances from the_current.

To arrive at the_proposed_**_composite_mix, use the asset_balances from the_proposed. If the advisor uses the "Moved to TDA" option in Analyze, they would reduce the value of the regular_asset_balance and increase the value of the retirement_balance so the_weightings_would be desired to be recalculated for the_proposed.

II. Chance of Lose and Expected Return Statistics

Since the life policies used to fund goals will be included with regular assets in the Other Investments output tables and pie charts, the expected return and chance of loss statistics desired to be based on that combined allocation—specifically the X_regular/policy_goals_composite_mix Outstanding Issues:

Allocation Tables—on Next Page

| Regular assets allocation table | | | | | | | |
|---|---|---|---|---|---|---|---|
| Time Frame | Risk Tolerance | | Conservative | Moderately Conservative | Moderate | Moderately Aggressive | Aggressive |
| 0 to 3 Years from Accumltn Goal | Cash | | 100% | 80% | 60% | 40% | 25% |
| | Fixed | | 0% | 20% | 40% | 60% | 75% |
| | | International Fxd Inc | | | | | |
| | | High Yield | | | | | |
| | | Long/Interm | | | 10% | 15% | 25% |
| | | Short | | 20% | 30% | 45% | 50% |
| | Equity | | 0% | 0% | 0% | 0% | 0% |
| | | International Stocks | | | | | |
| | | Large Cap Stocks | | | | | |
| | | Mid/Small Cap Stocks | | | | | |
| 4 to 7 Years from Accumultn Goal | Cash | | 25% | 10% | 8% | 5% | 0% |
| | Fixed | | 60% | 65% | 57% | 45% | 35% |
| | | International Fxd Inc | | 5% | 6% | | |
| | | High Yield | | 7% | 6% | 4% | |
| | | Long/Interm | 25% | 18% | 15% | 12% | 9% |
| | | Short | 35% | 35% | 30% | 29% | 26% |
| | Equity | | 15% | 25% | 35% | 50% | 65% |
| | | International Stocks | | 5% | 7% | 10% | 12% |
| | | Large Cap Stocks | 15% | 20% | 28% | 35% | 46% |
| | | Mid/Small Cap Stocks | | | | 5% | 7% |
| 8 to 15 Years from Accumultn Goal | Cash | | 8% | 5% | 0% | 0% | 0% |
| | Fixed | | 57% | 45% | 35% | 20% | 0% |
| | | International Fxd Inc | 6% | | | | |
| | | High Yield | 6% | 4% | | | |
| | | Long/Interm | 15% | 12% | 9% | 8% | |
| | | Short | 30% | 29% | 26% | 12% | |
| | Equity | | 35% | 50% | 65% | 80% | 100% |
| | | International Stocks | 9% | 12% | 16% | 20% | 25% |
| | | Large Cap Stocks | 19% | 28% | 37% | 44% | 55% |
| | | Mid/Small Cap Stocks | 7% | 10% | 12% | 16% | 20% |

| Regular assets allocation table | | | | | | | |
|---|---|---|---|---|---|---|---|
| Time Frame | Risk Tolerance | | Conservative | Moderately Conservative | Moderate | Moderately Aggressive | Aggressive |
| 16 or More Years/3 or more years from retirement | Cash | | 5% | 0% | 0% | 0% | 0% |
| | Fixed | | 45% | 35% | 20% | 10% | 0% |
| | | International Fxd Inc | | | | | |
| | | High Yield | 4% | | | | |
| | | Long/Intermediate Bond | 12% | 9% | 8% | 10% | |
| | | Short | 29% | 26% | 12% | | |
| | Equity | | 50% | 65% | 80% | 90% | 100% |
| | | International Stocks | 12% | 16% | 20% | 23% | 25% |
| | | Large Cap Stocks | 30% | 37% | 44% | 50% | 55% |
| | | Mid/Small Cap Stocks | 8% | 12% | 16% | 17% | 20% |
| Retirement Income: Use beginning two years from retirement | Cash | | 15% | 15% | 10% | 10% | 10% |
| | Fixed | | 50% | 35% | 25% | 15% | 0% |
| | | International Fxd Inc | 6% | | | | |
| | | High Yield | 6% | 4% | | | |
| | | Long/Interm | 15% | 12% | 9% | 7% | |
| | | Short | 23% | 19% | 16% | 8% | |
| | Equity | | 35% | 50% | 65% | 75% | 90% |
| | | International Stocks | 7% | 10% | 16% | 18% | 23% |
| | | Large Cap Stocks | 23% | 32% | 37% | 43% | 50% |
| | | Mid/Small Cap Stocks | 5% | 8% | 12% | 14% | 17% |

| Regular contributions allocation table | | | | | | | |
|---|---|---|---|---|---|---|---|
| Time Frame | Risk Tolerance | | Conservative | Moderately Conservative | Moderate | Moderately Aggressive | Aggressive |
| 0 to 3 Years from Accumltn Goal | Cash | | 100% | 80% | 60% | 40% | 25% |
| | Fixed | | 0% | 20% | 40% | 60% | 75% |
| | | International Fxd Inc | | | | | |
| | | High Yield | | | | | 0% |
| | | Long/Interm | | | 10% | 15% | 25% |
| | | Short | | 20% | 30% | 45% | 50% |
| | Equity | | 0% | 0% | 0% | 0% | 0% |
| | | International Stocks | | | | | |
| | | Large Cap Stocks | | | | | |
| | | Mid/Small Cap Stocks | | | | | |
| 4 to 7 Years from Accumultn Goal | Cash | | 15% | 0% | 0% | 0% | 0% |
| | Fixed | | 70% | 75% | 65% | 50% | 35% |
| | | International Fxd Inc | | 5% | 6% | | |
| | | High Yield | 5% | 10% | 9% | 5% | |
| | | Long/Interm | 30% | 25% | 20% | 15% | 9% |
| | | Short | 35% | 35% | 30% | 30% | 26% |
| | Equity | | 15% | 25% | 35% | 50% | 65% |
| | | International Stocks | | 5% | 7% | 10% | 12% |
| | | Large Cap Stocks | 15% | 20% | 28% | 35% | 46% |
| | | Mid/Small Cap Stocks | | | | 5% | 7% |
| 8 to 15 Years from Accumultn Goal | Cash | | 0% | 0% | 0% | 0% | 0% |
| | Fixed | | 65% | 50% | 35% | 20% | 0% |
| | | International Fxd Inc | 6% | | | | |
| | | High Yield | 9% | 5% | | | |
| | | Long/Interm | 20% | 15% | 9% | 8% | |
| | | Short | 30% | 30% | 26% | 12% | |
| | Equity | | 35% | 50% | 65% | 80% | 100% |
| | | International Stocks | 9% | 12% | 16% | 20% | 25% |
| | | Large Cap Stocks | 19% | 28% | 37% | 44% | 55% |
| | | Mid/Small Cap Stocks | 7% | 10% | 12% | 16% | 20% |
| 16 or More Years/3 or more years from retirement | Cash | | 0% | 0% | 0% | 0% | 0% |
| | Fixed | | 50% | 35% | 20% | 10% | 0% |
| | | International Fxd Inc | | | | | |
| | | High Yield | 5% | | | | |
| | | Long/Interm | 15% | 9% | 8% | 10% | |
| | | Short | 30% | 26% | 12% | | |
| | Equity | | 50% | 65% | 80% | 90% | 100% |
| | | International Stocks | 12% | 16% | 20% | 23% | 25% |
| | | Large Cap Stocks | 28% | 37% | 44% | 50% | 55% |
| | | Mid/Small Cap Stocks | 10% | 12% | 16% | 17% | 20% |

| | | Regular contributions allocation table | | | | | |
|---|---|---|---|---|---|---|---|
| Time Frame | Risk Tolerance | | Conservative | Moderately Conservative | Moderate | Moderately Aggressive | Aggressive |
| Retirement Income: Use beginning two years from retirement | Cash | | 15% | 15% | 10% | 10% | 10% |
| | Fixed | | 50% | 35% | 25% | 15% | 0% |
| | | International Fxd Inc | 6% | | | | |
| | | High Yield | 6% | 4% | | | |
| | | Long/Interm | 15% | 12% | 9% | 7% | |
| | | Short | 23% | 19% | 16% | 8% | |
| | Equity | | 35% | 50% | 65% | 75% | 90% |
| | | International Stocks | 7% | 10% | 16% | 18% | 23% |
| | | Large Cap Stocks | 23% | 32% | 37% | 43% | 50% |
| | | Mid/Small Cap Stocks | 5% | 8% | 12% | 14% | 17% |

| | | VUL goals allocation table | | | | | |
|---|---|---|---|---|---|---|---|
| Time Frame | Risk Tolerance | | Conservative | Moderately Conservative | Moderate | Moderately Aggressive | Aggressive |
| 0 to 3 Years from Accumltn Goal | Cash | | 100% | 80% | 60% | 40% | 25% |
| | Fixed | | 0% | 20% | 40% | 60% | 75% |
| | | International Fxd Inc | | | | | |
| | | High Yield | | | | | 0% |
| | | Long/Interm | | | 10% | 15% | 25% |
| | | Principal Preservation Short | | 20% | 30% | 45% | 50% |
| | Equity | | 0% | 0% | 0% | 0% | 0% |
| | | International Stocks | | | | | |
| | | Large Cap Stocks | | | | | |
| | | Mid/Small Cap Stocks | | | | | |
| 4 to 7 Years from Accumultn Goal | Cash | | 15% | 0% | 0% | 0% | 0% |
| | Fixed | | 70% | 75% | 65% | 50% | 35% |
| | | International Fxd Inc | | | 5% | 6% | |
| | | High Yield | 5% | 10% | 9% | 5% | |
| | | Long/Interm | 30% | 25% | 20% | 15% | 9% |
| | | Principal Preservation Short | 35% | 35% | 30% | 30% | 26% |
| | Equity | | 15% | 25% | 35% | 50% | 65% |
| | | International Stocks | | 5% | 7% | 10% | 12% |
| | | Large Cap Stocks | 15% | 20% | 28% | 35% | 46% |
| | | Mid/Small Cap Stocks | | | | 5% | 7% |
| 8 to 15 Years from Accumultn Goal | Cash | | 0% | 0% | 0% | 0% | 0% |
| | Fixed | | 65% | 50% | 35% | 20% | 0% |
| | | International Fxd Inc | 6% | | | | |
| | | High Yield | 9% | 5% | | | |
| | | Long/Interm | 20% | 15% | 9% | 8% | |
| | | Principal Preservation Short | 30% | 30% | 26% | 12% | |
| | Equity | | 35% | 50% | 65% | 80% | 100% |
| | | International Stocks | 9% | 12% | 16% | 20% | 25% |
| | | Large Cap Stocks | 19% | 28% | 37% | 44% | 55% |
| | | Mid/Small Cap Stocks | 7% | 10% | 12% | 16% | 20% |
| 16 or More Years/3 or more years from retirement | Cash | | 0% | 0% | 0% | 0% | 0% |
| | Fixed | | 50% | 35% | 20% | 10% | 0% |
| | | International Fxd Inc | | | | | |
| | | High Yield | 5% | | | | |
| | | Long/Interm | 15% | 9% | 8% | 10% | |
| | | Principal Preservation Short | 30% | 26% | 12% | | |
| | Equity | | 50% | 65% | 80% | 90% | 100% |
| | | International Stocks | 12% | 16% | 20% | 23% | 25% |
| | | Large Cap Stocks | 28% | 37% | 44% | 50% | 55% |
| | | Mid/Small Cap Stocks | 10% | 12% | 16% | 17% | 20% |
| Retirement Income: Use beginning two years from retirement | Cash | | 15% | 15% | 10% | 10% | 10% |
| | Fixed | | 50% | 35% | 25% | 15% | 0% |
| | | International Fxd Inc | 6% | | | | |
| | | High Yield | 6% | 4% | | | |
| | | Long/Interm | 15% | 12% | 9% | 7% | |
| | | Principal Preservation Short | 23% | 19% | 16% | 8% | |

VUL goals allocation table

| Time Frame | Risk Tolerance | Conservative | Moderately Conservative | Moderate | Moderately Aggressive | Aggressive |
|---|---|---|---|---|---|---|
| | Equity | 35% | 50% | 65% | 75% | 90% |
| | International Stocks | 7% | 10% | 16% | 18% | 23% |
| | Large Cap Stocks | 23% | 32% | 37% | 43% | 50% |
| | Mid/Small Cap Stocks | 5% | 8% | 12% | 14% | 17% |

Retirement allocations table

| Time Frame | Risk Tolerance | | Conservative | Moderately Conservative | Moderate | Moderately Aggressive | Aggressive |
|---|---|---|---|---|---|---|---|
| Retirement Income: Use beginning two years from retirement | Cash | | 15% | 15% | 10% | 10% | 10% |
| | Fixed | | 50% | 35% | 25% | 15% | 0% |
| | | International Fxd Inc | 6% | | | | |
| | | High Yield | 6% | 4% | | | |
| | | Long/Interm | 15% | 12% | 9% | 7% | |
| | | Principal Preservation Short | 23% | 19% | 16% | 8% | |
| | Equity | | 35% | 50% | 65% | 75% | 90% |
| | | International Stocks | 7% | 10% | 16% | 18% | 23% |
| | | Large Cap Stocks | 23% | 32% | 37% | 43% | 50% |
| | | Mid/Small Cap Stocks | 5% | 8% | 12% | 14% | 17% |
| 3 or more years from retirement | Cash | | 0% | 0% | 0% | 0% | 0% |
| | Fixed | | 50% | 35% | 20% | 10% | 0% |
| | | International Fxd Inc | | | | | |
| | | High Yield | 4% | | | | |
| | | Long/Interm | 12% | 9% | 8% | 10% | |
| | | Principal Preservation Short | 34% | 26% | 12% | | |
| | Equity | | 50% | 65% | 80% | 90% | 100% |
| | | International Stocks | 12% | 16% | 20% | 23% | 25% |
| | | Large Cap Stocks | 28% | 37% | 44% | 50% | 55% |
| | | Mid/Small Cap Stocks | 10% | 12% | 16% | 17% | 20% |

VUL not allocations table

| Risk Tolerance | Conservative | Moderately Conservative | Moderate | Moderately Aggressive | Aggressive |
|---|---|---|---|---|---|
| Cash | 0% | 0% | 0% | 0% | 0% |
| Fixed | 50% | 35% | 20% | 10% | 0% |
| International Fxd Inc | | | | | |
| High Yield | 4% | | | | |
| Long/Interm | 12% | 9% | 8% | 10% | |
| Principal Preservation Short | 34% | 26% | 12% | | |
| Equity | 50% | 65% | 80% | 90% | 100% |
| International Stocks | 12% | 16% | 20% | 23% | 25% |
| Large Cap Stocks | 28% | 37% | 44% | 50% | 55% |
| Mid/Small Cap Stocks | 10% | 12% | 16% | 17% | 20% |

APPENDIX B

Title:
Simulation: Goal Simulation Overview—Disability #115
Parent: Goal Simulation Overview #78
Summary:
   The system 100 will follow the rules laid out in the Goal Simulation Overview Summary.
   The system 100 will assume that the disability of the client exists from the beginning of the simulation period (as of analysis_start_date) and is a permanent disability—the client will not resume his/her employment again
   The system 100 will adjust the current_living_expenses by the Disability Goal Assumptions disability_percent_of_lifestyle_expense
   The system 100 will adjust the retirement_living_expenses by the Disability Goal Assumptions' disability_percent_of_lifestyle_expense
   The system 100 will track incomes and expenses as of the start of simulation
   The system 100 will include an individual accumulation goal in the disability simulation if the goal specific disability_accumulation_goalX_indicator is set
   The system 100 will include an individual education goal in the disability simulation if the goal specific disability_education_goalX_indicator is set
   The system 100 will include the cash_reserve_goal if present
   The system 100 will include disability_additional_income for the disability simulation if entered in the Disability Goal Assumption
Details:
Outstanding Issues:
Title:
Simulation: Goal Simulation Overview—Lifetime Summary #124
Parent: Goal Simulation Overview Summary #78
Child: Goal Simulation Overview—Long Term Care Summary #116

Summary:
  The system 100 will follow the general rules defined in the Goal Simulation Overview section.
  The system 100 will always perform the lifetime simulation goal
  In general, the system 100 will track incomes and expenses, for the purpose of having them affect the asset balances, starting at the earliest retirement (if client_1 retires in 2025 and client_2 retires in 2021, the system 100 will start tracking in 2021)
  There are certain incomes and expenses that are tracked prior to the earliest retirement:
    Income from the sale of a business owned by a client
    Income from the sale of real property owned by a client
    The lump sum income from a company_benefit_income (the company_benefit_retirement_allowance_net_amount)
    Income from an endowment or a fixed_annuity where the insured is a client
    Income from a child_endowment where the owner is a client
    The future cash value payment on a whole life or whole life term policy
    Adjustments to savings
    Accumulation goal expenses
    Cash reserve goal expenses
    Education goal expenses
  Localization: #3-7 are done in System 100
Details:
Outstanding Issues:
Title:
Simulation: Goal Simulation Overview—Disability #115
Parent: Goal Simulation Overview #78
Summary:
  The system 100 will follow the rules laid out in the Goal Simulation Overview Summary.
  The system 100 will include a disability goal for each client who has at least 2,000,000 Yen of combined employment income and business income, and whose age is between 18 and 60 inclusive
  The system 100 will assume that the disability of the client exists from the beginning of the simulation period (as of analysis_start_date) and is a permanent disability—the client will not resume his/her employment again
  The system 100 will adjust the current_living_expenses by the Disability Goal Assumptions disability_percent_of_lifestyle_expense
  The system 100 will adjust the retirement_living expenses by the Disability Goal Assumptions' disability_percent_of_lifestyle_expense
  The system 100 will track incomes and expenses as of the start of simulation
  The system 100 will include an individual accumulation goal in the disability simulation if the goal specific disability_accumulation_goalX_indicator is set
  The system 100 will include an individual education goal in the disability simulation if the goal specific disability education_goalX_indicator is set
  The system 100 will include the cash_reserve_goal if present
  The system 100 will include disability_additional_income for the disability simulation if entered in the Disability Goal Assumption Details:
1) Determine the number of individual simulation runs and the duration of an individual run
   See parent
2) Set up the asset portfolios
   See parent
3) Determine key retirement periods
   See parent
4) Set up the cashflows used in a simulation run
   Same as Parent. Rules specific to the Disability Goal are defined in the components of the Goal Simulation Cashflow Definition section #69
5) Set up additional scenarios of cashflows desired to create probability graphs
   See parent
6) Perform the simulation
   See parent
7) Calculate the probability results
   See Simulation: Calculating Probability Results
Outstanding Issues:
Title:
Simulation: Goal Simulation Overview—Lifetime#124
Parent: Goal Simulation Overview #78
Child: Goal Simulation Overview—Long Term Care #116
Summary:
  The system 100 will follow the general rules defined in the Goal Simulation Overview section.
  The system 100 will always perform the lifetime simulation goal
  In general, the system 100 will track incomes and expenses, for the purpose of having them affect the asset balances, starting at the earliest retirement (if client_1 retires in 2025 and client_2 retires in 2021, the system 100 will start tracking in 2021)
  There are certain incomes and expenses that are tracked prior to the earliest retirement:
    Income from the sale of a business owned by a client
    Income from the sale of real property owned by a client
    The lump sum income from a company_benefit_income (the company_benefit_retirement_allowance_net_amount)
    Income from an endowment where the insured is a client
    Income from a child_endowment where the owner is a client
    The future cash value payment on a whole life or whole life term policy
    Adjustments to savings
    Accumulation goal expenses
    Cash reserve goal expenses
    Education goal expenses
  Localization: #3-7 are done in System 100
Details:
1) Determine the number of individual simulation runs and the duration of an individual run
   See parent
2) Set up the asset portfolios
   See parent
8) Determine key retirement periods
   See parent
9) Set up the cashflows used in a simulation run
   Same as parent. See Simulation: Goal Simulation Cashflow Definition Section and children for rules specific to Lifetime
10). Set up additional scenarios of cashflows desired to create probability graphs No additional scenarios are simulated since the probability graph shows the probability of success for each year of simulation between the_current and the_proposed.
11) Perform the simulation
   See parent
12) Calculate the probability results
   See parent
Outstanding Issues:
Title:
Simulation: Goal Simulation Overview—Long Term Care #116
Parent: Goal Simulation Overview—Lifetime #124
Summary:
   The system 100 will follow the rules laid out in the Goal Simulation Overview Summary.
   The system 100 will perform the Long Term Care simulation if at least one client is age 40 or greater
   In general, the system 100 will track incomes and expenses during the post-retirement period
   The system 100 will track certain incomes and expenses that occur in the pre-retirement period as defined in the Goal Simulation Overview—Lifetime
   The system 100 will adjust the retirement_living_expenses by the LTC Goal Assumptions' long_term_care_percent_of_lifestyle_expense starting at the first confinement
   The system 100 will assume that the older client goes into a long term care confinement 11 years prior to the simulation end and is confined for 5 years, then dies so any incomes for that client will stop. The client may be retired at or prior to confinement so if the retirement of the client has not occurred 11 years prior to the simulation end, the confinement start will be the lesser of 11 years from simulation end or the retirement of the older client. The confinement end will be the lesser of 5 years or years to simulation end.
   The system 100 will assume that the younger client or a single client goes into a long term care confinement 5 years prior to the simulation end and is confined for 5 years, then dies at the end of simulation. The client may be retired at or prior to confinement so if the retirement of the client has not occurred 5 years prior to the simulation end, the confinement start will be the lesser of 5 years from simulation end or the retirement year of the older client. The confinement end will be the lesser of 5 years or years to simulation end.
   The system 100 will get the annual nursing home or care cost from the Long Term Care Goal Goal Assumptions
   The system 100 will include long_term_care_additional_income if entered in the Long Term Care Goal Assumptions
   The system 100 will not include individual accumulation goals or education goals in the Long Term Care Goal simulation if 1) long_term_care_accumulation_goalX_indicator/long_term_care_education_goalX_indicator is not set AND 2) the goal duration extends into the confinement start of the older client:
   Case Example:
   the older client's confinement starts in 2020
   accumulation goal that occurs in the years 2018-2021
   advisor indicated that the accumulation goal is not to be included in the long term care goal
   Simulation treatment: there would be a goal expenses in the years 2018 and 2019; however, since the confinement period starts in 2020 and the accumulation goal is to be excluded in the long term care goal, the accumulation goal will not occur in 2020 and 2021. This treatment makes the Lifetime simulation and Long Term Care Goal simulation the same up to the confinement period of the older client.
Details:
1) Determine the number of individual simulation runs and the duration of an individual run—See parent
2) Set up the asset portfolios
   See parent
3) Determine key retirement periods
   See parent
4) Set up the cashflows used in a simulation run
   Same as Parent. Rules specific to the Long Term Care Goal are defined in the components of the Goal Simulation Cashflow Definition Section
5) Set up additional scenarios of cashflows desired to create probability graphs
   Lifetime or LTC goal: no additional scenarios are simulated since the probability graph shows the probability of success for each year of simulation between the_current and the_proposed.
6) Perform the simulation
   See parent
7) Calculate the probability results
   After all the simulation runs have been completed, the probability results are calculated.
   See Simulation: Calculating Probability Results
Outstanding issues:
Title: Simulation: Goal Simulation Overview
Children:
Goal Simulation Overview—Lifetime #124
Goal Simulation Overview—Disability #115
Goal Simulation Overview—LongTermCare #116
Survivor Simulation #82
Summary:
   The system 100 will perform simulations that project out cashflows of client incomes, savings, liabilities, premiums, goal expenses, and living expenses, tracking the impact on clients' assets for a specific set of goals.
   The specific set of goals to be simulated are dependent on client data
   The system 100 will always perform the lifetime cashflow
   The system 100 may also perform cashflow projection simulations that represent a disability situation for a client, a survivor situation where a client is assumed to have died, and a long term care situation where the clients are assumed to be confined to a long term care facility prior to the simulation end
   The system 100 will simulate in period increments based on the simulation period frequency. This period frequency is defined to be annual so all cashflows will be converted to an annual amount ($ 1000/month becomes $12,000/year)—for the remainder of this document, the conversion step will say that the amount will be converted to an amount based on the simulation frequency
   The system 100 will calculate the duration of each individual simulation by subtracting client_1_current_age from client_1_life_expectancy for all but the survivor goal simulation
   The system 100 will perform a specific number of individual simulation runs (as defined in the Stochastic Sampling Methodoloy section—#123) for purposes of collecting probability results
   The system 100 will consider the simulation start to be as of the analysis_start_date
   An individual goal simulation run will project out cashflows based on data entry related to incomes, savings, premiums, liabilities, living expenses, and goal expenses An individual goal simulation will track the effect that incoming and outgoing cashflows have on the clients' asset balances and will consider that the clients have run out of money (a failed simulation run) if the clients' total asset balance has insufficient funds to meet expenses any time after the retirement of the client working the longest The system 100 will assume that a loan is taken out in the cases where a shortage occurs prior to the retirement of the client working the longest The system 100 will perform a goal simulation based on the clients' current situation as specified by data entry inputs (for the rest of this document, it will be referred to as the_current)

The system 100 will perform a goal simulation based on modifications to the_current. The simulation based on the clients' modified situation will be referred to as the_proposed The system 100 will collect and present results that illustrate the probability of success given the_current and the_proposed The system 100 will trigger a recalculation of the goal simulation when modifications are made to data entry or when modifications are made and saved to assumptions in the analysis of other simulation goals (lifetime, disability, survivor, or long term care)

Details:

Assumptions:
1) For this document, we assume that there is a client_1 and a client_2. For groups where there is not a client_2, the information related to client_2 is ignored.
2) incomes are owned by client_1 or client_2
3) liabilities are owned by client_1 or client_2

1) Determine the number of individual simulation runs and the duration of an individual run The system 100 will perform a specific number of simulation runs for each goal simulation (See the Stochastic Sampling Methodology section—#123)

The system 100 will calculate the simulation duration
i) For all but the survivor goal simulation, the simulation_duration in years of the cashflow projections is calculated by subtracting the client_1_current_age from client_1_life_expectancy
ii) For the survivor goal simulation, the simulation_duration depends on whether there is a surviving client (see Survivor Simulation section—#82 for specific detail)

2) Set up the asset portfolios

The system 100 desires that the clients' investment_assets are divided into a specified number of simulation_portfolios—1) regular_asset_simulation_portfolio, 2) regular_contribution_simulation_portfolio, 3) client_1_retirement_simulation_portfolio, and, if client_2 exists, 4) client_2_retirement_simulation_portfolio (See the Model Portfolio Section)

The system 100 will determine the beginning asset balance for each of the specified portfolios based on the asset_owner and ASSET_TYPE of each of the clients' investment_assets (See Asset section—#27)
Additional feature: for simulation, the regular_asset_simulation_portfolio will include the cash value of universal_life policies.

The system 100 will determine the investment asset allocation to use for each of the portfolios (See the Model Portfolio Section)

3) Determine key retirement periods
client_1's client_retirement_start_period equals client_1_retirement_age minus client_1_current_age
client_2's client_retirement_start_period equals client_2_retirement_age minus client_2_current_age
The system 100 will determine the retirement_starting_period to be the same as client_retirement_start_period of the first client to retire (the lesser of client_1's client_retirement_start_period and client_2's client_retirement_start_period)
The system 100 will determine the latest_retirement_period by taking the greater of Client_1's client_retirement_start_period and client_2's client_retirement_start_period
the latest_retirement_period is the first period that triggers the process of determining whether an individual simulation run has failed due to insufficient assets to meet expenses
For a single client case or if the two clients retire in the same year (given that the simulation periods are annual), the retirement_starting_period is equal to the latest_retirement_period 4) Set up the cashflows used in a simulation run During simulation, the system 100 will add cashflows that represent income and policy benefit cashflows to the regular_asset_simulation_portfolio, increasing the portfolio's balance as long as 1) the cashflow's start_period is equal to or greater than simulation period currently being processed and 2) the cashflow's end_period is less than or equal to the simulation period currently being processed.

During simulation, the system 100 will add cashflows that represent adjustments to savings to the regular_asset_simulation_portfolio. The portfolio's balance is increased or decreased depending on whether the adjustment is an increase or decrease to savings. The cashflow affects the balance if 1) the cashflow's start_period is equal to or greater than simulation period currently being processed and 2) the cashflow's end_period is less than or equal to the simulation period currently being processed.

During simulation, the system 100 will add cashflows that represent savings to regular_assets and the accumulation piece of an Universal Life premium to the regular_contribution_simulation_portfolio, increasing the portfolio's balance as long as 1) the cashflow's start_period is equal to or greater than simulation period currently being processed and 2) the cashflow's end_period is less than or equal to the simulation period currently being processed.

Additional feature: considering a portion of a Universal Life premium as a savings During simulation, the system 100 will add cashflows that represent savings to retirement_assets to the retirement_simulation_portfolio for the particular client whose savings it is. The portfolio's balance will be increased by the cashflow amount as long as 1) the cashflow's start_period is equal to or greater than simulation period currently being processed and 2) the cashflow's end_period is less than or equal to the simulation period currently being processed.

During simulation, the system 100 will subtract certain expense cashflows (types include living expenses, goal expenses, liabilities, premiums, and savings) from the simulation_portfolios, decreasing a portfolio's balance as long as 1) the cashflow start_period is equal to or greater than simulation period currently being processed and 2) the cashflow end_period is less than or equal to the simulation period currently being processed.

The system 100 will subtract the expenses from the portfolios in the following withdrawal order: 1) regular_asset_simulation_portfolio, 2) regular_contribution_simulation_portfolio, 3) retirement_simulation_portfolio of the oldest client, and if there are two clients, 4) retirement_simulation_portfolio of the younger client See Simulation: Simulation Cashflow Definition section—#69

5) Set up additional scenarios of cashflows desired to create probability graphs Lifetime or LTC goal: no additional scenarios are simulated since the probability graph shows the probability of success for each year of simulation between the_current and the_proposed.

Disability goal: In addition to simulating scenarios based on cashflows based on the_current and the proposed, the system 100 will set up 4 additional scenarios which will be the same as the_proposed except in the amount of additional disability benefits. The additional disability benefits that will included in each of the 4 additional scenarios are determined based on the client's maximum disability insurance limit given their employment income.

Survivor goal: In addition to simulating scenarios based on cashflows based on the_current and the_proposed, the system 100 will set up 4 additional scenarios which will be the same as the_proposed except in the derived net change to life policies' sum assured amounts. The sum assured death benefits that will included in each of the 4 additional scenarios will be determined based on rules specified in the Survivor Goal—Determining Additional Benefits to Graph section.

6) Perform the simulation

For each iteration or run of the simulation, the process is as follows:

a) Apply inflation: inflation is applied to incomes, expenses, and savings in all periods except the first period (year of analysis_start_date). The rules regarding how a specific type cashflow inflates are found in the Simulation Cashflow Definition sections.

b) Apply interest to the phantom loan balance: if there previously were insufficient assets to cover expenses, a phantom loan was taken out. Interest is applied to the outstanding loan balance. The interest rate used is the stochastically determined inflation rate+PHANTOM_LOAN_RATE c) Process incomes:
1) go through all the income cashflows and sum up the total income for the current period those income cashflows whose start_period is greater than or equal to the current period and whose end_date is less than or equal to the current period are included in the total income.
2) The income total is added to the regular_asset_simulation_portfolio.

d) Process savings to asset portfolios—for each simulation_portfolio:
1) sum up the total client savings associated with the portfolio for the current period those client savings cashflows whose start_period is greater than or equal to the current period and whose end_date is less than or equal to the current period are included in the total client savings.
2) The sum of total client savings is added to the balance of its corresponding simulation_portfolio.
3) The sum of total client savings is also subtracted from the regular_asset_simulation_portfolio that receives the incomes since while the savings increase assets, it is also an expense in that the client must fund the savings. The savings is subtracted from that portfolio for the entire duration of the disability goal simulation and the survivor goal simulation. However, for the Lifetime and LTC goals, the savings is subtracted from that portfolio during the retirement period of simulation;
4) sum up the total employer savings for the current period those employer savings cashflows whose start_period is greater than or equal to the current period and whose end_date is less than or equal to the current period are included in the total employer savings.
5) The sum of total employer savings is added to the balance of the simulation_portfolio.

e) Pay off phantom loan with existing assets: if there is an outstanding phantom loan that was 'taken' out in order to cover asset shortage (insufficient assets to meet expenses), go through the simulation_portfolios, based on the withdrawal order, and use any existing assets to pay off the phantom loan.

f) Process expenses (includes living expenses, goal expenses, premiums, and liabilities):
1) Go through all the expense cashflows and sum up the total expense for the current period those expense cashflows whose start_period is greater than or equal to the current period and whose end_date is less than or equal to the current period are included in the total expenses.
2) The expense total is subtracted from the simulation_portfolios based on the withdrawal order. Depending on the specific portfolio, a withdrawal from the portfolio may be taxable. If so, the amount desired to be pulled from the portfolio is equal to expense total divided by (1−AVERAGE_TAX_RATE_ON_WITHDRAWAL). If the asset portfolio balance is insufficient to meet the total expense for the period, the portfolio meets as much of the expense as it can, bringing its balance down to zero.
3) If there is any remaining expense to be paid off, continue through the other simulation_portfolios in an attempt to fully paid down the expense
4) If there are insufficient assets to meet the expenses for the period, a phantom loan is taken out to meet the difference unless the period being processed is on or after the retirement period of the client retiring last (if one client, it is the retirement_starting_period). In that case, the clients are considered to have failed and that simulation run is ended.

g) Apply growth to portfolios—for each simulation_portfolio:
1) get the ending balance for the period
2) get the cash rate of return, the bond rate of return, and the equity rate of return for the current period (see Stochastic Sampling Methodology section—#109)
3) calculate the portfolio investment return by applying the portfolio weight to the corresponding simulated return for the period: 1) percentage of cash*the cash return+2) percentage of bonds*the bond return+3) percentage of equity*the equity return
4) adjust the weighted portfolio return based on rules for the specific asset portfolio (if the portfolio grows at an after-tax growth rate, the growth rate=investment return*(1−AVERAGE_CAP_GAINS_TAX)

5) add the growth to the portfolio balance

7) Calculate the probability results

After all the simulation runs have been completed, the probability results are calculated.

See Simulation: Calculating Probability Results

Outstanding Issues:
1) Are the investment assets specifically identified in the Asset section?

Title:
Simulation: Goal Simulation Overview Summary—Section 78

Children:
Goal Simulation Overview—Lifetime #124
Goal Simulation Overview—Disability #115
Goal Simulation Overview—LongTermCare #116
Survivor Simulation #82

Summary:
The system 100 will perform simulations that project out cashflows of client incomes, savings, liabilities, premiums, goal expenses, and living expenses, tracking the impact on clients' assets for a specific set of goals.

The specific set of goals to be simulated are dependent on client data

The system 100 will always perform the lifetime cashflow

The system 100 may also perform cashflow projection simulations that represent a disability situation for a client, a survivor situation where a client is assumed to have died, and a long term care situation where the clients are assumed to be confined to a long term care facility prior to the simulation end The system 100 will simulate in period increments based on the simulation period frequency. This period frequency is defined to be annual so all cashflows will be converted to an annual amount ($1000/month becomes $12,000/year)—for the remainder of this document, the conversion step will say that the amount will be converted to an amount based on the simulation frequency The system 100 will calculate the duration of each individual simulation by subtracting client_1_current_age from client_1_life_expectancy for all but the survivor goal simulation The system 100 will perform a specific number of individual simulation runs (as defined in the Stochastic Sampling Methodoloy section—#123) for purposes of collecting probability results The system 100 will consider the simulation start to be as of the analysis_start_date An individual goal simulation run will project out cashflows based on data entry related to incomes, savings, premiums, liabilities, living expenses, and goal expenses An individual goal simulation will track the effect that incoming and outgoing cashflows have on the clients' asset balances and will consider that the clients have run out of money (a failed simulation run) if there is a shortage at the retirement period of the client retiring last or, for a single client, the final simulation period—this period is considered the failure trigger period.

The system 100 will assume that a loan is taken out in the cases where a shortage occurs prior to the failure trigger period.

The system 100 will perform a goal simulation based on the clients' current situation as specified by data entry inputs (for the rest of this document, it will be referred to as the_current)

The system 100 will perform a goal simulation based on modifications to the_current. The simulation based on the clients' modified situation will be referred to as the_proposed The system 100 will collect and present results that illustrate the probability of success for the_current and the probability of success for the_proposed.

The system 100 will trigger a recalculation of the goal simulation when modifications are made to data entry or when modifications are made and saved to assumptions in the analysis of other simulation goals (lifetime, disability, survivor, or long term care)

Outstanding Issues:

Title:
Simulation: Calculating Probability Results—REQ #89

Referenced Sections:
Risk Goal Assumptions #88
Survivor simulation: Graph points sections #133

Summary:
Additional feature: Japanese Lightning wants the disability simulation to show the probability success for each period of simulation The system 100 will calculate the probability of success for each goal that is simulated The system 100 will compare the probability of success of the_current and the_proposed for each goal that is simulated The system 100 will calculate lifetime simulation results based on the_current data and based on the_proposed data The system 100 will calculate long term care simulation results based on the_current data and based on the_proposed data The system 100 will calculate survivor simulation results based on the_current data, the_proposed data, and on 4 additional scenarios based on net change to sum assured death benefits.

The system 100 will calculate disability simulation results based on the_current and on the_proposed data Details:
Assumption: a period of simulation is equivalent to a year of simulation.

The simulation probabilities are determined based on data collected during the simulation process.

1) Collect asset balance for each period of an individual simulation run:

The system 100 will determine the maximum number of periods of a single simulation by subtracting the first client's (or surviving client's) current age from the life expectancy of the client. In the case of a survivor goal for a single client, the simulation periods is equal to the survivor period entered in the Risk Goal Assumptions.

the system 100 will simulate the lesser of the max number of periods or the retirement period in which they run out of money.

at the end of each period simulated, the system 100 will collect the ending asset balance (if the clients run out of money prior to the last period of simulation, the balance for those un-simulated periods has been preset to 0.0).

2) Summarize the results collected from each simulation run:
for each period x in each run, the system 100 will increment a counter if the ending period balance is greater than 0.0.

after going through each period for each run, the system 100 will have the total number of times there was a positive ending balance for that period.

For each period, the system 100 will divide the total number of times there was a positive ending balance by the total number of runs. This provided the probability of success for that individual period.

3) The system 100 will determine the summary probability for success to be the probability of success of the final simulation period.

current_lifetime_summary_probability—based on client data proposed_lifetime_summary_probability—based on advisor modifications current_ltc_summary_probability—based on client data proposed_ltc_summary_probability—based on advisor modifications current_disability_summary_probability proposed_disability_summary_probability—based on advisor modifications in analyze current_survivor_summary_probability proposed_survivor_summary_probability_advisor_selected—based on advisor modifications in analyze 4) The system 100 will provide detailed probability results for a simulated goal:

Additional feature: Japanese Lightning wants the disability simulation to show the probability success for each period of simulation rather than the probability of success based on various levels of disability benefit amounts.

Disability, Lifetime and Long Term Care Goal Simulation Detailed Results:

The system 100 will provide the probability of success for each period of simulation.

The system 100 will provide that detail for both the_current and the_proposed current_disability_detail_probability current_lifetime_detail_probability current_ltc_detail_probability proposed_disability_detail_probability proposed_lifetime_detail_probability proposed_ltc_detail_probability Survivor Goal Simulation Detailed Results:

The system 100 will provide the summary probability of success for the_current, for the_proposed, and for each of the additional scenarios that are based on additional insurance benefits that were derived from the additional insurance the advisor proposed in the_proposed scenario. (See Survivor simulation: Graph points sections #133)

current_survivor_summary_probability proposed_survivor_summary_probability_advisor_selected proposed_survivor_summary_probability_system_generated_1 proposed_survivor_summary_probability_system_generated_2 proposed_survivor_summary_probability_system_generated_3 proposed_survivor_summary_probability_system_generated_4

Outstanding Issues:

Title:

Simulation: Goal Simulation Overview—Lifetime Summary #124

Parent: Goal Simulation Overview—Lifetime #124

Summary:

The system 100 will follow the rules laid out in the Goal Simulation Overview Summary.

In general, the system 100 will track incomes and expenses during the post-retirement period The system 100 will track certain incomes and expenses that occur in the pre-retirement period as defined in the Goal Simulation Overview—Lifetime The system 100 will adjust the retirement_living_expenses by the LTC Goal Assumptions' long_term_care_percent_of_lifestyle_expense starting at the first confinement The system 100 will assume that the older client goes into a long term care confinement 11 years prior to the simulation end and is confined for 5 years, then dies so any incomes for that client will stop. The client may be retired at or prior to confinement so if the retirement of the client has not occurred 11 years prior to the simulation end, the confinement start will be the lesser of 11 years from simulation end or the retirement of the older client. The confinement end will be the lesser of 5 years or years to simulation end.

The system 100 will assume that the younger client or a single client goes into a long term care confinement 5 years prior to the simulation end and is confined for 5 years, then dies at the end of simulation. The client may be retired at or prior to confinement so if the retirement of the client has not occurred 5 years prior to the simulation end, the confinement start will be the lesser of 5 years from simulation end or the retirement year of the older client. The confinement end will be the lesser of 5 years or years to simulation end.

The system 100 will get the annual nursing home or care cost from the Long Term Care Goal Goal Assumptions The system 100 will include long_term_care_additional_income if entered in the Long Term Care Goal Assumptions The system 100 will not include individual accumulation goals or education goals in the Long Term Care Goal simulation if 1) long_term_care_accumulation_goalX_indicator/long_term_care_education_goalX_indicator is not set AND 2) the goal duration extends into the confinement start of the older client:

Case Example:

the older client's confinement starts in 2020 accumulation goal that occurs in the years 2018-2021 advisor indicated that the accumulation goal is not to be included in the long term care goal Simulation treatment: there would be a goal expenses in the years 2018 and 2019; however, since the confinement period starts in 2020 and the accumulation goal is to be excluded in the long term care goal, the accumulation goal will not occur in 2020 and 2021. This treatment makes the Lifetime simulation and Long Term Care Goal simulation the same up to the confinement period of the older client.

Outstanding Issues:

APPENDIX C

Title: Stochastic Methodology—Sampling Process for Simulation

Section: 123

Summary:

System 100 will measure clients' probability of successfully reaching all of their financial goals over many different market conditions. The system 100 will stochastically vary the market forces over the length of the clients' financial future (simulation_duration). The system 100 will also project the clients' financial future thousands of times so that we can measure a probability of success over many thousands of possible futures.

For purposes of this system 100, the key market forces are the following:
- Inflation rate;
- Return on cash investments;
- Return on fixed-income investments; and
- Return on equity investments.

This section will describe how the system 100 will sample these variables stochastically to create the various lifetime and protection simulations.

Details:

Sampling Methodology

The stationary bootstrap methodology that is used for Apex Select should be used for System 100. Because this methodology is confidential, detailed specifications will not be given in this document. The methodology was discussed with Mitsui content experts, along with other sampling choices. Mitsui prefers to use the stationary bootstrap.

The methodology will be localized as follows:
- The indexes used will reflect the investment opportunities available. The indexes are:
  - Inflation: Consumer Price Index (All Country General)
  - Cash Equivalents: Postal Savings Certificates Less than 1 year
  - Fixed Income: International Monetary Fund Country Long-Term Government Bond—Total Return with dividends
  - Equities: MSCI Country Stock—Total Return with dividends
  - The data sent is attached below:
- The sampling timeframe will reflect Mitsui's view of the future investment market's behavior. The indexes will be sampled from a timeframe of December 1977-December 2000.
- The _p-value_ will be appropriate for the indices characteristics. (The process to determine the p-value is also considered strictly confidential. The process and analysis will be on file, but not available for general reference.) See Section #147.

Stability of Results—Number of Simulations

In order to reach a high degree of confidence in the probability of success, the system 100 will run enough simulations for the results to be stable—each time the probability of success is run, the result should not be very different from prior results. Each individual simulation result can take on one of two possible values: successful or unsuccessful. This is a binomial distribution. Therefore, we consider 6,750 runs the number that is desired to obtain a precision of 1% with a 90% level of confidence.

The actual results may vary more than 1%. If the actual results vary by more than 1% so often that we feel the results are not stable or outside of our confidence level, then we can increase the results.

Performance

Conversely, if the simulation time is so great that performance is unacceptable, we can to decrease the number of runs.

Calculating and Displaying the Probability of Success

When we display the _probability_ for each simulation, normal rounding rules should be used to show the nearest whole percentage. Specifically:
- Round up for values greater than or equal to 0.5%;
- Round down for values less than 0.5%.

However, when the calculated probability is less than 5%, "<5%" should be displayed to the client and, when the calculated probability is greater than 95%, ">95%" should be displayed to the client.

Maintaining and Updating the Index Data

Annually, the impact of updating the monthly index data on the simulation results will be evaluated.

Outstanding Issues:

Title: Lite: Lifetime Simulation Sections

Purpose/Description:

The purpose of this section is to explain the business rules that should be used during the simulation. This section also explains how each major input should be treated in the simulator.

Methodology

The stationary bootstrap methodology that was used for MCI should also be used for System 100. The difference is that we will use a cash/fixed/equity mix for System 100 rather than just a fixed/equity mix as we did in MCI. The following spreadsheet contains the inflation, cash, fixed and equity data that should be used for sampling.

For each simulation, we should run 6,750 iterations as we did in MCI. We realize that we can reduce this number for performance reasons though.

When we calculate the probability for each simulation (number of iterations in which ending asset balance was >0 divided by total number of iterations), normal rounding rules should be used to round to the nearest whole percentage. However when the calculated probability is less than 5%, "<5%" should be displayed to the client and when the calculated probability is greater than 95%, ">95%" should be displayed to the client.

Determining the Projection Period for the Lifetime Simulation

Calculate Client 1's current age. (If their month of birth is less than or equal to the month of the analysis start date, then current age=year of analysis start date minus year of birth. Else current age=year of analysis start date minus 1 minus year of birth.—Added "or equal to".

Number of years in the projection period is then equal to Client 1's age at the end of the projection minus Client 1's current age The same projection period will be used for disability and long-term care See death goal sections for specific information regarding the projection period for death Summary of projection period for death: For a two client case we will use the life expectancy of the surviving client (behind the scenes lookup to single life expectancy table, advisor will not be able to override). For a one client case, the advisor will enter the survivor period in goal assumptions.

Determining Client Age and the Year for each Period During the Simulation

The first period of the projection will always be the year of the analysis start date regardless of whether the month is January or December.

We will calculate the current age for both clients to determine their beginning age for the simulation.

The year and age will then be incremented by one for each year of the simulation to determine when cash flows start and stop.

Example—given an analysis start date of Feb. 2, 2001, Client 1's birth date of Jan. 4, 1968 and Client 2's birth date of Apr. 6, 1970:

In the first year of the projection, we would look for cash flows in existence in the year 2001 and at Client 1's age 33 and Client 2's age 30.

In the second year of the projection, we would look for cash flows in existence in the year 2002 and at Client 1's age 34 and Client_2's age 31.

Etc.

Processing Order for Simulation
  Get inflation and growth rates for the current period.
  Apply inflation (Exception—inflation should not be applied in the first period. Note that this could be accomplished by setting the inflation rate to 1 for the first period.)
  Process any RMDs and apply tax on RMDs
  Process incomes and apply tax on income (tax=taxable income*average tax rate entered)
  Process expenses
  Add savings to "non-qualified" savings bucket and "qualified" assets.
  If after-tax income and RMDs exceeds expenses and phantom loan balances and savings (employee portion only), the excess should be added to "non-qualified" assets. (Note that in "happy" situations when we are not tracking income vs. expenses, excesses are ignored.)
  If expenses and phantom loan balances and savings (employee portion only) exceed after-tax income and RMDs, the shortage should be subtracted from assets based on the following order: 1) "non-qualified" assets, 2) "non-qualified" savings 3) "qualified" of older client and 4) "qualified" of younger client. When "qualified" assets are used to cover a shortage, the amount desired to cover the taxes on the "qualified" assets withdrawn should be withdrawn at the same time. This can be accomplished by taking the amount of the withdrawal and dividing by (1−the average tax rate entered).
  Calculate the end of period asset balances and apply growth to those balances.
Calculating Phantom Revolving Loans
  In situation #8 above, when the shortage has consumed all non-qualified and qualified assets, a phantom revolving loan balance should be created. It is calculated as the remainder of the shortage, increased by a phantom interest rate. This interest rate is calculated as the modeled inflation rate plus 6.1%. Thus, the phantom interest rate will change each year. In the next year the loan balance is added to any cash flow shortage or subtracted from any cash flow surplus before applying the surplus or shortage to assets in the order previously specified. In such a way, regular savings will in effect pay down phantom loan balances. In years that there is a phantom loan balance, all asset balances will naturally be zero, so asset balance can still be the indicator of success. If at second retirement there is still a phantom loan balance, that particular simulation may be stopped as a failure. Talk to Linda Ostrem for questions on phantom loans.
Calculating RMDs
  RMDs should be withdrawn from "qualified" assets starting in the period in which the owner is age 71. The RMD should be calculated by taking the beginning of period balance for the owner's "qualified" assets divided by the number of periods remaining in the projection. The number of periods remaining in the projection is equal to Client 1's age at the end of the projection (input field) minus Client 1's age in the current period.
Applying Asset Growth
  The "Current" Cash/Fixed/Equity mixes will be calculated based on the asset classes of the client's holdings entered. See section "Determining rollup of investment class" for an explanation of how the asset classes roll up to the cash/fixed/equity level. We will use the holdings entered as taxable Other investment accounts to determine the cash/fixed/equity mix that will apply to "Non-qualified" assets and "Non-qualified" savings in the Current. The cash/fixed/equity mix is calculated by taking the value of the taxable cash holdings entered under "Other investment accounts" (excluding cash reserve) divided by the value of all taxable holdings (excluding cash reserve) entered under "Other investment accounts" to arrive at the % for the cash portion of the mix. This calculation is then repeated for fixed and equity.
  We will use the holdings entered as retirement plan accounts to determine the cash/fixed/equity mix that will apply to all "qualified" assets and savings in the Current. The cash/fixed/equity mix calculation is the same as for taxable Other invesment accounts. Just substitue "retirement plan account holdings" for "taxable holdings entered under "Other investment accounts" in the formula.
  Note that holdings entered under the cash value of a life insurance policy should not be factored into the calculation of the cash/fixed/equity mix calculations.
  Made the changes above to coincide with the field labels that are going to be used on the UI. Added the note about the holdings entered under cash value of a life insurance policy since we are now asking for the asset class breakdown of the cash value in the UI. Originally we were just going to ask for the amount of the cash value. Crossed out "exluding cash reserve" since there will no longer be a cash reserve asset class.
  In the remote situation that a client does not have any "qualified" assets but they entered "qualified" savings, we can use the mix of their "non-qualified" assets for the "qualfied" in the Current. In the even more remote situation, that they don't have "non-qualified" assets but entered "non-qualified" savings, we can use the mix of their "qualified" assets for the "non-qualified" in the Current.
  The Portfolio section "Determining the Proposed Cash/Fixed/Equity Simulation Portfolio" explains how to arrive at the "Proposed" Cash/Fixed/Equity mixes that will be used for 1) "Non-qualified" assets, 2) "Non-qualified" savings and 3) "Qualified" assets and savings.
  Note that the current and proposed mixes are determined based on the "happy" scenario and then applied to all the protection goal scenarios. In other words, we will not recalculate the current mix in the death scenario or recommend a different proposed mix for disability or ltc. The mixes that we arrive at in the "happy" scenario will be applied throughout.
  Once the cash/fixed/equity mixes are determined, the investment return is calculated by applying the portfolio weight to the corresponding simulated return for the period (i.e. cash %*the cash return). For "Non-qualified" buckets, the investment return should then be multiplied by (1−average tax rate entered) to arrive at the after-tax growth rate.
  Use of Inputs in the Simulator
  The following table explains how each major input should be treated in the simulator. Note that this table contains general statements regarding when cash flows start and stop and how they are inflated. The sections that follow for each goal (i.e. lifetime, DI, death, LTC) explain when incomes and expenses should be taken into consideration for that particular goal.

| Input | How it works in simulator |
|---|---|
| Incomes Employment, Self-employment and Bonus | Note that there is not a limit to the number of incomes that can be entered Gross amount entered should be converted to an annual amount. Should grow at modeled inflation rate. Should stop at the owner's retirement age (income should not be included in the period equal to their retirement age). The advisor will not be entering a % taxable, but we should calculate the % taxable behind the scenes. The % should be calculated as follows: 100% minus (total (plan deferrals and "Other") annual pre-tax deductions entered/annual gross income). In the proposed, the pre-tax deductions in the numerator should be increased if the advisor enters additional employee salary deferral contributions (input exists for a 401(k), 403(b), Section 457, Other defined contribution plan, SEP, SIMPLE IRA or SIMPLE 401(k)). Taxes should be applied to the portion that is taxable (gross amount * % taxable calculated). -- Deleted SEP since the SARSEP option was removed from the UI. |
| Investment Pension | Ignored for simulation purposes. Annual amount entered should grow at modeled inflation rate if COLA option was selected. If the COLA option was not selected the annual amount will not grow over time. Should start at the later of the owner's retirement age or the year entered in the Year Begins field (full year of income should be included in the period that it starts). Should stop at the earlier of the year entered in the Year Ends field or the end of the projection. (If a specific year is entered in the Year Ends field, no income should be included for that period.) Taxes should be applied to the portion indicated as taxable in the Percent Taxable field. |
| Other | Annual amount entered should grow at modeled inflation rate. Should start at the year entered in the Year Begins field (full year of income should be included in the period that it starts). Should stop at the earlier of the year entered in the Year Ends field or the end of the projection (no income should be included in the period that it stops). Taxes should be applied to the portion indicated as taxable in the Percent Taxable field. |
| Social Security - Current benefit received Amount entered by advisor (if the advisor entered an amount, it should always be used in the analysis regardless of whether the advisor checked the box to include a system calculated estimate) -- | The annual amount entered should grow at half the modeled inflation rate. Should start at the later of the client's retirement or age 62 and continue until the end of the projection. Taxes should be applied to 50% of the income. If the client is not yet retired or retired and less than age 62, the benefit entered should be adjusted to the benefit at the later of the client's retirement or age 62. |
| Social Security - System-calculated estimate of future benefit (if they entered a current benefit for the owner, they will not be able to enter this one) (an estimate should be calculated if the advisor did not enter a benefit amount AND they checked the box to include an estimate) -- | If the advisor did not enter a benefit amount and indicated that a retirement benefit system-calculated estimate should be included in the analysis, the benefit should start at the later of the owner's retirement age or age 62 (full year of income should be included in the period that it starts) and continue until the end of the projection. Taxes should be applied to 50% of the income. The amount calculated by the system will be their Normal Retirement Age benefit in today's dollars. Therefore, the benefit can be adjusted based on their actual retirement age and should grow at half the modeled inflation rate. |
| Business | Refer to the "Small business owner without business planning section" |
| Residence and Personal Assets (and associated expenses) | Note that there is not a limit to the number of personal assets and residences that can be entered. Therefore the number of associated liabilities is also unlimited. |
| Value of residence | Ignored for simulation purposes. |
| Mortgage and Home equity loan | Annual payment continues as an expense until the end date. We will not recognize a fractional payment in the final year, so include a full annual payment (conservative approach) in the period equal to the end year. The payment does not grow with inflation. |
| Real estate taxes (we will not be asking for real estate taxes as a separate input. Therefore ignore this section.) | Annual amount continues as an expense until the end of the projection. Should grow at the modeled inflation rate. Would not need to be tracked separately from living expenses (could just be added to living expenses) since they are treated the same. |
| Value of personal and other noninvestment assets | Ignored for simulation purposes. |
| Associated liabilities | Annual payment continues as an expense until the end date. We will not recognize a fractional payment in the final year, so include a full annual payment (conservative approach) in the period equal to the end year. The payment does not grow with inflation. |
| Investment Assets | |
| Retirement accounts - current value | The value of all assets entered under retirement accounts plus the current balance of any outstanding loans on retirement plans should roll to the owner's "qualified" pool for simulation purposes. See section "Determining rollup of investment class" for an explanation of how to map the asset class entered to cash, fixed or equity. |
| Retirement accounts - contributions | The employee contribution will be entered as an annual dollar amount on the retirement plan screen. Employer contributions may be entered as an annual dollar amount, straight< % or employer match depending on the type of plan. When employer contributions are entered as a straight % (i.e. profit sharing contribution or nonelective contribution) - deleted profit sharing since it was removed from the UI, the annual amount of that employer contribution should be determined by multiplying the % entered times the annual gross employment income for that client (the one tied to the plan if more than |

| Input | How it works in simulator |
|---|---|
| | one income is entered). employer contributions will never be entered as a straight %. A nonelective contribution will be entered as a dollar amount, so no conversion will be necessary. When employer contributions are entered as matches, the annual amount of the employer contribution should be determined as follows:<br>First calculate the employee salary deferral % by taking the annual amount of the employee contribution and dividing by the annual gross employment income for that client (the one tied to the plan if more than one income is entered).<br>Then given inputs of "Employer matches A % of the first B %"<br>"After which they match C % of the next D %",<br>the annual amount of the employer contribution should be determined by the following formula:<br>[A % times the minimum of (the employee salary deferral % entered and B %)] times the annual gross employment income tied to the plan<br>plus<br>0 if the employee salary deferral % entered is < or equal to B %<br>or if the employee salary deferral % entered is >B % add<br>[C % times the minimum of (the employee salary deferral % entered minus B % and D %)] times the annual gross employment income tied to the plan.<br>Note that more than one type of employer contribution (straight dollar amount and % match) could be entered for a given plan, so the two can be summed to arrive at the total employer contribution. Annual contribution amounts calculated should grow at modeled inflation rate. Should stop at the owner's retirement age (contribution should not be included in the period equal to the owner's retirement age). Employee and employer contributions should be added to the owner's "qualified" pool. In any situation where we are calculating income shortage or surplus (after first retirement, disability or death), the employee portion of the contribution should be considered as an expense. |
| Retirement accounts - outstanding loans | Annual payment continues as an expense until the end date. We will not recognize a fractional payment in the final year, so include a full annual payment (conservative approach) in the period equal to the end year. The payment does not grow with inflation. For simulation purposes, we will ignore the fact that a portion of their retirement assets would grow at a different rate (loan rate) until the loan is paid off. |
| Taxable Other investment accounts assets - current value<br>Changed wording to be consistent with UI and deleted note about cash reserve, since there is no longer a cash reserve asset class. | The value of all assets (except those with a cash reserve asset class) entered under taxable other investment accounts assets should roll to the "nonqualified" asset pool for simulation purposes. See section "Determining rollup of investment class" for an explanation of how to map the asset class entered to cash, fixed or equity. Assets with a cash reserve asset class will be excluded for simulation purposes. |
| Taxable Other investment accounts assets - contributions<br>Changed wording to be consistent with UI and deleted note about cash reserve, since there is no longer a cash reserve asset class.<br>Policies | Annual contributions entered (excluding cash reserve savings) should grow at modeled inflation rate. Should stop at the owner's retirement age (contribution should not be included in the period equal to the owner's retirement age). If the owner is "Both" clients, The contributions should stop at the first retirement. Should be added to the "nonqualified" savings pool.<br>-- From a programming standpoint, it is easier to just say that all "Other investment asset" savings stop at the first retirement. Since any excess will get invested in "nonqualified" after the first retirement, the net effect will be the same so I am fine with this approach. |
| Life insurance - cash value | Ignored for simulation purposes. |
| Life insurance - annual premium | Annual premium entered should not grow with inflation. Should stop at the earlier of the policy termination date or the end of the projection. If an ownership type of "Other" or "Irrevokable trust" is entered, the premium expense should be ignored. - Added irrevokable trust since it was added as an option in the dropdown. |
| Life insurance - benefit | See death use cases for an explanation of how the benefit will affect the death scenario. Summary of use cases - death benefit proceeds are added to the non-qualified asset pool. |
| Disability insurance - annual premium | Portion of the annual premium that the client is paying should inflate at 3% if there is a COLA on the benefit. If there is not a COLA on the benefit, the premium expense (portion of the annual premium that the client is paying) should not inflate. Should stop at the insured's retirement age. |
| Disability insurance - benefit | Any benefit from the client's disability policies (note there are separate entries for the benefit amount in the first year vs. following years) would be added during the assumed period of disability (up to the benefit end date entered for each policy). The annual benefit entered should be inflated at 3% if there is a COLA on the policy. Otherwise it should not grow with inflation. If the % of premium that the client is paying is 0%, the benefit is fully taxable. Otherwise no taxes should be applied to the benefit. |
| Long-term care insurance - annual premium | Annual premium entered should not grow with inflation and should continue until the end of the projection. |
| Long-term care insurance - benefit | Any benefit from the client's long-term care policies would be added during their assumed long-term care stay. If the benefit period for a policy is less than six years (assumed long-term care stay), we can stop the benefit after the term of the benefit period entered. The annual benefit entered should be inflated at 5% if there is a benefit increase option. Otherwise it should not grow with inflation. A portion of the benefit may be taxable. See the long-term care use case for details. |
| Living Expenses | Prior to the first retirement, use the annual living expense number that we back into via the formula. At the first retirement switch to the estimate of retirement living expenses entered by the advisor (for the Proposed, use the product of the retirement living expenses entered by the advisor and the % change selected on the retirement living expense "slider"). Both expense numbers are in today's dollars and should grow at the modeled inflation rate. |

| Input | How it works in simulator |
|---|---|
| Goal Assumptions | |
| Cash reserve goal -- Cash reserve is now an explicit goal in the UI so it can be added as an expense in the simulation. | The goal amount entered should be treated as an expense in the first period. Since it will always occur in the first period, inflation does not apply. |
| Accumulation goal (note that 2 accumulation goals may be entered) | The annual amount entered (for the Proposed use the product of the annual amount entered and the % change selected on the corresponding accumulation goal "slider") should grow at the modeled inflation rate and should be treated as an expense in the periods that it applies. It should start in the begin year entered and continue for the number of years entered. Final year of expense would be in the period equal to the begin year + # of years − 1. |
| Education goal (note that 4 education goals may be entered) -- The number of children that can be entered is now essentially unlimited (I think the limit is 20). | The annual amount entered (for the Proposed use the product of the annual amount entered and the % change selected on the education goal "slider") should grow at the modeled inflation rate plus 2.6% and should be treated as an expense in the periods that it applies. It should start in the begin year entered and continue for the number of years entered. Final year of expense would be in the period equal to the begin year + # of years − 1. |
| Income tax goal assumptions | Ignored for simulation purposes. |
| Average tax rate | Used to calculate tax on income, RMDs, "nonqualified" investment return, and "qualified withdrawals". Note that the same rate will be used for all goals. |
| Goal assumptions for disability, death and long-term care Lifetime (happy) analysis | Usage is explained below. |

Prior to retirement, just add to assets what the client tells us they are currently saving (using inflated savings amounts over time) and withdraw from assets to cover accumulation or education goals that occur prior to the first retirement. At the first retirement start looking at the difference between projected income and expenses. Shortages should be withdrawn from assets and excesses should be added to nonqualified assets.

Summary of Differences from Lifetime Simulation for the Protection Goals

Disability analysis (See the Disability Use Case for more detail)

The client is assumed to be disabled for the first twelve years of the disability projection. (The preference is to show 10 years of full disability followed by 2 years of partial disability. We realize that the 2 years of partial disability may not be feasible from a scope standpoint though.) The disability period should not extend beyond their retirement age though.

During the twelve years of assumed disability (this is for full disability—additional adjustments can be made if we implement the two years of partial disability)
  The current annual living expenses are adjusted according to the % input for the disability goal assumption. In a two-client case, if the other client is retiring within the first twelve years of the projection, then at the other client's retirement age the simulator would switch to the retirement living expenses entered. The retirement living expenses would then also be adjusted according to the % input for the disability goal assumption until the end of the assumed disability period.
  Any new source of income in the event of disability (entered in goal assumptions) is added.—Note that this income applies during the period of disability. This income is assumed to be fully taxable and should grow at the modeled inflation rate.
  If the advisor chose to exclude accumulation or education goals in the event of disability (via goal assumptions), those goals should not be added as expenses (should not be included in the disability simulation regardless of when they occur—during the assumed disability or after).
  Any benefit from the client's disability policies (note there are separate entries for the benefit amount in the first year vs. following years) would be added during the assumed period of disability (up to the benefit end date entered for each policy). The annual benefit entered should be inflated at 3% if there is a COLA on the policy. Otherwise it should not grow with inflation. If the % of premium that the client is paying is 0%, the benefit is fully taxable. Otherwise no taxes should be applied to the benefit. The disabled client's earned income (employment, self-employment and bonus), the disabled client's retirement plan savings (employee and employer), and all taxable account savings should stop during the assumed disability period.
  The premium expense should stop on any disability policy of the disabled client that has a waiver of premium on it.
After the twelve years of assumed disability:
  The client's earned income (employment, self-employment and bonus) and retirement plan savings will start back up at the amount entered in data input. The income should not inflate during the DI period, but should start growing at the modeled inflation rate after the assumed disability period.
  The taxable account savings should start back up at the inflated value.
  Any disability premiums that were waived during the disability period should start back up at the inflated value (if inflation applies due to a COLA on the policy).
  The living expenses should no longer be adjusted by the % input for the disability assumptions.
  Any new source of income in the event of disability should be stopped.

Summary of How to Arrive at the Five Levels of Disability Insurance to Simulate in the Proposed:

The first time the advisor enters the analysis hub, the slider will be defaulted to the maximum value. The five points simulated wil be 60% of the max, 70% of the max, 80% of the max, 90% of the max and the maximum value.

Due to the way the UI was manifested using the Add policy feature rather than a slider, the proposed will have to default to no additional coverage. Therefore until a policy is added in the proposed, the five points simulated should be: no additional coverage, 10% of max the client is eligible for, 20% of max the client is eligible for, 30% of max the client is eligible for and 40% of max the client is eligible for. The amounts calculated should be used for the benefit in the first year and the benefit in the following years.

Making changes below to be consistent with the way the UI was manifested (Add policy feature rather than a slider). We never want to simulate a point higher than the maximum value on the slider that the client is eligible for. Therefore, the following rules should apply when something other than the maximum value is selected on the slider after a policy has been added in the proposed:

If 110% of the amount selected on the slider of additional coverage recommended in the proposed exceeds the maximum value that the client is eligible for, the following points should be simulated:

70% of slider amount additional coverage in proposed, 80% of slider amount additional coverage in proposed, 90% of slider amount additional coverage in proposed, slider amount additional coverage recommended in proposed, maximum value on slider that the client is eligible for Else if 120% of the amount selected on the slider exceeds the maximum value, the following points should be simulated:

80% of slider amount additional coverage in proposed, 90% of slider amount additional coverage in proposed, slider amount additional coverage recommended in proposed, 110% of slider amount additional coverage in proposed, maximum value on slider that the client is eligible for Else the following points should be simulated:

80% of slider amount additional coverage in proposed, 90% of slider amount additional coverage in proposed, slider amount additional coverage recommended in proposed, 110% of slider amount additional coverage in proposed, 120% of slider amount additional coverage in proposed Additional coverage recommended in the proposed is the benefit amount in the "First year" and "Following years" field (i.e. if different amounts were entered for the first year and following years, different amounts should be used for the four other points simulated with the percentage increase or decrease applying to the amounts entered in each field).

Note that the premium entered for the new coverage in the proposed can be used in all five simulations. Even though we will be changing the amount of coverage in the five simulations, we can just use the same premium as it would be difficult to arrive at a rule of thumb to adjust the premium expense. Since the preretirement living expenses are reduced by the amount of the new premiums in the proposed, this assumption should have a minimal impact on the probability.—Before any policies are added in the proposed, we will just have to use $0 for the premium in the five simulations (no additional coverage, 10% of max, 20% of max, 30% of max and 40% of max).

Long-Term Care Analysis (See LTC Use Case for More Detail)

For a one-client case, the client is assumed to spend the last six years of their life in long-term care.

For a two-client case, during the last twelve out of thirteen years of the simulation it is assumed that one of the clients will be in long-term care (six-year stay followed by one year break followed by six-year stay).

We will never assume that the client enters long-term care prior to retirement though. This could result in a shortened projection period for long-term care. See the use case for details.

The simulation for the long-term care analysis is the same as the lifetime analysis up until the starting period for long-term care. At the starting period for long-term care:

The retirement living expenses (amount entered in data inputs for Current or amount entered in data inputs*% change selected on retirement living expense "slider" for Proposed) are adjusted according to the % input for the long-term care goal assumption.

The cost of long-term care (entered in goal assumptions and inflated at 5%) is added as an expense (does not apply during the one-year break for a two-client case though).

Any new source of income in the event of long-term care (entered in goal assumptions) is added. Note that this income applies during the assumed long-term care stay (last 13 years for 2 client, 6 years for 1 client). This income is assumed to be fully taxable and should grow at the modeled inflation rate.

If the advisor chose to exclude accumulation or education goals in the event of long-term care (via goal assumptions), the goals occurring within the period of the assumed long-term care stay (last 13 years for 2 client, 6 years for 1 client) would not be added as expenses.

Any benefit from the client's long-term care policies would be added during their assumed long-term care stay (for the benefit period entered for each policy). The annual benefit entered should be inflated at 5% if there is a benefit increase option. Otherwise it should not grow with inflation.

A portion of the benefit may be taxable. See the use case for details.

The premium expense should stop on any long-term care policy that has a waiver of premium once the insured client has begun their assumed long-term care stay.

Death Analysis (See Death use Cases for More Detail)

Incomes, savings and expenses tied to the decedent would be gone. Any assets passed to charity would also be gone. Assets passed to "Other" for a two client case would also be gone.

Any insurance proceeds would be added to non-qualified assets.

Living expenses are adjusted according to the % input for the death goal assumption. For a one-client case, the % applies to current living expenses (amount backed into via formula on input screen).

Retirement living expenses never come into play for a one-client case. For a two-client case, the % input for the death goal assumption applies to current living expenses prior to the survivor's retirement age after which the % applies to the retirement living expenses entered. In the proposed for a two-client case, as the retirement living expenses are adjusted via the retirement living expense "slider" the % input for expenses for the death goal would then apply to the adjusted retirement living expenses.

Example:
Current annual living expenses input—$30,000
Retirement annual living expenses input—$25,000
% adjustment to expenses for death—70%
% adjustment to retirement living expenses via the Proposed "slider"—85%
For a one-client case, use $21,000 ($30,000*0.70) for living expenses in the current and proposed.
For a two-client case—current scenario use $21,000 ($30,000*0.70) for living expenses prior to the survivor's retirement age and $17,500 ($25,000*0.70) thereafter.
For a two-client case—proposed scenario use $21,000 ($30,000*0.70) for living expenses prior to the survivor's retirement age and $14,875 ($25,000*0.85*0.70) thereafter.
Any new source of income in the event of death (entered in goal assumptions) is added.—Note that this income should continue until the end of the projection. This income is assumed to be fully taxable and should grow at the modeled inflation rate.
If the advisor chose to exclude accumulation goals in the event of death, those goals would not be included as expenses.
If the advisor chose to exclude education goals in the event of death, those goals would not be included as expenses.
Note that the premium entered for the new life insurance coverage in the proposed can be used in all five simulations (Jeffs section explains how to arrive at the points to simulate). Even though we will be changing the amount of coverage in the five simulations, we can just use the same premium as it would be difficult to arrive at a rule of thumb to adjust the premium expense.—I realized today that the issue of the premium to use for the other four simulations is a moot point, because the premium has no impact on the death scenario. The insured dies today, so the premium does not carry forward into the death simulation. The premium that is desired for the lifetime simulation is the premium associated with amount of coverage actually recommended and that premium will be entered by the advisor when they enter a new policy.

APPENDIX D

Title:
Simulation: Simulation Cashflow Definition—Incomes #71
Parent: Simulation Cashflow Definition #69
Referenced Sections:
Income section #12
Income Tax section 10
Estate Processor for Survivor section—#128
Social Pension: Overview #125
Social Pension: Calculated Old Age #120
Social Pension: Calculated Survivor #122
Long Term Care Social Benefits #127
Risk Goal Assumptions #88
Summary:
The system 100 will set up the income cashflows used in a simulation run for a goal simulation. Each income cashflow represents the net income or after-tax income that is derived from a data entry income type (See the Income Section #12). Since the tax is removed from the initial amount being simulated, there is no tax calculated on incomes during simulation.
The system 100 will include the after-tax cashflow amount to the total income for the period that is added to the regular_asset_simulation_portfolio, specified by the Model Portfolio Requirementswhich represents the clients' non-retirement existing assets, if 1) the cashflow start_period is less than or equal than the simulation period currently being processed AND 2) the cashflow end_period is equal to or greater to the simulation period currently being processed.
Whether an income is included in simulation is dependent on rules specific to the goal being simulated.
The start_period and end_period of an income included in simulation are based on rules specific to the goal being simulated.
The income is inflated based on sections specific to the INCOME_TYPE, not the goal being simulated.
Details:
1) bonus_income—for each income:
Localization—the Bonus income type should be removed as an option in the Data Entry section; since simulation doesn't do anything specifically related to bonus_income but pulls them in when it asks for Employment incomes, there will be no required simulation changes.
2) dividend_income—for each income:
The system 100 will not include any dividend_income for simulation purposes.
3) employment_income—for each income:
the system 100 will convert the employment_income_gross_amount to an amount based on the simulation frequency and the employment_income_frequency
the system 100 will simulate the after-tax income amount that is calculated by the formula: converted employment_income_gross_amount—(converted employment_income_gross_amount*average_tax_rate)
⇒localization section: there are no business specified deduction made to the employment_income_gross_amount prior to calculating the net income such as employee contributions to qualified/retirement plans or pre-tax deductions:
the system 100 will inflate the after-tax amount based on a stochastically determined inflation rate for each period except the initial period
Additional Feature:
There is a section that different tax rates are used for the pre-retirement and post-retirement periods. The tax rate used for the pre-retirement period would be client specific and would be the client_tax_rate_entered (see the Income Tax section 10). Having two different tax rates means that for the disability goal and survivor goal, an employment income could be represented by two cashflows
1) pre-retirement employment income: start_period of analysis_start_period; end_period of period prior to retirement_starting_period
2) post-retirement employment income (assumes that the client_retirement_start_period of the disabled_client occurs prior to the client_retirement_start_period of the non-disabled client): start_period of retirement_starting_period; end_period of client_retirement_start_period of payee
payee refers to employment_income_payee

| Goal | Inclusion | start_period | end_period |
| --- | --- | --- | --- |
| Lifetime | yes if client_retirement_start_period of payee is greater than retirement_starting_period | retirement_starting_period | period prior to client_retirement_start_period of payee |

-continued

| Goal | Inclusion | start_period | end_period |
|---|---|---|---|
| LTC | same | same as Lifetime | same as Lifetime |
| Disability | yes if payee is not the disabled client | first period of simulation based on analysis_start_date | same as Lifetime |
| Survivor | yes if payee is the survivor | first period of simulation based on analysis_start_date | same as Lifetime |

4) occasional_income—for each income:
  The system 100 will not include any occasional_income for simulation purposes.

5) miscellaneous_income—for each income:
  The system 100 will convert the miscellaneous_income_cash_received and the miscellaneous_net_taxable_income to amounts based on the simulation frequency
  The system 100 will simulate the net income amount that is calculated by the formula: converted miscellaneous_income_cash_received—(converted miscellaneous_income_net_taxable_income*average_tax_rate)
  The system 100 will inflate the amount based on a stochastically determined inflation rate for each period except the initial period Added Feature:
  There is a section that different tax rates are used for the pre-retirement and post-retirement periods. The tax rate used for the pre-retirement period would be client specific and would be the client_tax_rate_entered (see the Income Tax section 10). Having two different tax rates means that for the disability goal and survivor goal, two different cashflows may be defined:
  1) pre-retirement pension income: start_period of analysis_start_period; end_period of period prior to retirement_starting_period (assuming the year_miscellaneous_income_ends occurs after the first retirement)
  2) post-retirement pension income: start_period of the retirement_starting_period; end_period of year_miscellaneous_income_ends
year_end refers to year_miscellaneous_income_ends;
payee refers to miscellaneous_income_payee

| | | | |
|---|---|---|---|
| Lifetime | included if period of year_end >= retirement_starting_period | greater of retirement_starting_period or year_begin | lesser of year_end period or last_simulation_period |
| LTC | same as Lifetime | same | lesser of year_end period or confinement_end_period of payee |
| Disability | yes | first period of simulation based on analysis_start_date | same as Lifetime |
| Survivor | yes if payee is survivor | first period of simulation based on analysis_start_date | same as Lifetime |

6) company_benefits_income—for each company benefit income:
a) handle lump sum income
  The lump sum income company_benefits_retirement_allowance_net_amount is to be received in the period of the company_benefits_retirement_allowance_payment_age.
  The lump sum is special in that it affects asset balance in the lifetime simulation even if it occurs prior to client_retirement_start_period of the company_benefits_payee.
  The system 100 will simulation the company_benefits_retirement_allowance_net_amount, which is the after-tax amount
  The system 100 will inflate the after-tax amount
payee refers to company_benefits_payee

| Goal | Inclusion | start_period | end_period |
|---|---|---|---|
| Lifetime | yes | the period of the company_benefits_retirement_allowance_payment age | same as start_period |
| LTC | yes | same | same |
| Disability | yes if payee non-disabled client | same | same |
| Survivor | yes if payee is survivor | same | same | b) handle pension-like income
  The system 100 will convert the company_benefits_pension_gross_amount based on the simulation frequency
  The system 100 will calculate the after-tax amount as follows:
  Converted company_benefits_pension_gross_amount—(company_benefits_pension_gross_amount*average_tax_rate)
  system 100 will simulate the after-tax amount
  The system 100 will inflate the after-tax amount based on a stochastically determined inflation rate for each period except the initial period.

Added Feature:
  There is a section that different tax rates are used for the pre-retirement and post-retirement periods. The tax rate used for the pre-retirement period would be client specific and would be the client_tax_rate_entered (see the Income Tax section 10). Having two different tax rates means that for the disability goal and survivor goal, two different cashflows may be defined:
  1) pre-retirement pension income: start_period based on year_company_benefits_pension_begins; end_period of period prior to retirement_starting_period
  2) post-retirement pension income: start_period of the retirement_starting_period; end_period of year_company_benefits_pension_ends
payee refers to company_benefits_payee

| Goal | Inclusion | start_period | end_period |
|---|---|---|---|
| Lifetime | yes if the year_company_benefits_pension_ends >= retirement_starting_period | greater of the period of year_company_benefits_pension_begins or retirement_starting_period | period of year_company_benefits_pension_ends |

-continued

| Goal | Inclusion | start_period | end_period |
|------|-----------|--------------|------------|
| LTC | same as Lifetime | same | lesser of year_company_ benefits_pension_ ends or confinement_end_ period of payee |
| Disability | yes if payee non-disabled client | period of year_company_benefits_ pension_begins | same as Lifetime |
| Survivor | yes if payee is survivor | period of year_company_benefits_ pension_begins | same as Lifetime | c) handle death benefit

The death_benefit_amount is not addressed by the lifetime, long term care, or disability goal. However, it will be dealt with in the survivor goal through the estate processing (See Estate Processor for Survivor section—#128).

8) Social_pension—for each income:
a) handle retirement pension:
The system 100 will simulate the cashflows determined by the Social Pension sections (#120-122, 125)
The system 100 will inflate the calculated amount based on a stochastically determined inflation rate for each period except the initial period.

| Goal | Inclusion | start_period | end_period |
|------|-----------|--------------|------------|
| Lifetime | yes if meets rules in #120 | greater of the start year period determined by the Social Pension Requirement or retirement_starting_period | based on Social Pension rules |
| LTC | yes if meets rules in #120 | same as Lifetime | based on Social Pension rules and confinement_end_ period of payee |
| Disability | yes if payee is non-disabled client and meets rules in #120 and #121 | period determined by the Social Pension Requirement | based on Social Pension rules |
| Survivor | yes if payee is survivor and meets rules in #120 and #122 | period determined by the Social Pension Requirement | based on Social Pension rules |

Social Pension—disability pension
The system 100 will simulate the cashflows determined by the Social Pension sections #121
The system 100 will inflate the calculated amount based on a stochastically determined inflation rate for each period except the initial period.

| Goal | Inclusion | start_periods | end_period |
|------|-----------|---------------|------------|
| Lifetime | no | | |
| LTC | no | | |
| Disability | yes if disabled client and meets rules in #121 | period determined by the Social Pension Requirement | period determined by the Social Pension Requirement |
| Survivor | no | | |

Social Pension—long term care pension
The system 100 will take the long term care benefit determined by the Social Pension sections #127 into account when determining the nursing home cost (see Simulation Cashflow Definition—Living Expenses #75)

| Goal | Inclusion | start_period | end_period |
|------|-----------|--------------|------------|
| Lifetime | no | | |
| LTC | yes | confinement_start_period of client | confinement_end_period of client |
| Disability | no | | |
| Survivor | no | | |

Social Pension—survivor pension
cashflows determined by the Social Pension sections #122
The system 100 will inflate the calculated amount based on a stochastically determined inflation rate for each period except the initial period.

| Goal | Inclusion | start_period | end_period |
|------|-----------|--------------|------------|
| Lifetime | no | | |
| LTC | no | | |
| Disability | no | | |
| Survivor | yes if surviving spouse and/or minor children and meets rules in #122 | period determined by the Social Pension Requirement | period determined by the Social Pension Requirement |

9) fixed_miscellaneous_income—for each income:
The system 100 will convert the fixed_miscellaneous_income_cash_received and the fixed_miscellaneous_net_taxable_income to amounts based on the simulation frequncy
The system 100 will simulate the net income amount that is calculated by the formula:
converted fixed_miscellaneous_income_cash_received—(converted fixed_miscellaneous_income_net_taxable_income*average_tax_rate)
The system 100 will not inflate the amount
Added Feature:
There is a section that different tax rates are used for the pre-retirement and post-retirement periods. The tax rate used for the pre-retirement period would be client specific and would be the client_tax_rate_entered (see the Income Tax section 10). Having two different tax rates means that for the disability goal and survivor goal two different cashflows may be defined:
1) pre-retirement pension income: start_period of analysis start_period; end_period of period prior to retirement_starting_period (assuming the year_fixed_miscellaneous_income_ends occurs after the first retirement)
2) post-retirement pension income: start_period of the retirement_starting_period; end_period of year_fixed_miscellaneous_income_ends
year_end refers to year_fixed_miscellaneous_income_ends; payee refers to fixed_miscellaneous_income_payee

| Goal | Inclusion | start_period | end_period |
|------|-----------|--------------|------------|
| Lifetime | included if period of year_end >= retirement_starting_period | greater of retirement_starting_period or year_begins | lesser of year_end period or last_simulation_period |

-continued

| Goal | Inclusion | start_period | end_period |
|------|-----------|--------------|------------|
| LTC | same as Lifetime | same | lesser of year_end period or confinement_end_period of payee |
| Disability | yes | first period of simulation based on analysis_start_date | same as Lifetime |
| Survivor | yes if payee is survivor | first period of simulation based on analysis_start_date | same as Lifetime |

10) additional_income:

This income represents additional income in the case of a protection goal (See Risk Goal Assumption section #88).

The system 100 will convert the additional_income (disability_additional_income, survivor_additional_income, long_term_care_additional_income) to an amount based on the simulation frequency The system 100 will simulate the additional_income that is an after-tax amount The system 100 will inflate the amount based on a stochastically determined inflation rate for each period except the initial period.

Additional feature: SYSTEM 100 rules around the disability and survivor additional_income end_period are different (end_period is last_simulation_period)

| Goal | Inclusion | start_period | end_period |
|------|-----------|--------------|------------|
| Lifetime | no | | |
| LTC | yes if long_term_care_additional_income > 0 | period of confinement_start_period of older client | last_simulation_period |
| Disability | yes if disability_additional_income > 0 | first period of simulation based on analysis_start_date | Two client case: period prior to the client_retirement_start_period of the nondisabled client; Single client: period prior to the client_retirement_start_period of disabled client |
| Survivor | yes if death_additional_income > 0 | first period of simulation based on analysis_start_date | Two client care: period prior to survivor's client_retirement_start_period; Single client: last_simulation_period |

Outstanding Issues:
Title:
Simulation: Simulation Cashflow Definition #69
Children:
Simulation Cashflow Definition—Savings #70
Simulation Cashflow Definition—Incomes #71
Simulation Cashflow Definition—Business and Real Property #72
Simulation Cashflow. Definition—Liabilities #73
Simulation Cashflow Definition—Goal Expenses #74
Simulation Cashflow Definition—Living Expenses #75
Simulation Cashflow Definition—Policy Benefits #76
Simulation Cashflow Definition—Premiums #77
Simulation Cashflow Definition—Adjustment to savings #130

Summary:
  The system 100 will set up cashflows that represent client incomes, savings, liabilities, premiums, and expenses to use in simulation.
  The cashflows that are set up are based on data entry related to incomes, savings, living expenses, and goal expenses
  The cashflows in the_proposed may be different from cashflows used in the_current due to modifications made by the advisor in Analyze
  The system 100 will simulate in period increments based on the simulation period frequency. This period frequency is defined to be annual (See Goal Simulation Overview—#78) so all cashflow will be converted to an annual amount ($1000/month becomes $12,000/year)—for the remainder of this document, the conversion step will say that the amount will be converted to an amount based on the simulation frequency Details:
1) Set up the investment asset savings used in a simulation run
  The system 100 will set up savings cashflows based on client and employer contributions defined in data entry and modified in Analyze. During simulation, the system 100 will add the savings contribution amount to the clients' assets based on proprietary rules.
  The system 100 will also set up certain savings expense cashflows based on client contributions defined in data entry and modified in Analyze. During simulation, the system 100 will subtract the savings expenses from the clients' assets based on proprietary rules.
    see Simulation: Simulation Cashflow Definition—Savings #70
    see Simulation: Simulation Cashflow Definition—Adjustment to savings #130
2) Set up the incomes from a Business or a Real Property used in a simulation run
  The system 100 will set up business income cashflows and the real property income cashflows based on businesses and real properties defined in data entry. During simulation, the system 100 will add the amountd to the clients' assets based on proprietary rules.
    See Simulation: Simulation Cashflow Definition—Business and Real Property #72
3) Set up the incomes used in a simulation run
  The system 100 will set up income cashflows based on incomes defined in data entry. During simulation, the system 100 will add the income to the clients' assets based on proprietary rules.
    See Simulation: Simulation Cashflow Definition—Incomes #71
4) Set up the policy benefits/incomes used in a simulation run:
  The system 100 will set up policy benefit income cashflows based on insurance policy data defined in data entry (or in Analyze). During simulation, the system 100 will add the benefit amounts to the clients' assets based on proprietary rules.
    See Simulation: Simulation Cashflow Definition—Policy Benefits #76
5) Set up the liabilities used in a simulation
  The system 100 will set up liability expense cashflows based on liability data defined in data entry. During simulation, the system 100 will subtract the liability expense amount from the clients' assets based on proprietary rules.
    See Simulation: Simulation Cashflow Definition—Liabilities #73

6) Set up the policy premiums used in a simulation run

The system 100 will set up premium expense cashflows based on policy data defined in data entry (or in Analyze). During simulation, the system 100 will subtract the premium expense amount from the clients' assets based on proprietary rules.

In the case of universal life insurance policies, the savings portion of the premium (the universal_life_accumulation_fund_premium) is treated as a client savings for purposes of simulation.

See Simulations: Simulation Cashflow Definition—Premiums #77

7) Set up the living expenses used in a simulation run

The system 100 will set up living expense cashflows based on data defined in data entry (or in Analyze). During simulation, the system 100 will subtract the living expense amount from the clients' assets based on proprietary rules.

See the Simulation: Simulation Cashflow Definition—Living Expenses #75

8) Set up the event/goal expenses used in a simulation run

The system 100 will set up goal expense cashflows based on data defined in data entry (or in Analyze). During simulation, the system 100 will subtract the goal expense amount from the clients' assets based on proprietary rules.

See the Simulation: Simulation Cashflow Definition—Goal Expenses #74

Title:
Simulation: Simulation Cashflow Definition—Premiums #77
Parent: Simulation Cashflow Definition #69
Referenced Sections:
Disability Policy #83
Estate Processing for Survivor Goal #128
Life Policy #85
Long Term Care Policy #84
Summary:

The system 100 will set up cashflows that represent client premiums to be used in a simulation run for a goal simulation. Each premium cashflow represents the amount that is derived from a client paid policy premium entry (See the specific Policy sections #83, 84, 85).

With the exception handling of the Universal Life policy accumulation find, the system 100 will include the premium amount when totaling expenses for the period as long as 1) the cashflow start_period is less than or equal than the simulation period currently being processed AND 2) the cashflow end_period is equal to or greater to the simulation period currently being processed.

Whether a premium is included in simulation is dependent on rules specific to the goal being simulated (See Estate Processing for Survivor Goal for discussion regarding how the life insurance policies of the decedent are handled).

The start_period and end_period of a premium included in simulation are based on rules specific to the goal being simulated.

Details:

Assumption: reference to survivor in describing whether a premium is included in the survivor simulation, the survivor means the surviving client, either client_1 or client_2. In the case where there is one client, there is no surviving client, so no premiums would be included in simulation.

Localization: if there are no surviving clients, we include premiums paid by 'Other' in the survivor simulation. This is not done for System 100

1) term_life_insurance—for each term policy:
    the system 100 will convert the term_life_premium to an amount based on the simulation frequency
    the system 100 will simulate the converted amount if >0
    the system 100 will not inflate the amount Localization: handling of the payment_disability_indicator insured refers to term_life_insured
owner refers to term_life_owner
payment_disability_indicator refers to term_life_payment_disability_indicator

| Goal | Inclusion | start_period | end_period |
|---|---|---|---|
| Lifetime | yes if owner is a client and if period of term_life_premium_termination is greater than retirement_starting_period | retirement_starting_period | period prior to the period of term_life_premium_termination period (if ends at age 65, it ends the period prior to owner turning 65) |
| LTC | same as Lifetime | same as Lifetime | the lesser of the period of the confinement_end_period of owner or the period prior to term_life_premium_termination period |
| Disability | yes if owner is client unless insured is disabled_client AND payment_disability_indicator is set | first period of simulation based on analysis_start_date | same as Lifetime |
| Survivor | yes if owner is survivor | first period of simulation based on analysis_start_date | same as Lifetime |

2) whole_life_insurance—for each whole life policy:
    the system 100 will convert the whole_life_premium to an amount based on the simulation frequency
    the system 100 will simulate the converted amount if >0
    the system 100 will not inflate the amount Localization: handling of the payment_disability_indicator insured refers to whole_life_insured
owner refers to whole_life_owner
payment_disability_indicator refers to whole_life_payment_disability_indicator

| Goal | Inclusion | start_period | end_period |
|---|---|---|---|
| Lifetime | yes if owner is a client and period of whole_life_premium_termination is greater than retirement_starting_period | retirement_starting_period | period prior to whole_life_premium_termination period (if ends at age 65, it ends the period prior to owner turning 65) |

-continued

| Goal | Inclusion | start_period | end_period |
|---|---|---|---|
| LTC | same as Lifetime | same as Lifetime | the lesser of confinement_end_ period of owner or the period prior to whole_life_ premium_termination period |
| Disability | yes if owner is a client except if insured is disabled_client AND payment_ disability_indicator is indicated | first period of simulation based on analysis_start_ date | same as Lifetime |
| Survivor | yes if owner is survivor | first period of simulation based on analysis_start_ date | same as Lifetime |

3) whole_life_with_term_insurance—for each whole life with term policy:
   the system 100 will convert the whole_term_life_premium to an amount based on the simulation frequency
   the system 100 will simulate the converted amount if >0
   the system 100 will not inflate the amount Localization: handling of the
        payment_disability_indicator insured refers to whole_term_life_insured
owner refers to whole_term_life_owner
payment_disability_indicator refers to whole_term_ life_payment_disability_indicator

| Goal | Inclusion | start_period | end_period |
|---|---|---|---|
| Lifetime | yes if owner is client_1 or client_2 and period of whole_term_life_ premium_termination is greater than retirement_ starting_period | retirement_ starting_period | period prior to the period of whole_term_life_ premium_termination period (if ends at age 65, it ends the period prior to owner turning 65) |
| LTC | same as Lifetime | same as Lifetime | the lesser of the confinement_end_ period of owner or the period prior to whole_term_life_ premium_termination period |
| Disability | yes if owner is a client except if insured is disabled client AND payment_ disability_indicator is indicated | first period of simulation based on analysis_start_ date | same as Lifetime |
| Survivor | yes if owner is survivor | first period of simulation based on analysis_start_ date | same as Lifetime |

4) universal_life_insurance—for each universal life policy:
handle the risk premium
   the system 100 will convert the universal_life_risk_pre- mium to an amount based on the simulation frequency
   the system 100 will simulate the converted amount if >0
   the system 100 will not inflate the amount Localization: handling of the
        payment_disability_indicator insured refers to universal_life_insured
owner refers to universal_life_owner
payment_disability_indicator refers to universal_life_pay- ment_disability_indicator

| Goal | Inclusion | start_period | end_period |
|---|---|---|---|
| Lifetime | yes if owner is a client and period of universal_life_risk_ premium_termination is greater than retirement_ starting_period | retirement_ starting_period | period prior to the period of universal_life_risk_ premium_termination period (if ends at age 65, it ends the period prior to owner turning 65) |
| LTC | same as Lifetime | same as Lifetime | the lesser of the confinement_end_ period of owner or the period prior to universal_life_ risk_premium_ termination period |
| Disability | yes if owner is client except if insured is disabled_client AND payment_disability_ indicator is indicated | first period of simulation based on analysis_start_ date | same as Lifetime |
| Survivor | yes if owner is survivor | first period of simulation based on analysis_start_ date | same as Lifetime | handle the savings portion of universal life premium
   the system 100 will convert the universal_life_accumula- tion_fund_premium to an amount based on the simula- tion frequency
   the system 100 will simulate the converted amount if >0.
   the system 100 will not inflate the amount
   Localization: the premium of a universal life policy that represents savings
insured refers to universal_life_insured
owner refers to universal_life_owner
payment_disability_indicator refers to universal_life_pay- ment_disability_indicator
   Accumulation fund premium handled as subtraction from regular_asset_simulation_portfolio (premium expense):
   accumulation fund premium handled as addition to regu- lar_contributions_simulation_portfolio and treated like a savings:

| Goal | Inclusion | start_period | end_period |
|---|---|---|---|
| Lifetime | yes | first period of simulation based on analysis_start_ date | period prior to client_retirement_ start_period of owner |

| Goal | Inclusion | start_period | end_period |
|---|---|---|---|
| LTC | yes | same as lifetime | same as lifetime |
| Disability | yes if owner is client unless insured is disabled_client and payment_disability_indicator is set | same as lifetime | same as lifetime |
| Survivor | yes if owner is surviving client | same as lifetime | same as lifetime |

5) fixed_annuity—for each fixed annuity policy:
    the system 100 will convert the fixed_annuity_premium to an amount based on the simulation frequency
    the system 100 will simulate the converted amount if >0
    the system 100 will not inflate the amount
    Localization: this is considered an investment asset and the premium is treated as a savings.
insured refers to fixed_annuity_insured
owner refers to fixed_annuity_owner

| Goal | Inclusion | start_period | end_period |
|---|---|---|---|
| Lifetime | yes if owner is a client and period of fixed_annuity_premium_termination is greater than retirement_starting_period | retirement_starting_period | period prior to the period of fixed_annuity_premium_termination period (if ends at age 65, it ends the period prior to owner turning 65) |
| LTC | same as Lifetime | same as Lifetime | the lesser of the period of the confinement_end_period of owner or the period prior to fixed_annuity_premium_termination period |
| Disability | yes if owner is client | first period of simulation based on analysis_start_date | same as Lifetime |
| Survivor | yes if owner is survivor | first period of simulation based on analysis_start_date | same as Lifetime |

6) endowment_life—for each endowment policy:
    the system 100 will convert the endowment_life_premium to an amount based on the simulation frequency
    the system 100 will simulate the converted amount if >0
    the system 100 will not inflate the amount
    Localization: this is a policy type not included
insured refers to endowment_life_insured
owner refers to endowment_life_owner
payment_disability_indicator refers to endowment_life_payment_disability_indicator

| Goal | Inclusion | start_period | end_period |
|---|---|---|---|
| Lifetime | yes if owner is a client and period of endowment_life_premium_termination is greater than retirement_starting_period | retirement_starting_period | period prior to the period of endowment_life_premium_termination period (if ends at age 65, it ends the period prior to owner turning 65) |
| LTC | same as Lifetime | same as Lifetime | the lesser of the period of the confinement_end_period of owner or the period prior to endowment_life_premium_termination period |
| Disability | yes if owner is client except if insured is disabled_client AND payment_disability_indicator is set | first period of simulation based on analysis_start_date | same as Lifetime |
| Survivor | yes if owner is survivor | first period of simulation based on analysis_start_date | same as Lifetime |

7) child_endowment_policy—for each child endowment policy:
    the system 100 will convert the child_endowment_life_premium to an amount based on the simulation frequency
    the system 100 will simulate the converted amount if >0
    the system 100 will not inflate the amount
    Localization: this is a policy type not included in APEX
insured refers to child_endowment_life_insured
owner refers to child_endowment_life_owner
premium_termination refers to child_endowment_life_premium_termination

| Goal | Inclusion | start_period | end_period |
|---|---|---|---|
| Lifetime | yes if owner is a client and period of premium_termination is greater than retirement_starting_period | retirement_starting_period | period prior to the period of premium_termination period (if ends at age 65, it ends the period prior to owner turning 65) |
| LTC | same as Lifetime | same as Lifetime | the lesser of the period of the confinement_end_period of owner or the period prior to premium_termination period |
| Disability | yes if owner is a client | first period of simulation based on analysis_start_date | same as Lifetime |
| Survivor | yes if owner is survivor | first period of simulation based on analysis_start_date | same as Lifetime |

8) disability_policy—for each disability policy:
   the system 100 will convert the disability_policy_premium to an amount based on the simulation frequency
   the system 100 will simulate the converted amount if >0
   the system 100 will inflate the amount if the disability_policy_premium_increase_indicator is set
   if the premium inflates, it will inflate at the constant defined by the DISABILITY_PREMIUM_INFLATION_RATE (see Disability Policies section)
insured refers to disability_policy_insured

| Goal | Inclusion | start_period | end_period |
|---|---|---|---|
| Lifetime | yes if the disability_policy_premium_termination of insured > retirement_starting_period | retirement_starting_period | period prior to the disability_policy_premium_termination |
| LTC | same as Lifetime | same as Lifetime | same as Lifetime |
| Disability | yes if the insured is the nondisabled_client | first period of simulation based on analysis_start_date | same as Lifetime |
| Survivor | yes if insured is survivor | first period of simulation based on analysis_start_date | same as Lifetime |

9) long_term_care_policy—for each long term care policy:
   the system 100 will convert the long_term_care_policy_premium to an amount based on the simulation frequency
   the system 100 will simulate the converted amount if >0
   the system 100 will not inflate the amount
insured refers to the long_term_care_policy_insured

| Goal | Inclusion | start_period | end_period |
|---|---|---|---|
| Lifetime | yes if period of long_term_care_premium_termination of insured > retirement_starting_period | retirement_starting_period | period prior to period of long_term_care_premium_termination of insured |
| LTC | same as Lifetime | same as Lifetime | period prior to lessor of period of long_term_care_premium_termination of insured or confinement_start_period of insured |
| Disability | yes | first period of simulation based on analysis_start_date | same as Lifetime |
| Survivor | yes if insured is survivor | first period of simulation based on analysis_start_date | same as Lifetime |

Outstanding Issues:
Title:
Simulation: Simulation Cashflow Definition—Savings #70
Parent: Simulation Cashflow Definition #69
Referenced Sections:
Asset Section #27
Summary:
   The system 100 will set up the savings cashflows used in a simulation run for a goal simulation. Each savings cashflow represents the savings amount that is derived from data entry elements or modifications made in Analyze.

The system 100 will add the savings amount to the appropriate simulation_portfolio if 1) the cashflow start_period is less than or equal than the simulation period currently being processed AND 2) the cashflow end_period is equal to or greater to the simulation period currently being processed.

The system 100 will determine if the savings are client savings or employer savings. Based on that distinction, the savings will get different treatment.

For client savings, the system 100 can treat the savings as a savings and an expense. Since the client is doing the savings, that amount has to be paid for by the client.

During the times of simulation where incomes and expenses are being tracked (the disability goal, the survivor goal, and the post-retirement period of the lifetime and LTC goals):
   1) the system 100 will subtract the client savings amount for the period from the regular_asset_simulation_portfolio.
   2) the system 100 will add the client savings amount for the period to the simulation_portfolio it is associated with.

For employer savings, the system 100 will add the employer savings amount for the period to the appropriate client_X_retirement_simulation_portfolio (the X representing either client_1 or client_2) since employer savings only impact retirement accounts.

Inclusion of a savings in the simulation is based on rules specific to the goal being simulated.

The start_period and end_period of the cashflow are based on rules specific to the goal being simulated.

The system 100 will inflate the savings amount based on a stochastically determined inflation rate for each period except the initial period Details:
1) regular_savings—for each regular_asset:
   The system 100 will get the regular_asset_annual_contribution to the regular_assets (See Asset Section #27).
   The system 100 will convert the regular_asset_annual_contribution to an amount based on the simulation frequency
   The system 100 will inflate the converted amount based on a stochastically determined inflation rate for each period except the initial period
   The amount will be added to the regular_contribution_simulation_portfolio Savings Handled as Addition to Asset:

| Goal | Inclusion | start_period | end_period |
|---|---|---|---|
| Lifetime | yes | first period of simulation based on analysis_start_date | period prior to retirement_starting_period |
| LTC | yes | same as lifetime | same as lifetime |
| Disability | no - all nonqualified savings are stopped in case of disability | | |
| Survivor | yes if owner is surviving client | first period of simulation based on analysis_start_date | period prior to retirement_starting_period |

| Goal | Inclusion | start_period | end_period |
|---|---|---|---|
| Lifetime | no | | |
| LTC | no | | |
| Disability | no | | |
| Survivor | yes if owner is surviving client | first period of simulation based on analysis_start_date | period prior to retirement_starting_period |

Fixed_annuity_savings—for each fixed annuity investment account:

The application will get the annual_contribution to the fixed_annuity_asset (See Asset Requirement).

The application will convert the annual_contribution to an amount based on the simulation frequency The application will inflate the converted amount based on a stochastically determined inflation rate for each period except the initial period

| Goal | Inclusion | start_period | end_period |
|---|---|---|---|
| Lifetime | yes | first period of simulation based on analysis_start_date | the lesser of period prior to 1) client_retirement_start_period of owner or 2) period of year_end |
| LTC | yes | same as lifetime | same as lifetime |
| Disability | yes if owner is nondisabled client | same as lifetime | same as lifetime |
| Survivor | yes if owner is surviving client | same as lifetime | same as lifetime |

| Goal | Inclusion | start_period | end_period |
|---|---|---|---|
| Lifetime | no | | |
| LTC | no | | |
| Disability | yes if owner is nondisabled client | first period of simulation based on analysis_start_date | the lesser of period prior to 1) client_retirement_start_period of owner or 2) period of year_end |
| Survivor | yes if owner is surviving client | first period of simulation based on analysis_start_date | the lesser of period prior to 1) client_retirement_start_period of owner or 2) period of year_end |

2) variable_annuity_savings—for each variable_annuity:

The system 100 will convert the variable_annuity_annual_contribution to an amount based on the simulation frequency The system 100 will inflate the converted amount based on a stochastically determined inflation rate for each period except the initial period The system 100 will add the amount to the client_X_retirement_simulation_portfolio (based on client_1 or client_2)

Additional feature: qualified savings stop relative to a client's retirement. System 100 wants to specify the ending.

| Goal | Inclusion | start_period | end_period |
|---|---|---|---|
| Lifetime | yes | first period of simulation based on analysis_start_date | period prior to the period of the variable_annuity_premium_end |
| LTC | yes | same as lifetime | same as lifetime |
| Disability | yes | same as lifetime | same as lifetime |
| Survivor | yes if owner is surviving client | same as lifetime | same as lifetime |

Savings Handled as Subtraction from Asset (savings expense):

Premium_end refers to variable_annuity_premium_end

| Goal | Inclusion | start_period | end_period |
|---|---|---|---|
| Lifetime | yes if premuim_end > retirement_start_period | retirement_start_period | period prior to the period of premium_end |
| LTC | yes if premuim_end > retirement_start_period | retirement_start_period | period prior to the period of premium_end |
| Disability | yes if owner is nondisabled client | first period of simulation based on analysis_start_date | period prior to the period of premium_end |
| Survivor | yes if owner is surviving client | first period of simulation based on analysis_start_date | period prior to the period of premium_end |

3) employer_savings—for each company_defined_contribution_plan:

Localization: new retirement asset type

The system 100 will convert the company_dc_plan_X_annual_contribution to an amount based on the simulation frequency The system 100 will inflate the converted amount based on a stochastically determined inflation rate for each period except the initial period The amount will be added to the client_X_retirement_simulation_portfolio (based on whether client_1 or client_2)

Savings Handled as Addition to Asset:

Owner refers to company_dc_plan_X_owner

| Goal | Inclusion | start_period | end_period |
|---|---|---|---|
| Lifetime | yes | first period of simulation based on analysis_start_date | the lesser of period prior to 1) client_retirement_start_period of owner or 2) period owner turns age 60 |
| LTC | yes | same as lifetime | same as lifetime |
| Disability | yes if owner is nondisabled client | same as lifetime | same as lifetime |

-continued

| Goal | Inclusion | start_period | end_period |
|---|---|---|---|
| Survivor | yes if owner is surviving client | same as lifetime | same as lifetime |

Savings Handled as Subtraction from. Asset (savings expense): employer savings are not considered expenses since the client is not funding the savings 4) employee_savings—for each individual_defined_contribution_plan (1 or 2 based on contribution limits):

Localization: new retirement asset type

The system 100 will convert the individual_dc_plan_X_annual_contribution to an amount based on the simulation frequency The system 100 will inflate the converted amount based on a stochastically determined inflation rate for each period except the initial period The amount will be added to the client_X_retirement_simulation_portfolio (based on whether client_1 or client_2)

| Goal | Inclusion | start_period | end_period |
|---|---|---|---|
| Lifetime | yes | first period of simulation based on analysis_start_date | the lesser of period prior to 1) client_retirement_start_period of owner or 2) period owner turns age 60 |
| LTC | yes | same as lifetime | same as lifetime |
| Disability | yes if owner is nondisabled client | same as lifetime | same as lifetime |
| Survivor | yes if owner is surviving client | same as lifetime | same as lifetime |

Savings Handled as Subtraction from Asset (savings expense):

| Goal | Inclusion | start_period | end_period |
|---|---|---|---|
| Lifetime | yes if the the period the savings ends (lesser of period prior to 1) client_retirement_start_period of owner or 2) period owner turn age 60) >= retirement_start_period | retirement_start_period | lesser of period prior to 1) client_retirement_start_period of owner or 2) period owner turn age 60 |
| LTC | same as Lifetime | same as lifetime | same as lifetime |
| Disability | yes if owner is nondisabled client | first period of simulation based on analysis_start_date | the lesser of period prior to 1) client_retirement_start_period of owner or 2) period owner turns age 60 |
| Survivor | yes if owner is surviving client | first period of simulation based on analysis_start_date | the lesser of period prior to 1) client_retirement_start_period of owner or 2) period owner turns age 60 |

Outstanding Issues:

Title:

Simulation: Simulation Cashflow Definition—Policy Benefits and Income—#76

Parent: Simulation Cashflow Definition #69

Referenced sections:

Disability Policy—#83

Long Term Care Policy—#84

Life Policy—#85

Estate Processor for Survivor—#128

Summary:

The system 100 will set up the policy benefit and income cashflows used in a simulation run. A cashflow represents either the amount that a policy pays out in benefits or pays out as an income for a specific simulation goal (See Disability Policy—#83, Long Term Care Policy—#84, and Life Policy—#85).

The system 100 will add the cashflow amount to the regular_asset_simulation_portfolio if 1) the cashflow start_period is less than or equal than the simulation period currently being processed AND 2) the cashflow end_period is equal to or greater to the simulation period currently being processed.

Whether a cashflow is included in simulation is dependent on rules specific to the simulation goal being simulated (See Estate Processing for Survivor Goal section #128 for discussion regarding how the insurance policies of the decedent are handled).

The start_period and end_period of a benefit included in simulation are based on rules specific to the goal being simulated.

Added feature: in Apex, life insurance policies cannot be modified. For the Survivor Simulation, Apex has the Estate Processor handle existing life policies and has the Simulator include any added life insurance policy's death benefit as a increase to the regular_asset_portfolio. For System 100, all life policies will process through the Estate Processor (see Estate Processor for Survivor section).

Details:

1) term_life_insurance—for each term policy:

For the Survivor simulation, the system 100 will take into consideration the policies where the decedent is the owner and/or insured outside of the simulation—see the EstateProcessor for Survivor section the system 100 will simulate the sum_assured the system 100 will not inflate the amount insured refers to term_life_insured payment_disability_indicator refers to term_life_payment_disability_indicator

| Goal | Inclusion | start_period | end_period |
|---|---|---|---|
| Lifetime | no | | |
| LTC | no | | |
| Disability | yes if insured is disabled client and payment_disability_indicator is set | first period of simulation based on analysis_start_date | same as start_period |
| Survivor | if insured is decedent - handled by Estate Processor | | |

2) whole_life_insurance—for each whole life policy:
handle sum_assured benefit:
   For the Survivor simulation, the system 100 will take into consideration the policies where the decedent is the owner and/or insured outside of the simulation—see the EstateProcessor for Survivor section
   the system 100 will simulate the sum_assured
   the system 100 will not inflate the amount
insured refers to whole_life_insured
payment_disability_indicator refers to whole_life_payment_disability_indicator

| Goal | Inclusion | start_period | end_period |
|---|---|---|---|
| Lifetime | no | | |
| LTC | no | | |
| Disability | yes if insured is disabled client and payment_disability_indicator is set | first period of simulation based on analysis_start_date | same as start_period |
| Survivor | if insured is decedent - handled by Estate Processor | | | handle whole_life_future_cash_value_payment:
   For the Survivor simulation, the system 100 will take into consideration the policies where the decedent is the owner and/or insured outside of the simulation—see the EstateProcessor for Survivor section
   the system 100 will simulate the whole_life_future_cash_value_payment amount
   the system 100 will not inflate the amount
future_cash_value_payment refers to whole_life_future_cash_value_payment
future_cash_value_payment_date refers to whole_life_future_cash_value_payment
insured refers to whole_life_insured
payment_disability_indicator refers to whole_life_payment_disability_indicator

| Goal | Inclusion | start_period | end_period |
|---|---|---|---|
| Lifetime | yes | period of future_cash_value_payment | same as start_period |
| LTC | yes | same as Lifetime | same as start_period |
| Disability | yes except if insured is disabled_client and payment_disability_indicator is set | same as Lifetime | same as start_period |
| Survivor | yes if insured is survivor | same as Lifetime | same as start_period |

3) whole_life_with_term_insurance—for each whole life with term policy:
handle the sum_assured benefit:
   For the Survivor simulation, the system 100 will take into consideration the policies where the decedent is the owner and/or insured outside of the simulation—see the EstateProcessor for Survivor section
   the system 100 will simulate the sum_assured
   the system 100 will not inflate the amount
insured refers to whole_term_life_insured
payment_disability_indicator refers to whole_term_life_payment_disability_indicator

| Goal | Inclusion | start_period | end_period |
|---|---|---|---|
| Lifetime | no | | |
| LTC | no | | |
| Disability | yes if insured is disabled_client and payment_disability_indicator is set | first period of simulation based on analysis_start_date | same as start_period |
| Survivor | yes if insured is decedent - handled by Estate Processor | | | handle whole_term_life_future_cash_value_payment:
   For the Survivor simulation, the system 100 will take into consideration the policies where the decedent is the owner and/or insured outside of the simulation—see the EstateProcessor for Survivor section
   the system 100 will simulate the whole_term_life_future_cash_value_payment amount
   the system 100 will not inflate the amount
future_cash_value_payment refers to whole_term_life_future_cash_value_payment
future_cash_value_payment_date refers to whole_term_life_future_cash_value_payment
insured refers to whole_term_life_insured
payment_disability_indicator refers to whole_term_life_payment_disability_indicator

| Goal | Inclusion | start_period | end_period |
|---|---|---|---|
| Lifetime | yes | period of future_cash_value_payment | same as start_period |
| LTC | yes | same as Lifetime | same as start_period |
| Disability | yes except if insured is disabled_client and payment_disability_indicator is set | same as Lifetime | same as start_period |
| Survivor | yes if insured is survivor | same as Lifetime | same as start_period |

4) universal_life_insurance—for each universal life policy:
   For the Survivor simulation, the system 100 will take into consideration the policies where the decedent is the owner and/or insured outside of the simulation—see the Estate Processor for Survivor section
   the system 100 will simulate the sum_assured
   the system 100 will not inflate the amount
insured refers to universal_life_insured
payment_disability_indicator refers to universal_life_payment_disability_indicator

| Goal | Inclusion | start_period | end_period |
|---|---|---|---|
| Lifetime | no | | |
| LTC | no | | |
| Disability | yes if insured is disabled client and payment_disability_indicator is set | first period of simulation based on analysis_start_date | same as start_period |
| Survivor | yes if insured is decedent - handled by Estate Processor | | |

5) endowment_policy—for each endowment policy:
   For the Survivor simulation, the system 100 will take into consideration the policies where the decedent is the insured outside of the simulation—see the Estate Processor for Survivor section
   the system 100 will simulate the sum_assured amount
   the system 100 will not inflate the amount

| Goal | Inclusion | start_period | end_period |
|---|---|---|---|
| Lifetime | yes if insured is client_1 or client_2 | period of policy_termination | same as start_period |
| LTC | same as Lifetime | same as Lifetime | same as start_period |
| Disability | case 1: if insured is disabled client and payment_disability_ indicator is set; case 2: other situations | case 1: first period of simulation based on analysis_start_date; case 2: period of policy_termination | case 1 and case2: same as start_period |
| Survivor | case 1: if insured is survivor; case 2: insured is decedent | case 1: same as Lifetime; case 2: handled by Estate Processor | case 1: same as Lifetime; case 2: handled by Estate Processor |

6) fixed_annuity—for each fixed annuity policy:
   For the Survivor simulation, the system 100 will take into consideration the policies where the decedent is the insured outside of the simulation—see the Estate Processor for Survivor section
   the system 100 will convert the fixed_annuity_amount to an amount based on the simulation frequency
   the system 100 will simulate the converted amount
   the system 100 will not inflate the amount

| Goal | Inclusion | start_period | end_period |
|---|---|---|---|
| Lifetime | yes if insured is client_1 or client_2 and end_period >= retirement_starting_period | greater of period of policy_maturity_year or retirement_starting_period | period of policy_maturity_year + period based on annuity_term − 1 |
| LTC | same as Lifetime | same as Lifetime | same as Lifetime |
| Disability | yes if insured is client | period of policy_maturity_year | same as Lifetime |
| Survivor | yes if insured is survivor | period of policy_maturity_year | same as Lifetime |

7) child_endowment_policy—for each child endowment policy:
   the system 100 will convert the sum_assured to an amount based on the simulation frequency
   the system 100 will simulate the converted amount
   the system 100 will not inflate the amount

| Goal | Inclusion | start_period | end_period |
|---|---|---|---|
| Lifetime | yes if owner is client_1 or client_2 | period of policy_termination | same as start_period |
| LTC | same as Lifetime | same as Lifetime | same as Lifetime |
| Disability | same as Lifetime | same as Lifetime | same as Lifetime |
| Survivor | same as Lifetime (if the owner was the decedent, the owner was changed to the survivor when Estate Goal Processor - if no survivor, owner is Other and policy income is applied) | same as Lifetime | same as Lifetime |

8) disability_policy—for each disability policy:
   handle disability_policy_first_year_benefit
   the system 100 will convert the disability_policy_first_year_benefit to an amount based on the simulation frequency
   the system 100 will simulate the converted amount
   the system 100 will not inflate the amount

| Goal | Inclusion | start_period | end_period |
|---|---|---|---|
| Lifetime | no | | |
| LTC | no | | |
| Disability | yes if insured is disabled client | first period of simulation based on analysis_start_period | same as start_period |
| Survivor | no | | | handle disability_policy_following_years_benefit
   the system 100 will convert the disability_policy_following_years_benefit to an amount based on the simulation frequency
   the system 100 will simulate the converted amount
   the system 100 will inflate the amount if the disability_policy benefit increase_indicator is set. If set, the amount will increase by the DISABILITY_BENEFIT_INFLATION_RATE which is a constant 2%
maximum_benefit_payment_period refers to the
disability_policy_maximum_benefit_payment_period

| Goal | Inclusion | start_period | end_period |
|---|---|---|---|
| Lifetime | no | | |
| LTC | no | | |
| Disability | yes if insured is disabled client | the period of simulation based on analysis_start_period + 1 | the period prior to the period that the insured turns the age specified by the maximum_benefit_payment_period |
| Survivor | no | | | long_term_care_policy—for each long term care policy:
   handle lump sum payment
   the system 100 will simulate the long_term_care_policy_lump_sum_payment
   the system 100 will not inflate the amount
insured refers to long_term_care_policy_insured
policy_termination refers to long_term_care_policy_policy_termination

| Goal | Inclusion | start_period | end_period |
|---|---|---|---|
| Lifetime | no | | |
| LTC | yes except if the period of the policy_termination is < confinement_ start_period of insured | confinement_start_ period of insured | same as start_period |
| Disability | no | | |
| Survivor | no | | | handle pension payment
the system 100 will convert the long_term_care_policy_pension to an amount based on the simulation frequency
the system 100 will simulate the converted amount
the system 100 will inflate the amount based if the long_term_care_policy_benefit_increase_indicator is set. If set, the pension will inflate at the LONG_TERM_CARE_BENEFIT_INFLATION_RATE of 2%
insured refers to long_term_care_policy_insured
policy_termination refers to long_term_care_policy_policy_termination

| Goal | Inclusion | start_period | end_period |
|---|---|---|---|
| Lifetime | no | | |
| LTC | yes except if the period of the policy_termination is < confinement_ start_period of insured | confinement_ start_period of insured | start_period + [number of periods to lesser of a) period of pension_term – 1 or b) confinement_ end_period of insured] |
| Disability | no | | |
| Survivor | no | | |

Outstanding Issues:

What is claimed is:

1. A stochastic modeling system for facilitatng financial advising and planning comprising:
a stochastic modeling processor,
a non-transitory memory configured to communicate with the processor,
the memory having instructions stored thereon that, in response to execution by the processor, cause the processor to be capable of performing operations comprising:
facilitating, by the processor, use of data from a financial portfolio planning of a user in a stochastic modeling analysis using at least one of: a stationary bootstrap sampling method or a synchronous stationary bootstrap sampling method;
creating, by the processor, assumption data by performing a first stochastic simulation based upon an assumption, wherein the assumption comprises an assumption based upon a disability, a retirement date, a death or a divorce;
determining, by the processor, a customized strategy by performing a second stochastic simulation to analyze assets of the user with respect to fulfilling goals based on the assumption and the assumption data;
aggregating, by the processor, successes and failures produced in the second stochastic simulation to develop the probability of success with respect to fulfilling goals based on an assumption;
performing, by the processor, the second stochastic simulation for a plurality of period increments based on a simulation period frequency, wherein the simulation period frequency is annual and each of a plurality of cashflows is annualized, and wherein the simulation for each of the plurality of period increments is configured to:
project cashflows comprising incomes, savings, liabilities, premiums, and goals expenses;
determine a beginning asset balance for each portfolio in a plurality of simulation portfolios based on an asset owner and asset type of each investment asset;
in response to the simulation period being greater than 1, apply an inflation factor to incomes, expenses, and savings;
in response to at least one of (i) an income and policy benefit cashflows start period being equal to or greater than the simulation period, or (ii) the income and policy benefit cashflows end period being less than or equal to the simulation period, add the income and policy benefit cashflows to a regular asset simulation portfolio;
in response to an adjustment to savings cashflows start period being equal to or greater than the simulation period and the adjustments to savings cashflows end period being less than or equal to the simulation period, add the adjustments to savings cashflows to the regular asset simulation portfolio;
in response to at least one of the savings to regular assets cashflows start period is equal to or greater than the simulation period or the savings to regular assets cashflows end period being less than or equal to the simulation period, add savings to regular assets cashflows and the accumulation piece of a Universal Life premium to the regular contribution simulation portfolio;
in response to the savings to retirement assets start period being equal to or greater than the simulation period and the savings to retirement assets end period is less than or equal to the simulation period, add savings to retirement assets cashflows assets to the retirement simulation portfolio;
in response to the expense cashflows start period being equal to or greater than the simulation period and the expense cashflows end period being less than or equal to the simulation period, subtract a subset of expense cashflows from the simulation portfolios, wherein the subset of cashflows expense comprises expense types comprising at least one of living expenses, goal expenses, liabilities, premiums, or savings, wherein the subset of expense cashflows are subtracted from the simulation portfolios in a withdrawal order including: 1) regular asset simulation portfolio, 2) regular contribution simulation portfolio, 3) retirement simulation portfolio;
for the simulation period, use stochastic sampling to determine a cash rate of return, a bond rate of return, and an equity rate of return;
for each simulation portfolio in the plurality of simulation portfolios, determine an ending period balance by:
calculating an investment return for the simulation portfolio as (a percentage of cash * the cash rate of return)+(a percentage of bonds * the bond return)+(a percentage of equity * the equity return), wherein an allocation is associated with the simulation portfolio, the allocation comprising the percentage of cash, the percentage of bonds and the percentage of equity;

adjusting the investment return for an estimated tax effect; and adding the investment return to the portfolio balance;

increment a positive balance counter by 1 in response to an ending period balance being greater than 0; and determine a probability of success by dividing the positive balance counter by the total number of period increments in the plurality of period increments.

2. The stochastic modeling system of claim 1, further configured to include at least one of: a portfolio integration module, a portfolio reconciler module, or a simulator module in communication with the stochastic modeling module in order to further facilitate the financial portfolio planning of the user and creation of a proposed situation portfolio for the user.

3. The stochastic modeling system of claim 2, further configured to estimate a p value in the bootstrap sampling method using at least one of the following:

autocorrelation depending on lag alone;

estimating standard errors of bootstrapped samples for an original series, and comparing the estimated standard errors for independent bootstraps.

4. The stochastic modeling system of claim 3, wherein the estimating the p value includes arriving at a 1/p value between 25 and 50.

5. The stochastic modeling system claim 4, wherein the creation of the proposed situation portfolio includes analysis of at least one of: a normal life span, disability, long-term care, early death, life insurance information, disability insurance information, Social Security, social pension, asset structure, savings goals, retirement information, expenses, tax structure of the assets, savings, company pension information, and educational goals.

6. The stochastic modeling system of claim 5, wherein the creation of the proposed situation portfolio further includes at least one of:

customized timelines for the at least one of: normal life span, disability, long-term care, early death, life insurance information, disability insurance information, Social Security, social pension, asset structure, savings goals, retirement information, expenses, tax structure of the assets, savings, company pension information;

customized timelines for each member of a family; and analysis of life expectancy on factors other than retirement information.

7. The stochastic modeling system of claim 6, wherein the stochastic modeling system is configured to perform about 6,750 simulation runs for a lifetime of the user in order to facilitate financial portfolio planning of the user and creation of the proposed situation portfolio for the user.

8. The stochastic modeling system of claim 7, the operations further comprising determining a projection period for a lifetime simulation of the user by calculating a current age of the user by determining if a month of birth of the user is less than or equal to a month of an analysis start date, then the current age of the user is equal to a year of analysis start date minus a year of birth of the user, or else the current age of the user is equal to the year of analysis start date minus one minus the year of birth, wherein a number of years in the projection period is equal to an age at the end of the projection period minus the current age of the user.

9. The stochastic modeling system of claim 8, wherein the determining a projection period for a lifetime simulation of the user includes at least one of:

processing any Required Minimum Distributions (RMDs) and applying a tax on the RMDs; and adding any savings to non-qualified savings and qualified assets.

10. The stochastic modeling system of claim 9, wherein the determining a projection period for a lifetime simulation further includes at least one of:

determining if any after-tax income of the user and any RMDs exceed expenses and any phantom loan balances and savings to determine any excess, wherein the excess can be added to the non-qualified assets;

determining if the expenses and any phantom loan balances and savings exceed the after-tax income and RMDs to determine any shortage, wherein the shortage can be subtracted from the assets including the non-qualified assets, the non-qualified savings, the qualified assets of the user; and calculating end of any period asset balances and applying a growth rate to those balances.

11. The stochastic modeling system of claim 10, the operations further comprising calculating any phantom loan balances of the user based on at least one of:

creating a phantom revolving loan balance when the shortage has consumed the non-qualified assets and the qualified assets;

calculating the phantom loan balances as a remainder of the shortage, increased by a phantom interest rate, wherein the phantom interest rate is calculated relative to a modeled inflation rate; and adding the phantom loan balances to any cash flow shortage or subtracting the phantom loan balances from any cash flow surplus before applying a surplus or the shortage to the assets, so that any regular savings can pay down the phantom loan balances.

12. The stochastic modeling system of claim 11, the operations further comprising calculating any RMDs of the user based on at least one of:

withdrawing the RMDs from the qualified assets starting in a period in which the current age of the user is 71 years old; and calculating the RMDs by using a beginning of the period balance for the qualified assets divided by a number of periods remaining in the projection period for a lifetime simulation of the user, wherein the number of periods remaining in the projection period is equal to the current age at the end of the projection period minus current age in a current period.

13. A non-transitory, tangible computer-readable medium having computer-executable instructions stored thereon that, if executed by a stochastic modeling computer, cause the computer to perform a operations comprising:

facilitating, by the computer, use of data from a financial portfolio planning of a user in a stochastic modeling analysis using at least one of: a stationary bootstrap sampling method or a synchronous stationary bootstrap sampling method;

creating, by the computer, assumption data by performing a first stochastic simulation based upon an assumption, wherein the assumption comprises an assumption based upon a disability, a retirement date, a death or a divorce;

determining, by the computer, a customized strategy by performing a second stochastic simulation to analyze assets of the user with respect to fulfilling goals based on the assumption and the assumption data;

aggregating, by the computer, successes and failures produced in the second stochastic simulation to develop the probability of success with respect to fulfilling goals based on an assumption;
performing, by the computer, the second stochastic simulation for a plurality of period increments based on a simulation period frequency, wherein the simulation period frequency is annual and each of a plurality of cashflows is annualized, and wherein the simulation for each of the plurality of period increments comprises:
projecting cashflows comprising incomes, savings, liabilities, premiums, and goals expenses;
determining a beginning asset balance for each portfolio in a plurality of simulation portfolios based on an asset owner and asset type of each investment asset;
in response to the simulation period being greater than 1, applying an inflation factor to incomes, expenses, and savings;
in response to at least one of (i) an income and policy benefit cashflows start period being equal to or greater than the simulation period, or (ii) the income and policy benefit cashflows end period being less than or equal to the simulation period, adding the income and policy benefit cashflows to a regular asset simulation portfolio;
in response to an adjustment to savings cashflows start period being equal to or greater than the simulation period and the adjustments to savings cashflows end period being less than or equal to the simulation period, adding the adjustments to savings cashflows to the regular asset simulation portfolio;
in response to at least one of the savings to regular assets cashflows start period is equal to or greater than the simulation period or the savings to regular assets cashflows end period being less than or equal to the simulation period, adding savings to regular assets cashflows and the accumulation piece of a Universal Life premium to the regular contribution simulation portfolio;
in response to the savings to retirement assets start period being equal to or greater than the simulation period and the savings to retirement assets end period is less than or equal to the simulation period, adding savings to retirement assets cashflows assets to the retirement simulation portfolio;
in response to the expense cashflows start period being equal to or greater than the simulation period and the expense cashflows end period being less than or equal to the simulation period, subtracting a subset of expense cashflows from the simulation portfolios, wherein the subset of cashflows expense comprises expense types comprising at least one of living expenses, goal expenses, liabilities, premiums, or savings, wherein the subset of expense cashflows are subtracted from the simulation portfolios in a withdrawal order including: 1) regular asset simulation portfolio, 2) regular contribution simulation portfolio, 3) retirement simulation portfolio;
for the simulation period, using stochastic sampling to determine a cash rate of return, a bond rate of return, and an equity rate of return
for each simulation portfolio in the plurality of simulation portfolios, determining an ending period balance by:
calculating an investment return for the simulation portfolio as (a percentage of cash * the cash rate of return)+(a percentage of bonds * the bond return)+(a percentage of equity * the equity return), wherein an allocation is associated with the simulation portfolio, the allocation comprising the percentage of cash, the percentage of bonds and the percentage of equity;
adjusting the investment return for an estimated tax effect; and
adding the investment return to the portfolio balance;
incrementing a positive balance counter by 1 in response to an ending period balance being greater than 0; and
determining a probability of success by dividing the positive balance counter by the total number of period increments in the plurality of period increments.

14. The stochastic modeling system of claim 1, the operations further comprising:
receiving group input and associating, based upon the group input, a group goal and a group assumption with economic group data;
simulating a group passage of time, to analyze an economic group's available financial resources with respect to fulfilling the group goal based upon the group assumption;
processing a financial position for an economic group based upon an analysis of available financial resources and in response to at least one hypothetical event or transaction;
obtaining demographic data and financial data pertaining to the economic group; and,
analyzing and solving the group goal in an efficient order, accounting for any dependency of future goals upon prior goals, based upon the group assumption, the demographic data, and the financial data.

15. The stochastic modeling system of claim 14, the operations further comprising
identifying test data to apply to a simulation, wherein the test data includes at least one of: user input, market projections, economic projections, historical portfolio data, or cash flow from a plurality of scenarios;
retrieving the test data;
selecting a test scenario, wherein the test scenario includes a test goal;
simulating the portfolio integration module, the portfolio reconciler module, and the stochastic modeling module using the test data and test scenario;
assembling simulation results from the simulation;
comparing the simulation results to actual results produced by the portfolio integration module, the portfolio reconciler module, and the stochastic modeling module;
determining when the simulation results do not match the actual results; and
modifying the at least one of: the portfolio integration module, the portfolio reconciler module, or the stochastic modeling module.

16. The stochastic modeling system of claim 15, wherein the planned hypothetical events include an average lifespan of at least one of: the user or a family member of the user, and wherein the average lifespan is based on health of the user and family history.

17. The stochastic modeling system of claim 16, the operations further comprising selecting a specific investment instrument based on the customized strategy.

18. The stochastic modeling system of claim 17, the operations further comprising determining an amount of taxable assets to invest in the proposed situation portfolio by dividing a currency value of the goals by a value of the taxable assets.

* * * * *